United States Patent
Phillips et al.

(10) Patent No.: US 11,109,089 B2
(45) Date of Patent: *Aug. 31, 2021

(54) BITRATE CONTROL IN VIRTUAL REALITY (VR) ENVIRONMENTS USING TIME-SHIFTING AND UNICAST DELIVERY

(71) Applicant: TELEFONAKTIEBOLAGET LM ERICSSON (PUBL), Stockholm (SE)

(72) Inventors: Chris Phillips, Hartwell, GA (US); Robert Hammond Forsman, Sugar Hill, GA (US); Jennifer Ann Reynolds, Duluth, GA (US); Charles Hammett Dasher, Lawrenceville, GA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/722,424

(22) Filed: Dec. 20, 2019

(65) Prior Publication Data

US 2020/0162776 A1    May 21, 2020

Related U.S. Application Data

(62) Division of application No. 15/694,180, filed on Sep. 1, 2017, now Pat. No. 10,516,908.

(Continued)

(51) Int. Cl.
*H04N 7/173*       (2011.01)
*H04N 21/2662*   (2011.01)
(Continued)

(52) U.S. Cl.
CPC ....... *H04N 21/2662* (2013.01); *G06T 19/006* (2013.01); *H04L 65/4076* (2013.01);
(Continued)

(58) Field of Classification Search
CPC .. H04N 21/816; H04N 21/435; H04N 21/274; H04N 21/6131; H04N 21/44218
(Continued)

(56) References Cited

U.S. PATENT DOCUMENTS 7,975,283 B2 *  7/2011  Bedingfield, Sr. .......................... H04N 21/6131
                                                                                                725/95
8,767,014 B2 *  7/2014  Vaught ................... G06F 3/011
                                                                                                345/633

(Continued)

FOREIGN PATENT DOCUMENTS

WO    2016129549 A1    8/2016

*Primary Examiner* — Jivka A Rabovianski

(57) ABSTRACT

A system and method for providing bitrate control for delivering media content to a plurality of virtual display (VD) screens presented in a virtual reality (VR) environment effectuated by a VR device of a subscriber based on detecting a movement in a point of view with respect the VD screens' placement within the VR environment, wherein each VD screen is configured to receive a media content channel. Responsive to detecting the movement, angular distance of each of the VD screens relative to a reference axis is computed. Weights to each of the media content channels may be assigned or updated based on the angular distance of the corresponding VD screens relative to the reference axis. Media content channels on the VD screens outside the subscriber's field of view may be time-shifted. Bandwidth of a managed bandwidth pipe may be (re) allocated based on the relative weights of the non-time-shifted media content channels for delivering the media content channels to the subscriber's VR environment responsive to selecting single bitrates for the media channels according to a channel bandwidth annealing mechanism.

13 Claims, 54 Drawing Sheets

Related U.S. Application Data

(60) Provisional application No. 62/384,975, filed on Sep. 8, 2016.

(51) Int. Cl.

| | |
|---|---|
| *H04N 21/436* | (2011.01) |
| *H04N 21/61* | (2011.01) |
| *H04N 21/442* | (2011.01) |
| *H04N 21/4728* | (2011.01) |
| *H04N 21/6405* | (2011.01) |
| *H04N 21/414* | (2011.01) |
| *G06T 19/00* | (2011.01) |
| *H04L 29/06* | (2006.01) |
| *H04N 21/2365* | (2011.01) |
| *H04N 21/2381* | (2011.01) |
| *H04N 21/266* | (2011.01) |
| *H04N 21/482* | (2011.01) |
| *H04N 21/643* | (2011.01) |
| *H04L 29/08* | (2006.01) |

(52) U.S. Cl.
CPC ....... *H04L 65/601* (2013.01); *H04N 21/2381* (2013.01); *H04N 21/23655* (2013.01); *H04N 21/26616* (2013.01); *H04N 21/41407* (2013.01); *H04N 21/43615* (2013.01); *H04N 21/44218* (2013.01); *H04N 21/4728* (2013.01); *H04N 21/482* (2013.01); *H04N 21/6118* (2013.01); *H04N 21/6125* (2013.01); *H04N 21/6405* (2013.01); *H04N 21/64322* (2013.01); *H04L 67/02* (2013.01)

(58) Field of Classification Search
USPC ............................................ 725/36, 116, 95
See application file for complete search history.

(56) References Cited

U.S. PATENT DOCUMENTS

| | | |
|---|---|---|
| 9,392,212 B1 | 7/2016 | Ross |
| 9,918,136 B2 * | 3/2018 | Cole .................... H04N 13/117 |
| 2015/0212576 A1 | 7/2015 | Ambrus et al. |
| 2015/0288732 A1 | 10/2015 | Phillips et al. |
| 2015/0346812 A1 | 12/2015 | Cole et al. |

* cited by examiner

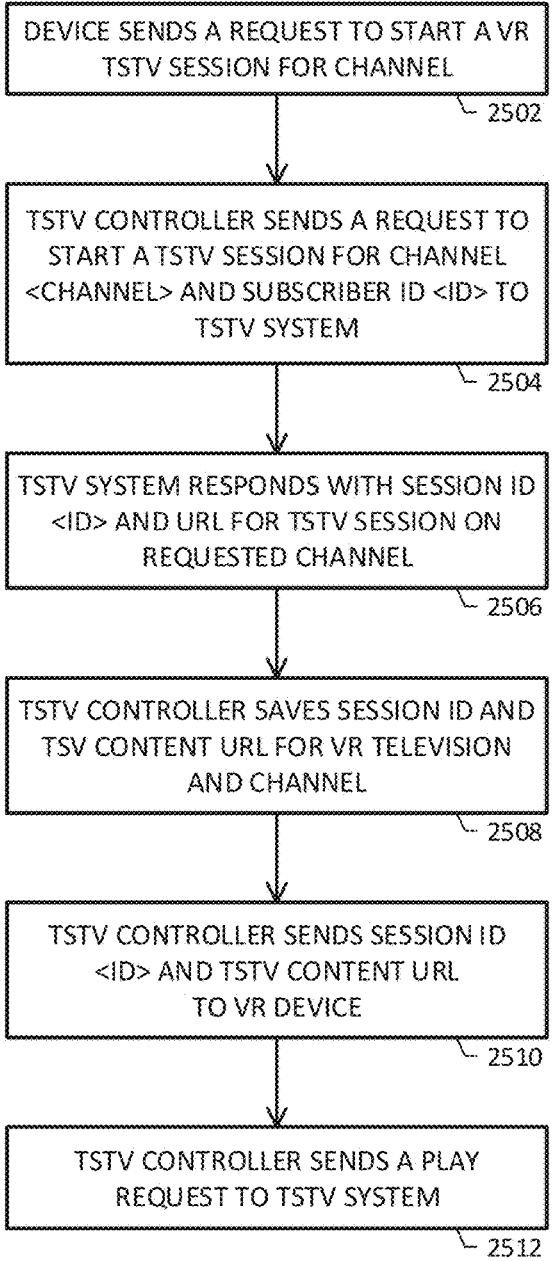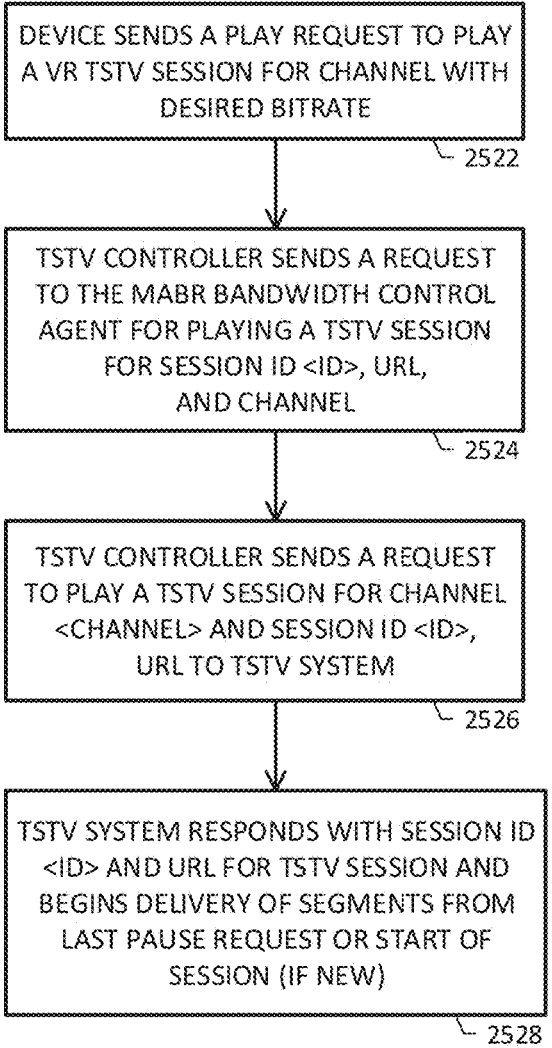
FIG. 25A
FIG. 25B

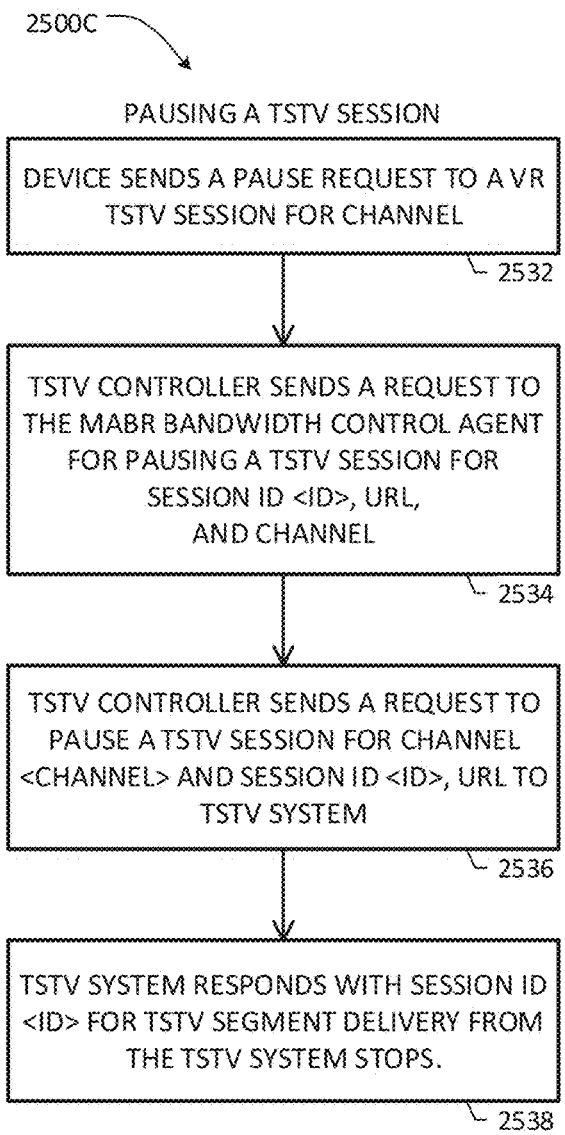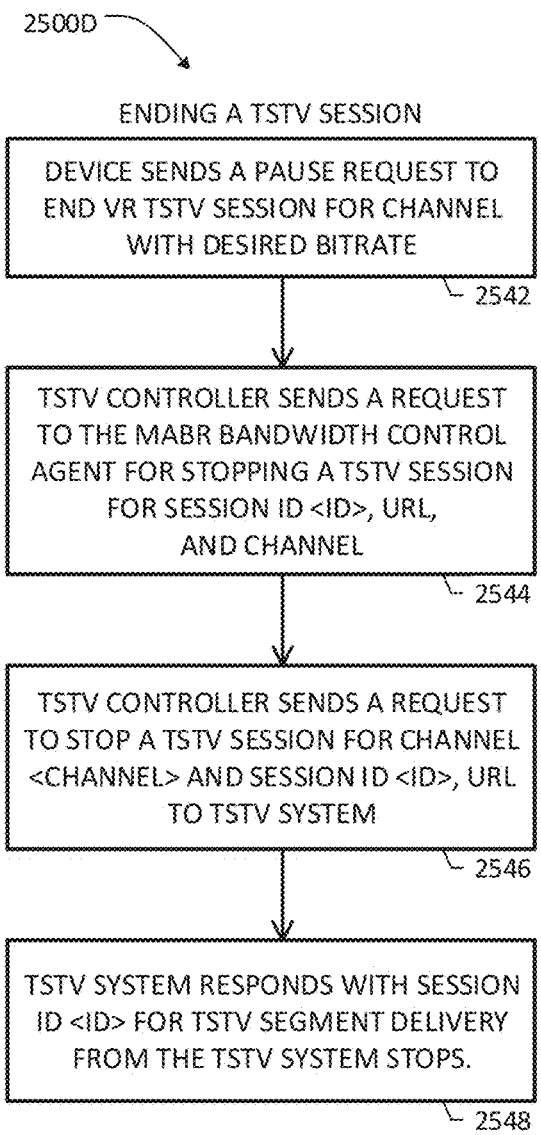
FIG. 25C
FIG. 25D

BITRATE CONTROL IN VIRTUAL REALITY (VR) ENVIRONMENTS USING TIME-SHIFTING AND UNICAST DELIVERY

RELATED APPLICATIONS

This nonprovisional application is a division of U.S. application Ser. No. 15/694,180, filed Sep. 1, 2017, which claims the benefit of U.S. Application No. 62/384,975, filed Sep. 8, 2016, the disclosures of which are fully incorporated herein by reference.

TECHNICAL FIELD

The present disclosure generally relates to communication networks. More particularly, and not by way of any limitation, the present disclosure is directed to a scheme for facilitating bitrate control in a virtual reality (VR) environment operative to receive multiple content streams in a multicast adaptive bitrate (MABR) architecture.

BACKGROUND

The near universal adoption of Internet protocol (IP) as a standard for digital transmission is revolutionizing the traditional way of video delivery. Typical applications such as IPTV and live video streaming have become increasingly popular over the Internet. To efficiently utilize the bandwidth resources of the network in these applications, the video is usually compressed with suitable media coding schemes and then delivered only to subscribers who request it. For data delivery, multicast is considered the most efficient paradigm for such applications, but the scalability issue of traditional IP multicast hinders the deployment of a large-scale video delivery system with numerous channels.

IP delivery is also contemplated in virtual reality environments or applications that allow for virtual media viewing areas, including ones with multiple virtual TVs or screens. Mixed reality environments allow for virtual televisions to be displayed instead of (or alongside with) real televisions in a real environment. Virtual reality requires extremely high bitrates because the true "screen" is much closer to a viewer's eye than for an actual television ten feet away. Lower bitrates in a virtual environment cause a "screen door" effect, in which individual pixels are visible even if they would not be ten feet away.

It should be appreciated that a major challenge for existing virtual reality systems is combining realistic images with low-latency rendering, so that user's virtual reality experience matches the rapid feedback to movement observed in real environments. Existing systems often have long latency to measure changes in the user's position and orientation, and to rerender the virtual world based on these changes. 3D rendering is a complex and processor intensive operation that can take potentially hundreds of milliseconds. The result is that users perceive noticeable lag between their movements and the rendering of updated virtual environments on their displays. Three technology trends are compounding this challenge: (a) The complexity of 3D models is growing as more 3D data is captured and generated; (b) Resolution of virtual reality displays is increasing, requiring more computational power to render images; and (c) Users are relying increasingly on mobile devices that may have limited resources or capacity. As a result of these trends, high latency in rendering virtual reality displays has become a major factor limiting adoption and applications of virtual reality technology. There are no known systems that provide sufficiently low-latency rendering and display to generate highly responsive virtual reality environments given these technology constraints, including where media delivery is contemplated.

SUMMARY

The present patent disclosure is broadly directed to systems, methods, apparatuses, devices, and associated non-transitory computer-readable media for providing bitrate control in delivering media content to a plurality of virtual display (VD) screens presented in a virtual reality (VR) environment effectuated by a VR device of a subscriber based on detecting a movement in a point of view with respect the VD screens' placement within the VR environment, wherein each VD screen is configured to receive a media content channel.

Some embodiments herein provide a virtual reality environment that includes detecting where a viewer is facing, and calculating weights to give virtual televisions or screens based on how "in view" they are. These weights may determine audio volume and video bitrate. Overall quality of experience is maintained, since quality is less crucial for VD screens in periphery vision. At the same time, users are able to notice when important events occur on non-primary VD screens of televisions from audio and/or visual cues. Upon shifting focus, televisions that were previously in peripheral vision increase in quality and volume.

Because VD screens in an example virtual environment are always playing, they respond fluidly to rapid user head motions. A user can quickly glance at a television to see if anything is interesting. Should they be interested, quality will improve within a short time as the video decoder's buffer is filled with higher quality segments. At the same time, bandwidth is conserved for televisions that are not currently being watched, allowing greater bandwidth to be allocated for televisions that are.

Some embodiments herein provide a virtual reality environment system that detects where a viewer is facing, and only plays video that is seen. Un-played video may be time-shifted, allowing unwatched segments to be viewed at a later time. Improved QoE may therefore be maintained, since the only data that is used is wanted data. At the same time, content is not missed. Upon shifting focus, televisions that were previously paused resume playback exactly where they were last viewed. Non time-shifted televisions can have their bandwidth managed as set forth in the embodiments described elsewhere in the present patent application.

In one aspect, an embodiment of a bitrate control method is disclosed for delivering media content to a plurality of VD screens presented in a VR environment effectuated by a VR device of a subscriber, wherein each VD screen is configured to receive a media content channel. The claimed embodiment comprises, inter alia, detecting a movement in a point of view of the subscriber in relation to a reference axis (e.g., a first reference axis) with respect the VD screens' placement within the VR environment. In one variation, the point of view movement may result in a second reference axis within the VR environment. An angular distance may be computed or otherwise determined with respect to each of the VD screens based on the point of view movement. For example, such an angular distance or displacement may be determined for the VD screens relative to a new or second reference axis. Weights for each of the media content channels may be assigned or updated based on the angular distance of the corresponding VD screens relative to point of view movement. Based on the assigned and/or updated weights of the media content channels, bandwidth of a managed bandwidth pipe configured for delivering the media content channels to the subscriber's VR environment may be allocated or reallocated.

In another aspect, an embodiment of a bitrate control method may involve time-shifting of the media in a VR environment having a plurality of VD screens. Similar to the embodiment set forth above, an angular distance may be computed or otherwise determined with respect to each of the VD screens based on the point of view movement of a subscriber. A determination may be made that as to whether one or more VD screens are outside a field of view of the subscriber. For each of the media content channels showing on the VD screens still within the subscriber's field of view, suitable weights may be assigned and/or updated based on the angular distance of the corresponding VD screens. On the other hand, a null weight may be assigned to the media content channels showing on the VD screens that are outside the subscriber's field of view. The media content channels showing on the VD screens determined to be outside the subscriber's field of view are time-shifted. Bandwidth of the subscriber's managed bandwidth pipe may be allocated or reallocated based on the assigned/updated weights of the media content channels upon taking into account the null weights of the time-shifted media content channels for delivering the media content channels to the VD screens determined to be within the subscriber's field of view.

In a multiscreen virtual television environment, embodiments herein therefore advantageously provide a bitrate selection and bandwidth distribution scheme based on how directly a user is viewing a television.

In some embodiments, responsive to detecting the user's head or ocular movement, angular distance of each of the VD screens relative to a reference axis is computed. Weights to each of the media content channels may be assigned or updated based on the angular distance of the corresponding VD screens relative to the reference axis. According to a channel bandwidth annealing mechanism, bandwidth of a managed bandwidth pipe may be (re)allocated based on the relative weights of the media content channels for delivering the media content channels to the subscriber's VR environment responsive to selecting single bitrates for the media channels.

In still further aspects, one or more embodiments of a non-transitory computer-readable medium or distributed media containing computer-executable program instructions or code portions stored thereon are disclosed for performing one or more embodiments of the methods of the present invention when executed by a processor entity of a network node, element, virtual appliance, UE device, and the like, mutatis mutandis. Further features of the various embodiments are as claimed in the dependent claims.

With respect to embodiments providing for time-shifting, bandwidth may be further conserved for VD screens that are not currently being watched, thereby allowing greater bandwidth to be allocated for the screens being watched. Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

FIGS. 25A-25D are flowcharts of various blocks, steps and/or acts that may be (re)combined in one or more arrangements that illustrate various TSTV-related control processes that may be effectuated according to one or more embodiments of the present invention;

DETAILED DESCRIPTION

Figure 1:
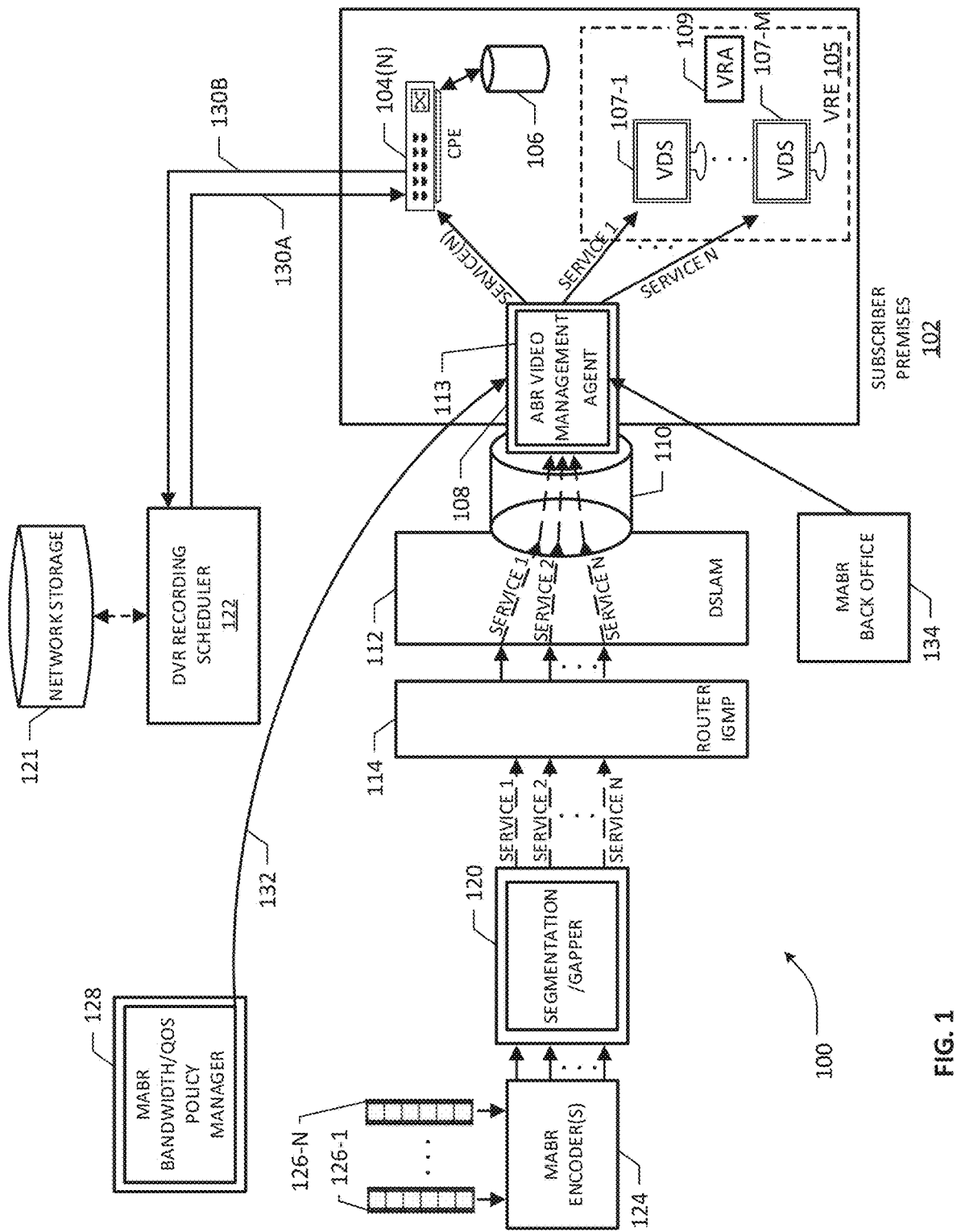
FIG. 1 depicts an example multicast ABR (MABR) network architecture for facilitating delivery of media content to one or more virtual display (VD) screens of a virtual reality (VR) environment of a subscriber premises according to one or more embodiments of the present patent application.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged or programmed under suitable executable code to perform that function.

As used herein, a network element or node may be comprised of one or more pieces of service network equipment, including hardware and software that communicatively interconnects other equipment on a network (e.g., other network elements, end stations, etc.), and is adapted to host one or more applications or services with respect to a plurality of subscribers. As such, some network elements may be disposed in a wireless radio network environment whereas other network elements may be disposed in a public packet-switched network infrastructure, including or otherwise involving suitable content delivery network (CDN) infrastructure. In still further arrangements, one or more network elements may be disposed in a cloud-based platform or datacenter having suitable equipment running virtualized functions or applications. Accordingly, at least some network elements may comprise "multiple services network elements" that provide support for multiple network-based functions (e.g., A/V media management, session control, Quality of Service (QoS) policy enforcement, bandwidth scheduling management, subscriber/device policy and profile management, content provider priority policy management, streaming policy management, network storage policy management, and the like), in addition to providing support for multiple application services (e.g., data and multimedia applications). Subscriber end stations, client devices or customer premises equipment (CPE) may comprise any device configured to execute, inter alia, a streaming client application and/or a HTTP download application for receiving live/stored media content from one or more content providers, e.g., via a suitable access network or edge network arrangement based on a variety of access technologies, standards and protocols. For purposes of one or more embodiments of the present invention, an example client device may also comprise a hardware platform for running networked or local gaming engines and related applications for effectuating virtual reality environments in a subscriber premises. Such client devices and/or CPE hardware platforms may therefore include portable laptops, netbooks, palm tops, tablets, mobile phones, smartphones, multimedia/video phones, mobile/wireless user equipment, portable media players, portable gaming systems or consoles (such as the Wii®, Play Station 3®, etc.) and the like that may access or consume live media content/services, stored content services or video on demand (VOD) services, time-shifted and/or place-shifted content services, etc. provided over a delivery network or a combination of networks for purposes of one or more embodiments set forth herein. Further, the client devices may also access or consume content/services provided over broadcast networks (e.g., cable and satellite networks) as well as a packet-switched wide area public network such as the Internet via suitable service provider access networks. In a still further variation, the client devices or subscriber end stations may also access or consume content/services provided on virtual private networks (VPNs) overlaid on (e.g., tunneled through) the Internet.

One or more embodiments of the present patent disclosure may be implemented using different combinations of software, firmware, and/or hardware in one or more modules suitably programmed and/or configured. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Referring now to the drawings and more particularly to FIG. 1, depicted therein is an example MABR communications network 100 where one or more embodiments of the present patent application may be practiced for facilitating delivery of media content to one or more virtual display (VD) screens of a virtual reality (VR) environment of a subscriber premises 102. In the context of the present disclosure, an embodiment of the MABR communications network 100 may implemented as an end-to-end network architecture for delivering MABR media content (and advertisement content, where applicable) using any delivery infrastructures, e.g., a Digital Subscriber Line (DSL) architecture, a Data Over Cable Service Interface Specification (DOCSIS)-compliant Cable Modem Termination System (CMTS) architecture, a suitable satellite access architecture or a broadband wireless access architecture. By way of example and introduction, MABR streaming delivery is broadly set forth herein that is applicable to DSL architectures without necessarily being limited thereto. As will be seen below, content may be delivered using either multicast ABR techniques or unicast ABR techniques. In a unicast delivery, a subscribing receiver may be provided with a direct and unique two-way path through the delivery network all the way back to a serving media server supplying the required data stream. The main streaming activity is managed on a one-to-one basis between the receiver and the source server in a communication session. The network between the source server and receiver may typically comprise a series of intermediate servers installed at network nodes, which may not be directly involved in the service but only support the transfer of a packet stream. Typically, the protocols used to support the transmissions are simple forms of Internet Protocol (IP) itself augmented by one or more higher layer protocols to provide flow control. These protocols extend across the span of the network connection between the source server and a given receiver.

A unicast system can support ABR streaming, which allows some form of rate adaptation. A given service may be encoded at a selection of different bitrates (known as representations), with synchronised boundary points at defined locations (e.g., every 50 frames). For each representation, content between successive boundary points is converted into a discrete file. Clients fetch a segment of one of the representations in turn. If a higher or a lower bit rate is required, the next segment is fetched from one of the other representations. The segments are constructed such that there is no discontinuity in decoded pictures/audio if the client switches between representations at the boundary points. This system may require a unicast two-way path between source and receiver to request files and deliver the requested files.

Multicast delivery makes more efficient use of bandwidth by sharing content streams among several receivers, wherein the content may be provided with or without rate adaptation. Intermediate network elements (e.g., routers or switches) are now more closely involved in the service delivery such that some control and management functions are delegated from the source server. This control is supported by more extensive protocols devised for this type of application such as, e.g., Protocol Independent Multicast (PIM) and Internet Group Multicast Protocol (IGMP). When a receiver requests a given media item, the network router system finds an existing stream of that content already in the network and directs a copy of it to that receiver from a serving cable headend, a video head office or an appropriately proximal network node in an edge distribution network. The requesting receiver may be provided with the capability to join this existing stream under controlled conditions that do not adversely affect existing receivers. Any receiver in this group may also be provided with the ability to leave the stream, or pause its consumption, without affecting the others. Additionally, there may be an implementation where a video pipe delivering services to a premises is operative to deliver content to one or more progressive download clients of the premises that are designed to receive the video in bursts.

Subscriber premises 102, which is served by a suitable broadband pipe 110, is illustratively shown in FIG. 1 as having a plurality of client devices 104(N), some of which may consume multicast/unicast content in normal real-life consumption scenarios, wherein one or more client devices may comprise STBs respectively coupled to or otherwise integrated with at least one display device (not specifically shown) and/or associated DVR/PVR or some other internal/external storage 106 for recording program content. Additionally, one or more client devices may be configured to effectuate a virtual reality (VR) environment 105 in conjunction with suitable ancillary devices such as VR headsets, etc., wherein a plurality of virtual display (VD) screens 107-1 to 107-M may be effectuated that receive media content channels via HTTP downloading for purposes an embodiment of the present invention. Accordingly, the client devices 104(N) may include STBs, standalone DVRs, or other standalone recording/storage devices, as well as VR-capable laptops, PCs, smartphones, tablet/phablet devices, and gaming consoles (collectively exemplified by VR apparatus (VRA) 109), which may be provided as part of a premises network disposed in the subscriber premises 102. As the MABR program content may be encoded using different encoding schemes (i.e., source encoding), the client devices may be configured to operate with one or more coder-decoder (codec) functionalities based on known or hereto unknown standards or specifications including but not limited to, e.g., Moving Pictures Expert Group (MPEG) codecs (MPEG, MPEG-2, MPEG-4, etc.), H.264 codec, High Efficiency Video Coding or HEVC (H.265) codec, and the like, in order to receive and render various types of programming content that is delivered as a plurality of service channels.

As noted, a premises network (not explicitly shown) may be disposed in the premises 102 for inter-operatively connecting the client devices, including the VR-capable devices, to a suitable premises node or element 108 such as a DSL router/gateway or a modem that is operative to effectuate communications (including bearer and signaling traffic) with respect to the client devices of premises 102. Regardless of the exact composition of the client devices, such a premises network may be implemented using any suitable wireless or wireline network technologies. Although not specifically shown in FIG. 1, it should be appreciated that premises 102 may also include other devices that may consume bandwidth for other data and voice communications as previously noted. Accordingly, the total bandwidth of subscriber premises pipe 110 may be apportioned between or allocated to a virtual video pipe for HTTP-based delivery of managed service channels to the VD screens 107-1 to 107-M of the VR environment 105, in addition to data and voice pipes. Furthermore, as will be set forth in detail further below, bandwidth of the managed video pipe used for delivering media content channels to the VD screens may be dynamically allocated based on selecting particular single bitrates from the available multiple bitrate representations the channels according to one or more embodiments of the present invention.

For purposes of the present patent application, embodiments concerning media content delivery and bandwidth control relative to MABR media content provided to the VD screens 107-1 to 107-M in the premises VR environment 105 will therefore be described in detail hereinbelow, without taking further reference to the other client devices of the premises 102 unless otherwise noted.

As noted above, subscriber premises 102 may be served in an example implementation via an access network architected over DSL infrastructure including DSL Access Multiplexer (DSLAM) nodes, broadband network gateways (BNGs), and the like. Accordingly, the subscriber premises bandwidth pipe 110 may be disposed between subscriber premises gateway (GW) node 108 and an access aggregation node 112 such as a DSL Access Multiplexer (DSLAM) node that may be coupled to a suitable IGMP switch or router 114 (e.g., IGMPv2/v3-capable Gigabit Ethernet (GigE) multicast router) via a BNG node (not specifically shown in this FIG.). An ABR management agent entity 113 provided with GW 108 is operative for effectuating suitable IGMP Leave/Join messages, in conjunction with additional functionalities or structures set forth in detail further below, with respect to joining, leaving or changing various multicast streams, as well as bitrate selection and dynamic bandwidth allocation corresponding to the service channels available to VD screens 107-1 to 107-M of the subscriber's VR environment 105.

One or more ABR encoders 124, which may be provided as part of a multicast stream formation (MSF) functionality in one example embodiment, are operative to receive a plurality of channel source feeds 126-1 to 126-N corresponding to a group of service channels that may be provided as MABR channels having segmented streams at different bitrate representations as will be described in detail below. Typically, the ABR encoder 124 receives live feeds from appropriate communications networks, although it is possible in an alternative or additional arrangement for a file-based streamer to read the content files from a disk, e.g., network storage 121, and stream the content streams via a network to the ABR encoder 124. Accordingly, the channel source feeds may comprise a variety of content or programs, e.g., pay TV broadcast programs delivered via cable networks or satellite networks, free-to-air satellite TV shows, IPTV programs, time-shifted/place-shifted TV (TS/PSTV) content, and the like. Regardless of how channel source feeds are generated and provided to the ABR encoder 124, a segmentation and gapping (SAG) unit 120 is configured to receive a plurality of encoded MABR streams for each service channel from the MABR encoder 124. As noted, each encoded MABR stream corresponds to a particular bitrate representation (e.g., 10 megabits per second (Mbs or Mbps) to 500 kilobits per second (Kbs or Kbps)) that correspond to various levels of video quality or resolutions) of a specific service channel to which a subscriber may tune for watching on a particular VD screen of the VR environment 105. SAG element 120 is operative to generate a segmented and gapped MABR stream for each encoded MABR stream of each service channel in a gapping functionality that may also be provided as part of an MSF module or node described in further detail below.

In one example additional or alternative implementation, a DVR recording scheduling node, subsystem or element 122 may be optionally disposed in the MABR communications network environment 100 that is operative to interface with one or more client devices of the premises 102, e.g., interfaces 130A/130B, in order to facilitate recording of TV channels that may be presented for viewing on a VD screen. By way of illustration, an example EPG may be provided as or via an interactive graphical user interface from which a TV program may be selected for recording, which may also be available on a VD screen in one example arrangement.

In accordance with further teachings of the present invention, a multicast ABR bandwidth and QoS policy manager node, element or subsystem 128 may be provided for interfacing with the multicast VMA (MVMA) functionality 113 executing at GW 108. In one embodiment, the MABR bandwidth/QoS policy manager 128 may be configured to provide bandwidth allocation policy information to VMA 113 via suitable interfaces 132 for effectuating channel joining, channel changing, etc. at appropriate bitrate streams or representations as will be set forth hereinbelow. In addition, a MABR back office node or element 134 may be coupled to MVMA 113 for providing information regarding all multicast services as well as corresponding MABR bitrates for each service supported in the network 100. According to the teachings of the present invention, MVMA 113 is operative responsive to the bandwidth allocation/update messages from various entities for joining of multiple service channels being provided to the subscriber premises, including MABR streams selected for downloading to the VD screens at selected bitrates based on channel packing techniques applied to the managed MABR pipe portion of the subscriber premises bandwidth pipe. As part of channel joining operations, MVMA 113 may therefore be configured to receive the segmented and gapped MABR streams for each service channel from SAG 120 and join the MABR streams at select bitrate representations for facilitating downloading operations by an HTTP server, as will be set forth in additional detail below.

Depending on implementation, one arrangement may involve providing the multicast ABR VMA (MVMA) functionality at a location upstream from IGMP router 114. Further, in such an arrangement (also referred to as "network agent implementation"), the MVMA functionality may be provided as a virtual machine function (i.e., in a virtualized environment running on a physical/hardware platform) instantiated at a network node or element. In a still further arrangement, the MVMA functionality may be provided in a cloud or at a CDN edge node. Regardless of where it is implemented, the MVMA functionality has the overall responsibility for joining multicast service channels, including channels designated for showing on VD screens of the subscriber's VR environment 105 at appropriate timing reference points, and having suitable bitrate representations selected in order to effectuate subscriber pipe bandwidth management in an optimal manner. Accordingly, one skilled in the art will recognize that although in the illustrated arrangement of FIG. 1, the MVMA functionality 113 is provided at the premises gateway (also referred to as "gateway agent implementation"), the teachings of the present application are not necessarily limited thereto.

Figure 14:
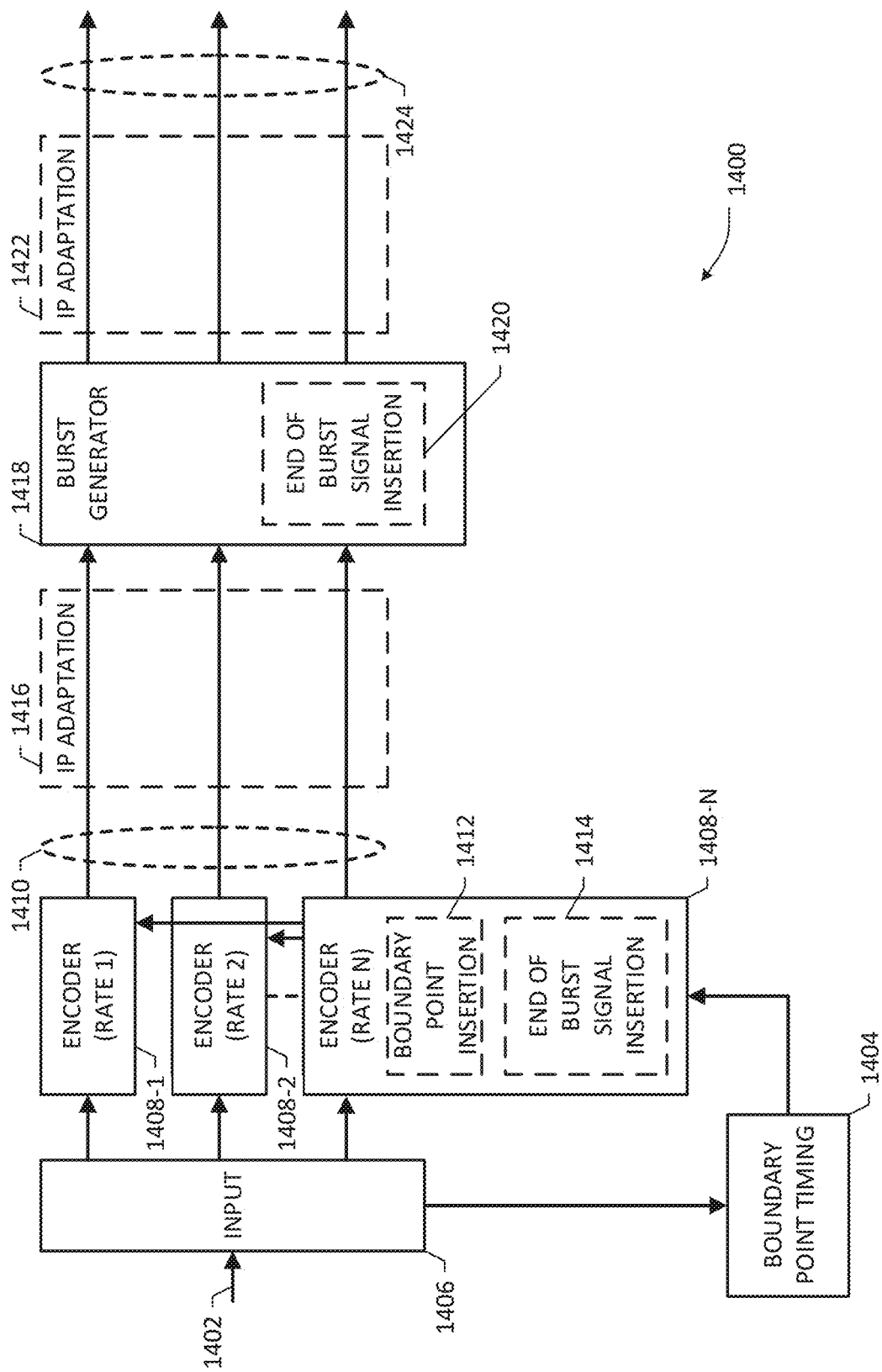
FIG. 14 depicts a block diagram of an apparatus for segmenting media/content channels for purposes of an embodiment of the present patent application.

Accordingly, regardless of where an example MVMA node is implemented, it is generally configured to receive appropriately joined segmented/gapped MABR streams corresponding to the multicast service channels from SAG functionality 120. Furthermore, SAG functionality 120 and encoder functionality 124 may be combined into an integrated MSF functionality as noted above. Attention is now directed to FIG. 14 that depicts a block diagram of an apparatus 1400 operative as a multicast ABR encoder and gapper for segmenting or packaging content channels for purposes of an embodiment of the present patent application. Apparatus 1400 is advantageously configured for creating a set of segmented stream representations and forming bursts with respect to a media service, which segmented streams may be provided with suitable inter-segment gaps that allow channel operations such as channel joining, channel leaving, switching, splicing in or splicing out, channel (re)multiplexing, etc. as part of downstream operations (e.g., at MVMA functionality 113 in conjunction with IGMP switch 114). In an example implementation, apparatus 1400 may receive an input feed 1402 of content per service (e.g., corresponding to any of channel source feeds 126-1 to 126-N in FIG. 1) at an input block 1406 that fans the feed to a plurality of encoders/transcoders 1408-1 to 1408-N, which generate, in parallel, a set of representations of the content at different bitrates. The representations can differ in video resolution depending on the bitrate of encoding. A timing generator 1404 outputs a signal that determines the boundary point of the segments. For example, this functionality may output a signal once per 50 frames (2 seconds), or at any other suitable time interval. The signal output by generator 1404 is applied to all of the parallel encoders 1408-1 to 1408-N for that service. Advantageously, the set of coders 1408-1 to 1408-N can close a Group of Pictures (GOP) and a boundary point insertion unit 1412 can insert in-band signaling such as a Random Access Point (RAP) and a Boundary Point (BP). The outputs of the set of coders 1408-1 to 1408-N are the set of representations 1410 which have time-aligned and/or frame-aligned segments. The representations 1410 are applied to a burst generator unit 1418 that creates the bursts separated by window periods (e.g., on the order of tens or hundreds of milliseconds). In operation, unit 1418 may be configured to play out data at a higher bit rate than the bit rate at which data was received to create the bursts and is operative to recognize the start and end of segments in the representations 1410 by detecting suitable signaling markers (e.g. the in-band BP signaling inserted by the encoders).

Multicast address information may be added at an IP adaptation stage, which can occur at, for example, a GW node hosting the MVMA functionality or at a node further upstream (e.g., in a network node implementation). Multicast IP datagrams have a destination IP address that is set to be in a range reserved for multicast. In FIG. 14, reference numeral 1424 refers to a bundle of IP-addressed streams generated by the apparatus 1400. It should be appreciated that the apparatus shown in FIG. 14 can operate on data at one of various possible levels. In one advantageous scheme, data may be encoded into Transport Stream (TS) packets at a normal rate and the burst generator unit 1418 operates on TS packets. Transport Stream packets can be adapted into IP packets before burst generator unit 1418 at adaptation block 1416, or after unit 1418 at adaptation block 1422. Another alternative is to form bursts before any packetization (at TS or IP level), but this may be less desirable.

FIG. 14 further illustrates several possible places where end of burst signaling can be added. Each encoder 1408-1 to 1408-N can include an end of burst signal insertion unit 1414 that adds an information element indicating the end of a burst into the encoded data, which includes a header of the TS packets. Alternatively, the burst generator unit 1418 can include an end of burst signal insertion unit 1420 arranged to insert an information element indicating the end of a burst into each of the bursts. Where end of burst signaling is provided as a multicast (with same or different address), the multicast can be generated at the edge network node.

Typically, a network operator may receive a media content service feed from a service provider, which may then be converted to streams or channels having the right characteristics for the edge distribution network and end users of the network. Although FIG. 14 shows a set of encoders/transcoders 1408-1 to 1408-N configured to operate upon an input data stream 1402 to form the multiple representations at different bitrates, such a stage may be bypassed where a set of representations at different bitrates already exist (e.g., by way of a separate encoder 124 as shown in FIG. 1). Accordingly, it should be understood that multiple representations for a media content service channel can be generated at a point of origin into the MABR communications network or could be supplied by a service provider, wherein the multiple representations can include various quality definitions, e.g., Standard Definition (SD), High Definition (HD), Ultra HD, etc., of the same content. A skilled artisan will recognize that the duration of the window period (e.g., 200 to 300 milliseconds or thereabouts) introduced in a segmented stream is of sufficient magnitude for a multicast receiver to leave one representation of the stream and join a different representation at a different bitrate or an entirely different media stream, at appropriate timing reference points, e.g., stream access points (SAPs), which may be accomplished by issuing appropriate IGMP Leave and Join message, without incurring too much latency or delay in VR environments.

A potential consequence of adding window periods or gaps to the transmitted streams is that the flow of content may become jittered beyond the level that normal packet transmission produces. This can be accommodated by buffering provided within an intermediary reception apparatus, e.g., MVMA functionality 113. The window period duration will influence the amount of jitter produced and so there is an optimum size that is related to the worst-case response times of the chain of routers/servers delivering the content. This time is taken for switches to recognize and implement all those steps that are required to keep the stream flowing, including the potential need for the multicast content to be found at or near the source server. For segment durations of the order of about 2 seconds, a possible value of the window period is around 330 milliseconds. The window size is a function of the responsiveness of the network to support multicast Leave and Join functions and it will be appreciated that the window period can be modified to a higher or lower value. More generally, the window period could have a value selected from the range of 0.1 ms and 10 seconds and, more advantageously, the range 10 ms-350 ms. As switches and routers increase in performance, it is possible that the window duration can be reduced to the lower end of the ranges stated above. In one implementation of the MVMA functionality, a 300 ms gap and suitable buffering may allow MVMA 113 (in the gateway agent implementation shown in FIG. 1) to perform IGMP Leave and Join operations for seamless switching of regular multicast service channel content with respect to channel tuning/change requests as well as tuning to appropriate service channels at scheduled recording times as per requests from VR-capable client devices. Whereas the segmented/gapped MABR streams for various service channels are received at receive ports of the MVMA node with multicast addresses changing on the fly, the downstream port addresses (i.e., to the premises) are fixed, corresponding the various service channels, to which IGMP Join operations are ultimately propagated from the subscriber stations. Additional details regarding multicast segmented stream formation and channel joining/leaving techniques may be found in commonly owned PCT Application No. PCT/EP2012/070960, titled "A METHOD AND APPARATUS FOR DISTRIBUTING A MEDIA CONTENT SERVICE", filed Oct. 23, 2012, in the name(s) of Anthony Richard Jones, now published as WO2014/063726, incorporated by reference herein.

Figure 2:
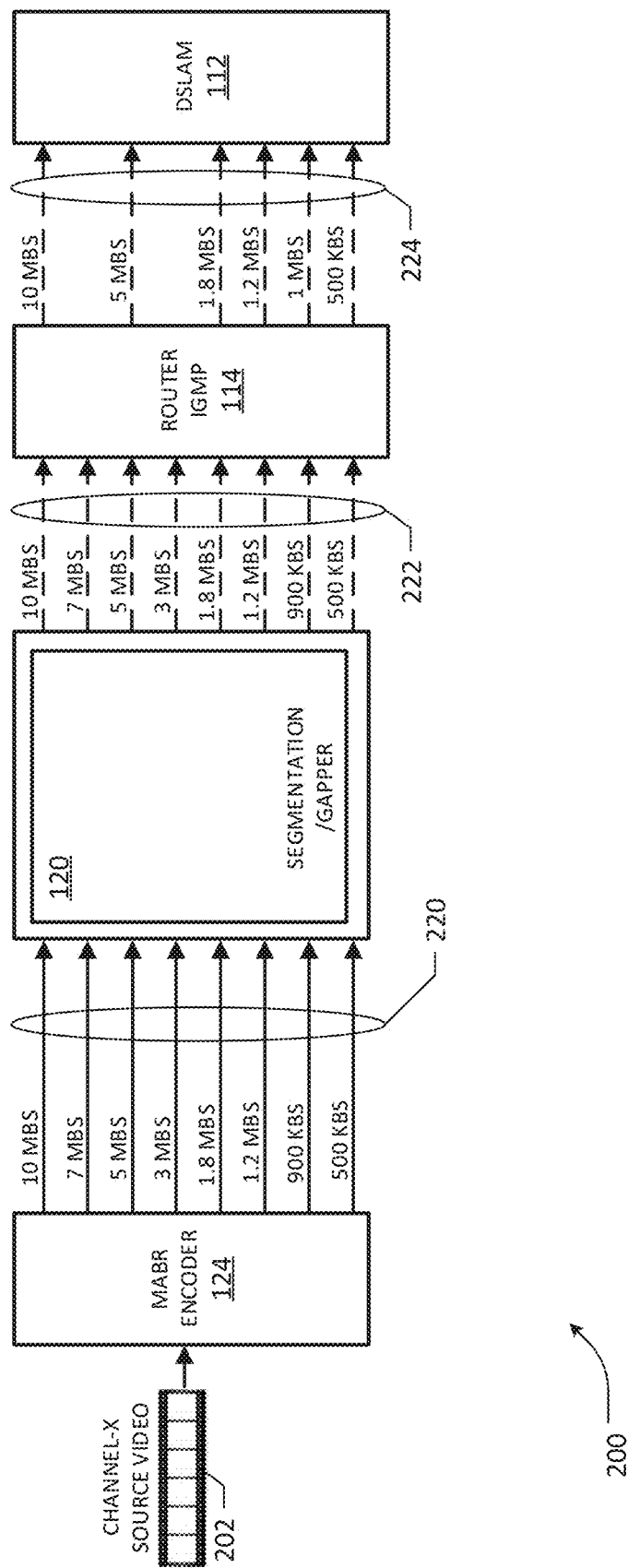
FIG. 2 depicts a network portion or subsystem that may be arranged as at least part of an apparatus for facilitating delivery of media content as multi-bitrate representations of gapped MABR segment streams in an MABR network architecture of FIG. 1 according to one embodiment.

FIG. 2 depicts a network portion or subsystem 200 that may be arranged as at least part of an apparatus for facilitating delivery of media content as multi-bit gapped MABR segment streams in a MABR network architecture 100 of FIG. 1 according to one embodiment. In particular, subsystem 200 shows further details of an example implementation of SAG functionality 120 that is operative to generate a set of gapped streams (e.g., having ~300 ms gaps between SAPs of two segments (i.e., inter-SAP gap)) with respect to a particular service channel feed 202 that may be tuned to by a user operating a VR-capable client device of the subscriber premises 102 for presentation on a VD screen, wherein the channel feed 202 is illustrative of the service channels 126-1 to 126-N shown in FIG. 1. Consistent with the description above, the channel feed 202 may be received by MABR encoder/transcoder 124 for generating a plurality of encoded (and unsegmented) streams encoded at, e.g., 10 Mbs to 500 Kbs (i.e., multiple bitrate or multi-bitrate representations) as exemplified by reference numeral 220, which may be processed as corresponding segmented streams 222 by the segmenter/packager 120.

In one embodiment, SAG 120 may be configured to transmit all possible bitrates for services that are identified as multicast services to the next element downstream as per the standard multicast operations. Where the MVMA functionality is embodied in a network agent implementation, it is typically the downstream recipient of the regular multicast gapped/segmented streams 222 with respect to each service channel. In a gateway agent implementation, such streams are provided to the IGMP router 114, as shown in the illustrative arrangement of FIG. 2, wherein the IGMP router 114 may pass along streams for only those channels that are active, as shown by example downstream bundle 224 propagating towards DSLAM node 112 (and ultimately to the premises gateway node's MVMA functionality, which issues suitable Join/Leave messages with respect to the particular segment streams having the select bitrate representations). As will be described below, the MVMA functionality is modulated based on, inter alia, messages provided by the VR-capable device effectuating the VR environment 105 in reference to the subscriber's field of view within the VR environment 105 relative to the placement of VD screens 107-1 to 107-M therein.

Figure 3A:
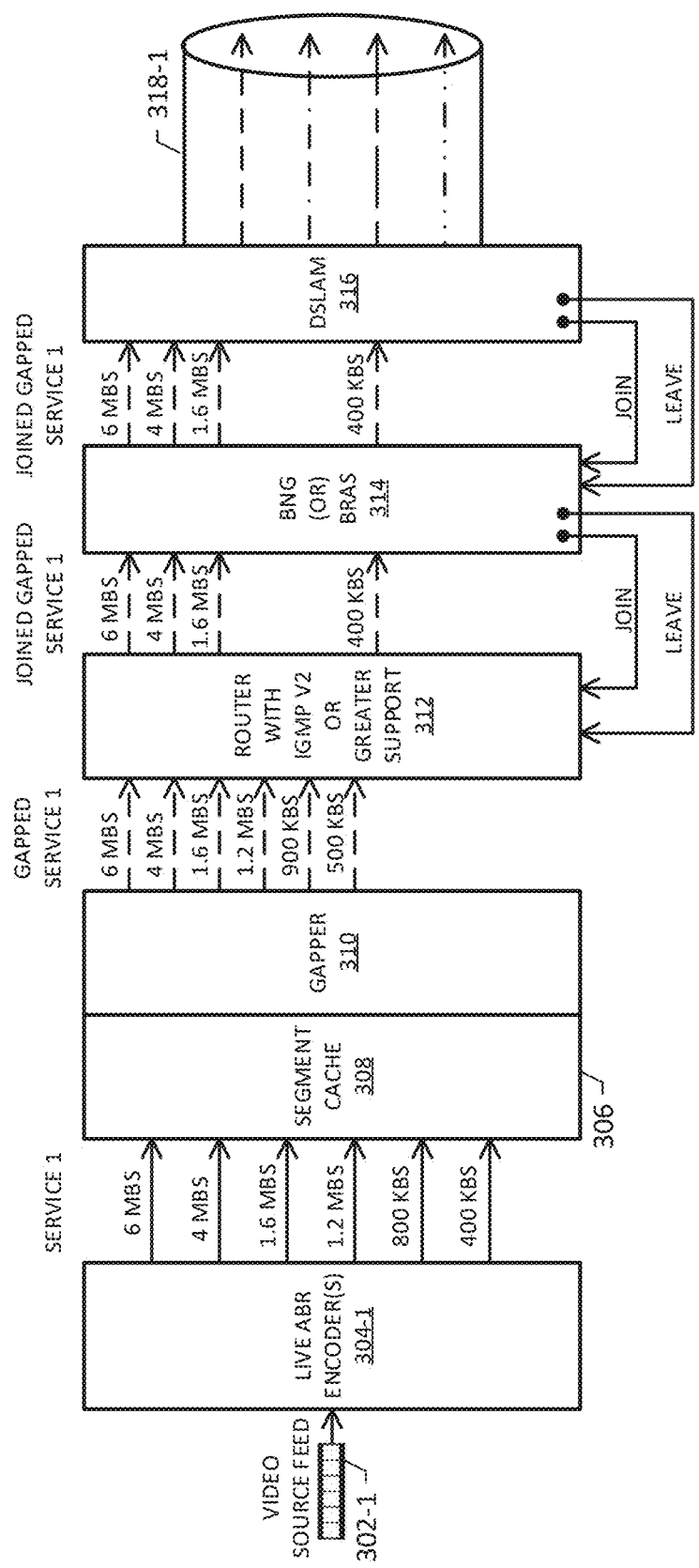
FIGS. 3A-3C depict further details of a network portion of an example MABR network architecture of FIG. 1 for providing gapped MABR segment streams as media content channels to a plurality of subscriber premises according to an embodiment for purposes of the present patent application.
Figure 3B:
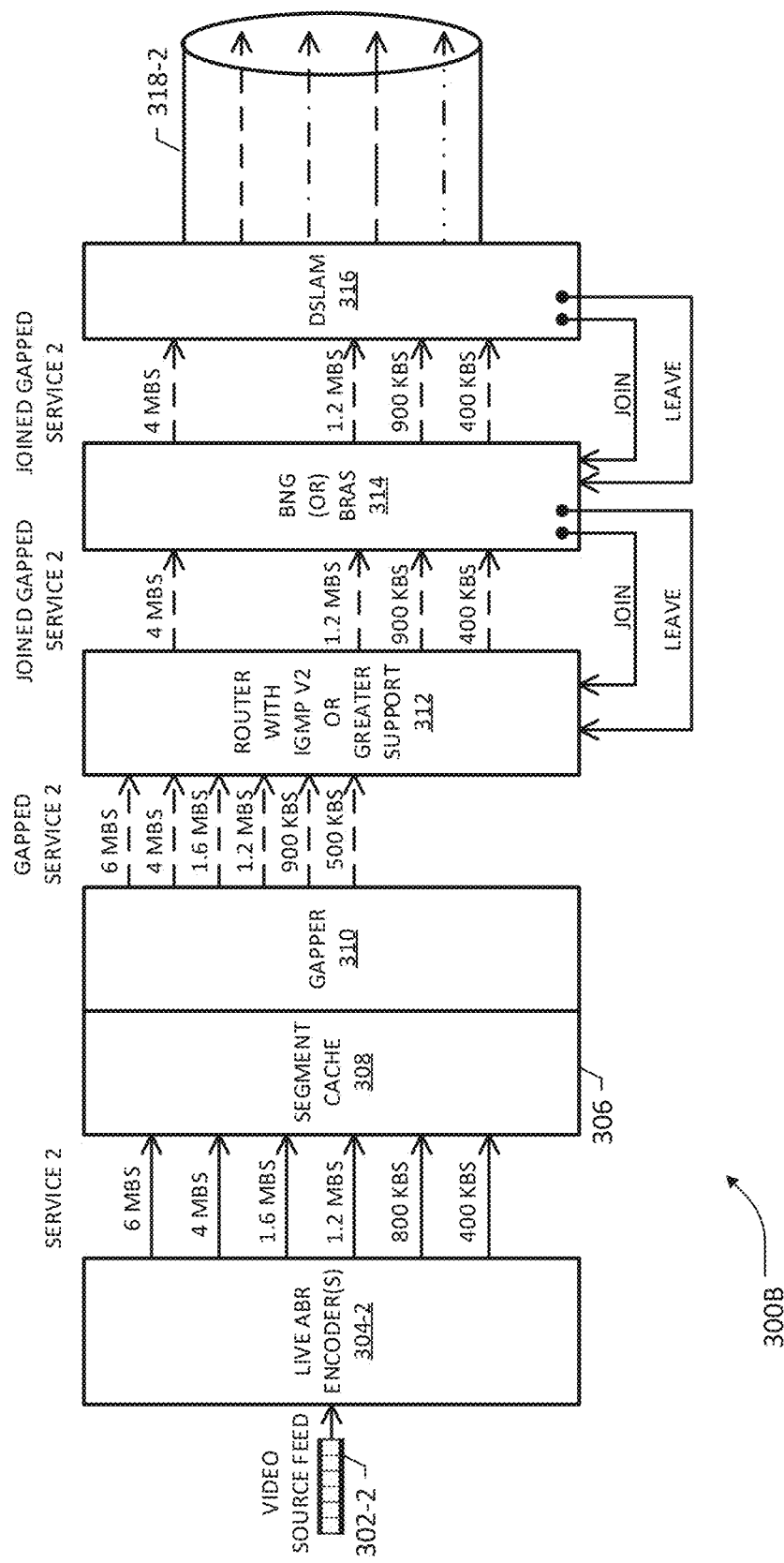
Figure 3C:
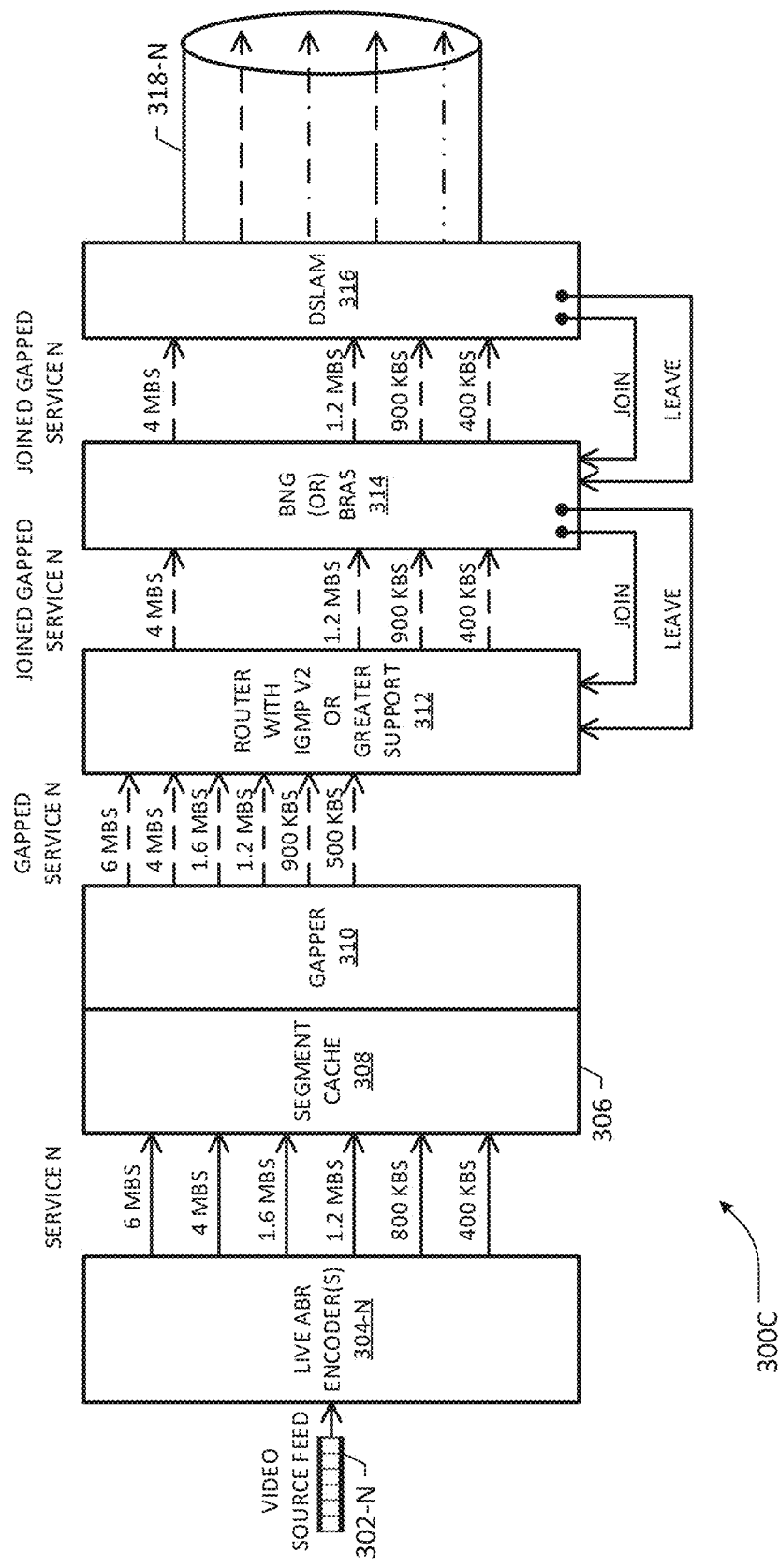

FIGS. 3A-3C depict further details of a network portion comprised of sub-portions 300A-300C of an example MABR network architecture of FIG. 1 for providing gapped MABR segment streams as media content channels to a plurality of subscriber premises via respective broadband delivery pipes 318-1 to 318-N according to an embodiment for purposes of the present patent application. Various video source feeds 302-1 to 302-N are representative of N media content channels or service channels that are provided to corresponding ABR encoders 304-1 to 304-N (which in an example implementation may be integrated into one or more encoder blocks), that in turn encode multi-bitrate representations of each service channel (e.g., 6 Mbs to 400 Kbs), similar to the description provided hereinabove. A segmentation/gapper unit 306 comprises a segment cache 308 that stores the segmented streams may be provided with a suitable gapper 310 as described previously. For example, N gapped services in multiple representations are illustrated wherein an example segment size or duration may comprise 4 seconds, with 300 ms gap between SAPs. IGMP 312 and BNG 314 (also referred to as a broadband remote access server or BRAS) are operative to join different representations of each service to DSLAM 316, which is operative to effectuate a point-to-point communications link to each subscriber premises via respective pipes 318-1 to 318-N. It should be noted that each pipe carries only one single bitrate per active service channel (i.e., the media content channel being viewed on a VD screen). Accordingly, each broadband pipe may be carrying different services (as single bitrate segmented streams) and at different bitrates to the subscriber premises.

Figure 4A:
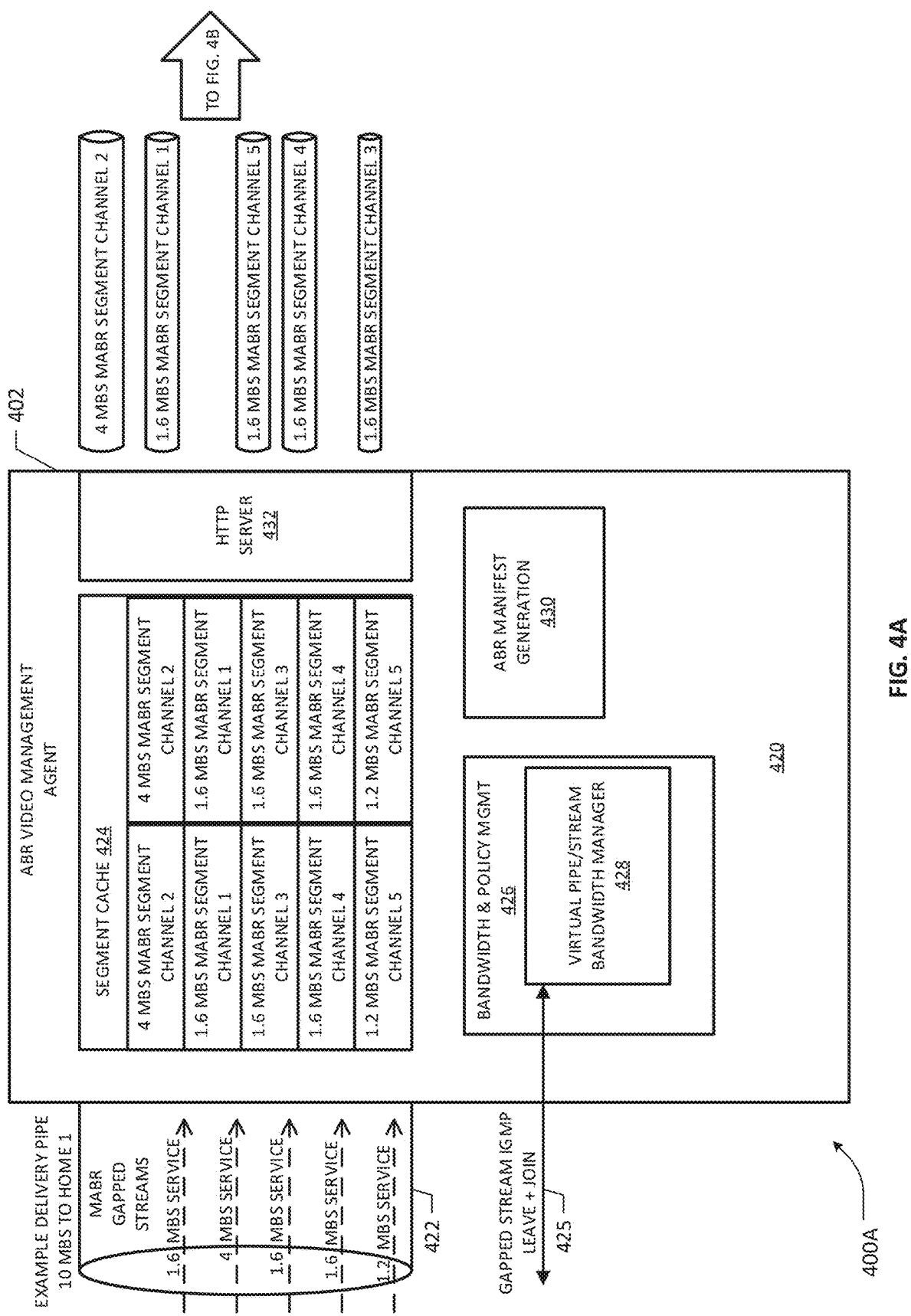
FIGS. 4A and 4B depict block diagrams of a subscriber premises gateway or node and a subscriber premises configured according to an embodiment of the present invention for delivering select single bitrate representations of the media content channels to VD screens of a subscriber's VR environment in an example architecture.
Figure 4B:
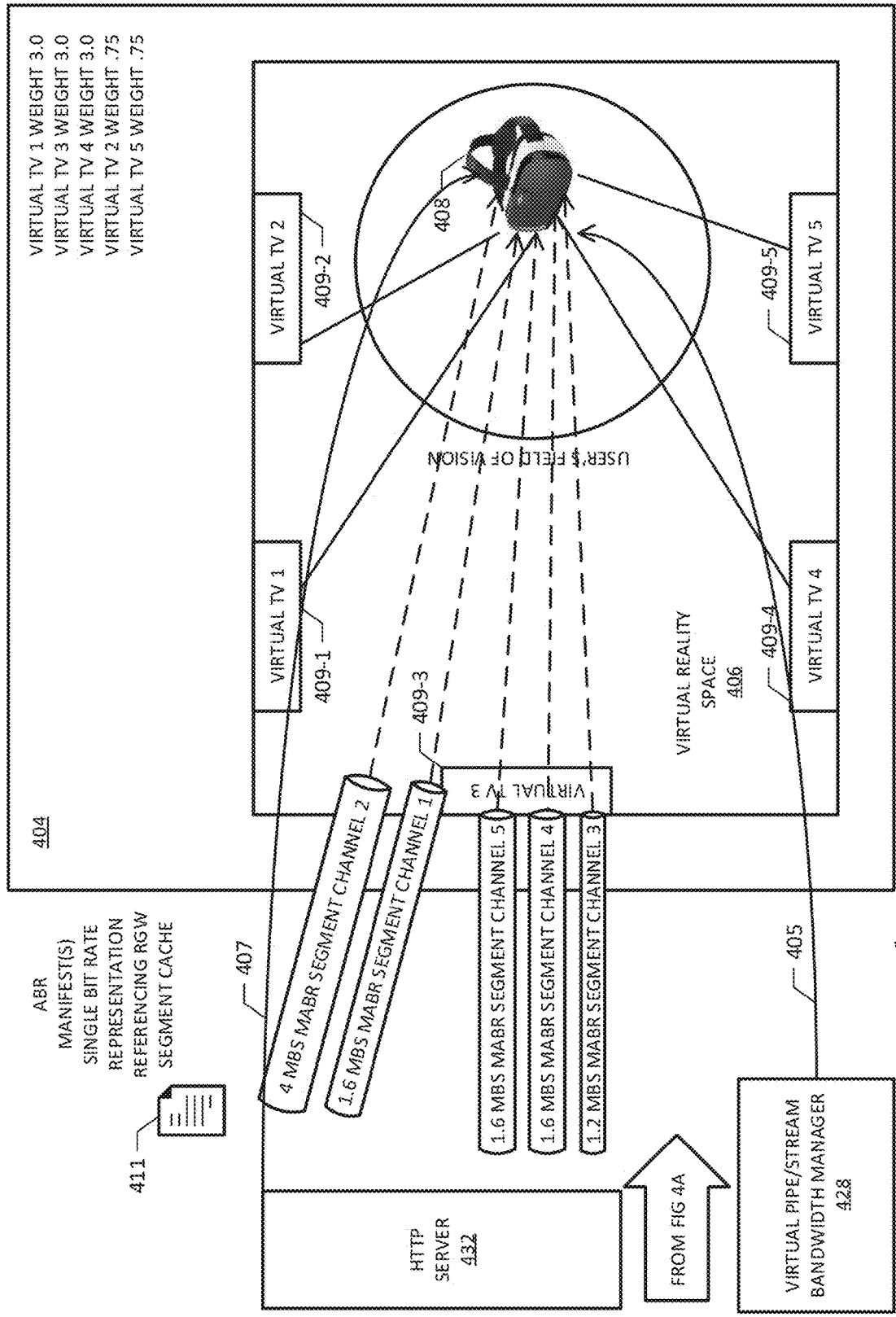

FIGS. 4A and 4B depict a system diagram of a gateway implementation 400A/400B of an embodiment of the present invention wherein a block diagram of a subscriber premises gateway or node 402 may be configured according to the teachings of the instant patent application. Broadly, GW 402 includes a VMA node or functionality 420 (analogous to MVMA 113 of FIG. 1) that is operative to generate a single bitrate manifest (in order to prevent the client device from choosing the bitrates as is typical in an ABR environment), and to facilitate delivery of the streams, segment by segment, requested by the clients while controlling the bitrate(s), via HTTP-based downloading. Thus, an embodiment of GW 402 of the present invention may be advantageously configured for delivering select single bitrate representations of the media content channels to VD screens of a subscriber's VR environment in an example architecture without the greedy behavior associated with typical ABR clients (which can cause undesirable latency/lagging issues in VR environments).

It will be recognized that according to one embodiment the MABR VMA functionality 420 may be realized as a virtual function or virtual machine on a host hardware/software platform (e.g., GW 402) or in a cloud data center. As described previously, a plurality of MABR gapped/segmented streams comprising various bitrate representations of multicast service channels may be received by node 402 at corresponding multicast IP addresses, which may be changing on the fly depending on the IGMP Join/Leave operations. A segment cache 424 is provided wherein a plurality of segments corresponding to one or more active multicast service channels having potentially different bitrate qualities may be stored. A virtual pipe or stream bandwidth manager 428 that may be part of an overall bandwidth and policy management module 426 is operative in conjunction with the segment cache 426 to manage a subscriber premises bandwidth pipe or pipe portion allocated for multicast IPTV/video services delivered to VD screens via HTTP download/delivery, wherein suitable IGMP Join/Leave messages may be generated/provided via interface 425 with respect to selected bitrate streams By way of example, subscriber premises 404 illustrates a VR device 408 operative with a VR-capable client (not specifically shown) that can create or otherwise effectuate a VR space 406 according to known or heretofore unknown VR technologies, wherein virtual TV screens 409-1 to 409-5 (e.g., representative of VD screens 107-1 to 107-M shown in FIG. 1) are illustrated. In accordance with the teachings of the present invention, the virtual pipe and stream bandwidth manager 428 is operative to effectuate channel/stream joining and leaving operations with respect to suitable bitrate representations of gapped service channel streams under IGMP Join and Leave operations responsive to, for example, stream weight updates received from the VR device 408 via interface 405. An ABR manifest generator 430 is configured for generating a manifest 411 indicating single bit representations of each of the joined or active media content channel segments stored in the segment cache 420 of the gateway node 402, which manifest may be provided via interface 407 to the client/VR device 408. A HyperText Transfer Protocol (HTTP) server 432 is configured to deliver segments of the media content channels at respective single bitrates selected based on a channel bandwidth annealing mechanism using stream weight updates received from the VR device 408. By way of a non-limiting example, suitable http-based request and response messages (e.g., http get requests) may be generated for obtaining media content segments for presentation on the VD screens. In one arrangement, single bitrates may be selected for optimally allocating the bandwidth of the managed video pipe serving the virtual TV screens of the VR environment based on a channel annealing mechanism as will be set forth in detail below.

Figure 5:
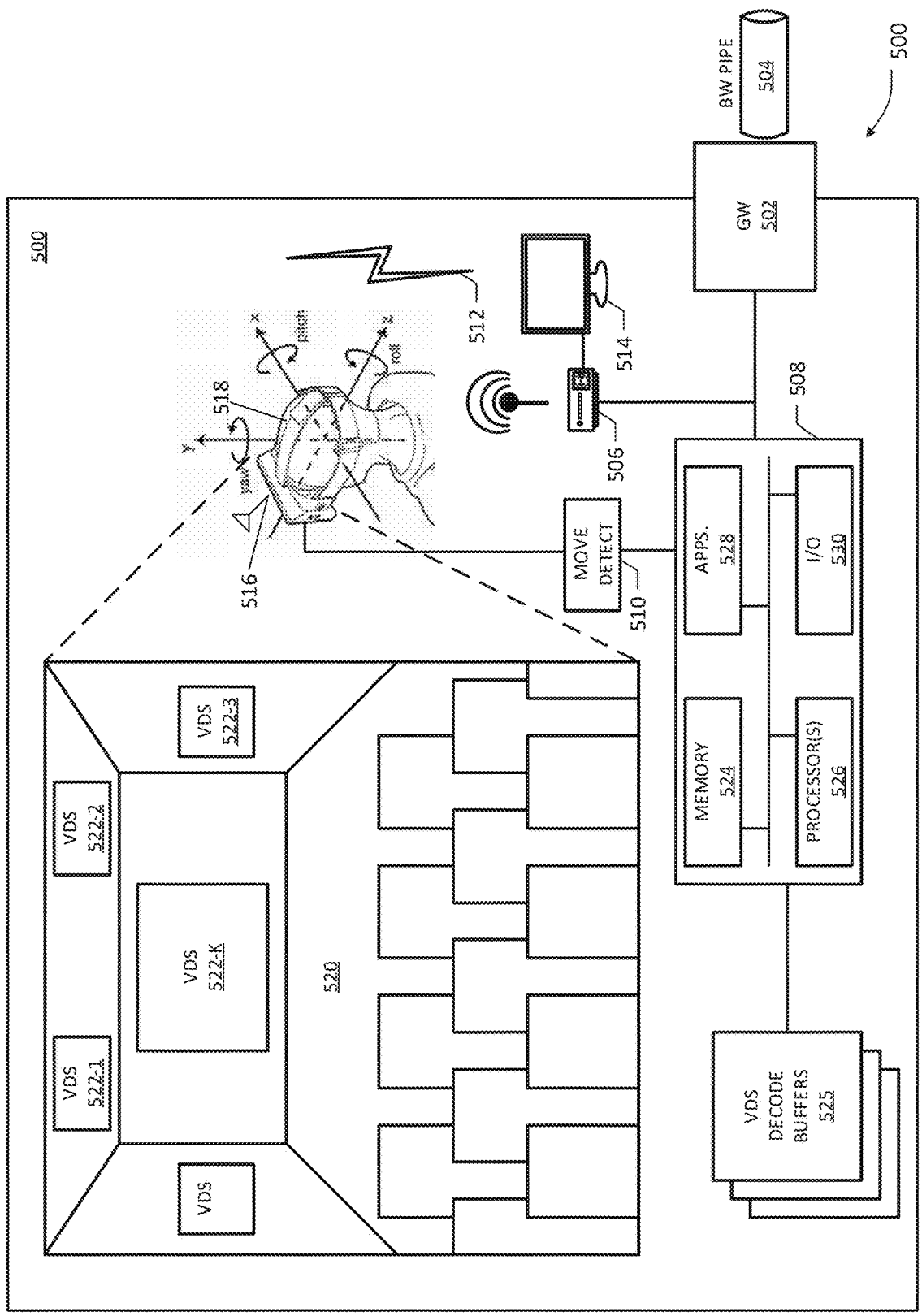
FIG. 5 is an example VR environment effectuated by a VR apparatus device of a subscriber for presenting a plurality of VD screens according to an embodiment for purposes of the present patent disclosure.

Turning to FIG. 5, depicted therein is an example VR environment effectuated by a VR device of a subscriber for presenting a plurality of VD screens according to an embodiment for purposes of the present patent disclosure. GW 502 associated with subscriber premises 500 is served by a delivery pipe 504 for providing media content channels to VD screens 522-1 to 522-K effectuated in a VR theater or environment 520. As one skilled in the art will recognize, virtual reality (or VR) is a computer technology that uses software-generated realistic images, sounds and other sensations to replicate a real environment or an imaginary setting, and simulates a user's physical presence in the simulated environment to enable the user to interact with any portion of the space. A person using virtual reality equipment is typically able to "look around" the artificial world, move about in it and interact with features or items that are depicted. Virtual realities artificially create sensory experiences, which can include sight, touch, hearing, etc. and may simulate real world scenarios such as, e.g., virtual coffee shops, virtual sports bars, multi-screen theaters, in addition to 3-D environments such as virtual worlds created for gaming. An example VR apparatus may comprise a CPE hardware platform 506 served by GW 502, such as a gaming console, laptop, or a smartphone, for example, that executes one or more VR-based gaming or media applications to provide suitable signals to one or more VR-enabling devices such as a display device 516 mounted to or on a user's head 518. Additional examples of such devices may comprise visors, goggles, wired headgear or helmets, masks, etc. that can display or effectuate an immersive VR space surrounding the user. In an example display device, there maybe additional instrumentation such as a gyroscope, accelerometer and a magnetometer, etc., to facilitate head tracking, i.e., when the user 518 moves her head, the field of view around the simulated space may move accordingly. Thus, in a head-tracking VR headset, the cone of view or field of view in front of the user shifts as the user looks up, down and moves side to side or angles her head. An example system may include the so-called 6 DoF (six degrees of freedom) arrangement that can plot the user's head in terms of x, y and z axes to measure head movements forward and backwards, side to side and shoulder to shoulder, also known as pitch, yaw and roll, which may be used for tracking the user's point of view within the VR space.

By way of illustration, CPE 506 may be embodied as a platform 508 including one or more processors 526, volatile and nonvolatile/persistent memory 524, input/output (I/O) interfaces 530 (e.g., touch screens, gaming controllers, hand-tracking gloves, etc.), as well as one or more media/gaming applications 528 that can effectuate VR space 520 for the user 518 wearing head-mounted display (HMD) 516. In one example arrangement, HMD 518 may be wirelessly coupled to CPE 506 via wireless interface 512. Additional VR-capable CPE 514 (e.g., a tablet/smartphone) may also be separately or optionally provided. Example VR apparatus 514/516 operating in conjunction with HMD 516 may be operative to effectuate VR space 520 that is an immersive VR environment in which the user 518 can move her point of view in full 360° in one of a vertical plane, a horizontal plane, or both planes, defined in the VR environment. In an additional or alternative arrangement, VR apparatus 514/516 operating in conjunction with HMD 516 may be operative to effectuate VR space 520 that may be immersive but the user 518 can only move her point of view in less than 360° along any one of the axes.

As noted above, VR space 520 may simulate a VR environment having multiple VD screens (VDSs) 522-1 to 522-K that may comprise one or more virtualized TV screens, virtualized gaming monitors, virtualized tablets, virtualized phablets, virtualized computer monitors, and virtualized projector screens, that may have various sizes, shapes, form factors, and aspect ratios, wherein each may be adapted to display a media content channel according to the corresponding VR media/gaming applications being run by the VR apparatus 514/516. In one arrangement, example VD screens may be presented or placed within the VR space across a front wall, sidewalls, top ceiling and a back wall, as well as along a floor, at different distances (e.g., predetermined) from the viewer's head and from one another, to simulate a variety of real-world settings and scenarios, e.g., a sports bar with several TV screens showing various TV channels. Further, such VD screens may be "turned on" or "turned off" in a VR application, e.g., by the subscriber or the subscriber's guest (in a shared VR space, for instance). One will recognize that such media content channels may comprise live TV channels, time-shifted (TS) TV channels, place-shifted (PS) TV channels, gaming channels, VOD channels and/or public service announcement channels. Additionally, a plurality of decoder buffers 525 may be provided as part of an example VR platform corresponding to the plurality of media content channels being shown on the VDSs of a VR spatial environment.

A movement detection and stream weight assignment module 510 is operative to detect a movement in a point of view of the user/subscriber 518 with respect to the VR space 520 and assign/adjust weights of the VDSs and associated media channels based on the VD screens' placement relative to where the subscriber's point of view is and/or whether the VD screens are within the subscriber's field of view/vision, as the subscriber 518 shifts her gaze from one VD screen to another within the VR space 520. As noted above, the stream weights or their updates may be advantageously provided to GW 502 for facilitating dynamic bitrate control as will be described in detail further below.

Broadly, an example embodiment of the present invention relates to adjusting, updating, (re)assigning stream weights or priorities given to or otherwise associated with media content channels showing on VD screens of a VR environment based on where the user/subscriber is looking, and utilizing the updated or (re)assigned stream weights in a channel annealing mechanism to determine or otherwise select single bitrates that optimize the bandwidth allocation of a media pipe serving the VR environment. In accordance with the teachings of the present invention, movement in the subscriber's point of view may be determined by the subscriber's VR headset or in combination with the VR platform responsive to the subscriber's head movement. In some arrangements, ocular movement may also be monitored and used in combination with the head movement for updating the stream weights. If a VD screen is close to where the subscriber is gazing, the media content channel showing on that VD screen may be assigned or updated to have a higher weight. On the other hand, if a VD screen is away from the subscriber's gaze, the media content channel associated with that VD screen may be given a lower weight. Further, if a VD screen is outside the subscriber's field of view or vision (FOV), e.g., beyond peripheral vision, the media content channel may be given a lowest minimum weight in order to conserve the bandwidth of the MABR media pipe serving the VR environment. In still further embodiments, media content channels on the VD screens that are completely outside the subscriber's FOV may be suspended and time-shifted for playback at a later time when the VD screens do come into the subscriber's FOV as the subscriber scans the VR space and gazes across the multiple VD screens to watch different channels, e.g., depending on audiovisual cues provided in a program. Further details regarding these and other embodiments will be described below by taking reference to the remaining drawing Figures of this disclosure.

Figure 6A:
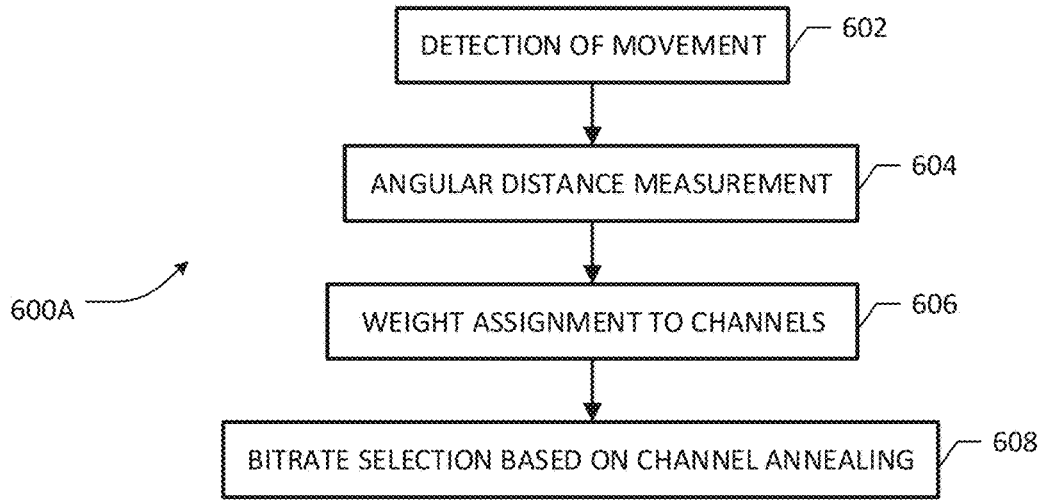
FIGS. 6A and 6B are flowcharts of various blocks, steps and/or acts that may be (re)combined in one or more arrangements, with or without additional flowcharts of the present disclosure, for facilitating a bitrate control scheme in respect of delivering media content channels to VD screens according to an embodiment.
Figure 6B:
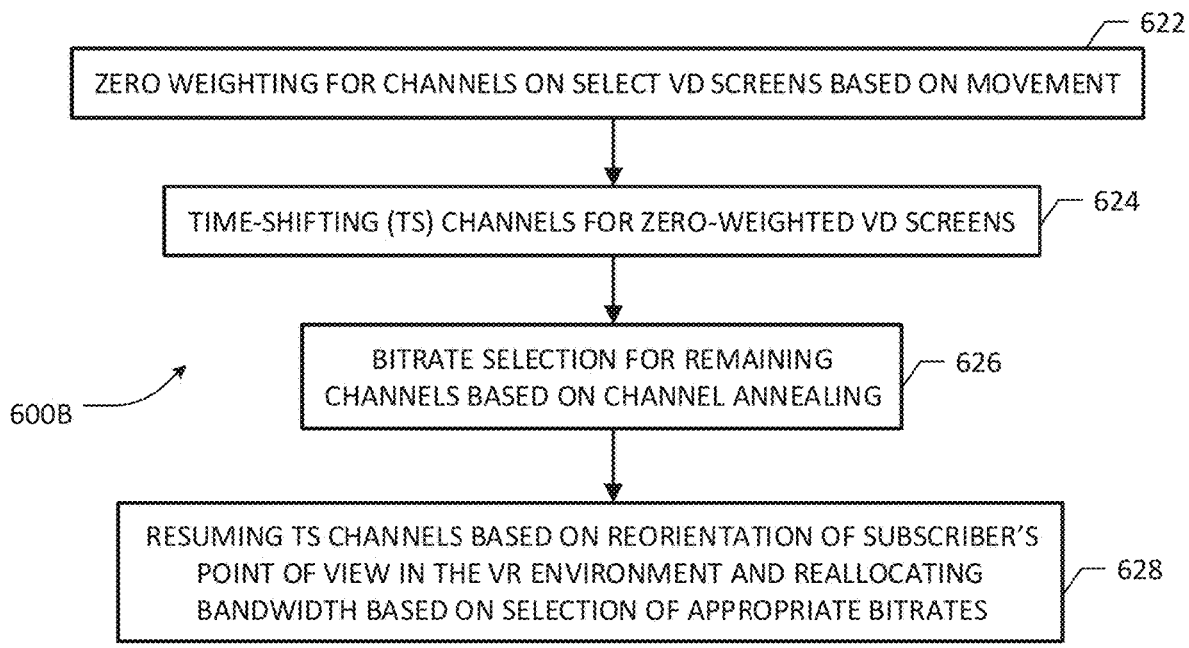

FIGS. 6A and 6B are flowcharts of various blocks, steps and/or acts that may be (re)combined in one or more arrangements, with or without additional flowcharts of the present disclosure, for facilitating a bitrate control process in delivering media content channels to VD screens according to an embodiment. Process 600A shown in FIG. 6A commences with detection of a movement in a subscriber's point of view or line of view within a VR environment comprising a plurality of VD screens (block 602). Angular distances of the various VD screens may be measured, e.g., in radians or degrees, from a reference axis or line within a field of view of the VR environment (block 604). Given the 3D immersive VR environment, which may be spherical or otherwise curvilinear, the field of view of the subscriber may be partitioned into various sectors or cones (depending on whether angles in 2D or 3D are being measured) with respect to the reference axis. A predetermined (re)assignment of weights or updates may be provided (block 606) for the VD screens and corresponding media content channels depending on where the VD screens are within different sectors of the FOV, with the media content channels on the VD screens closest to the reference axis being accorded a highest value. As the VD screens that are progressively farther from the reference axis (either in horizontal or in vertical plane) capture less attention of the subscriber, the media content channels showing thereon may therefore have progressively lower weights. In one embodiment, even those VD screens that are outside the subscriber's FOV, e.g., those that are behind the subscriber in the VR space, may be given a non-null weight (i.e., non-zero weight) so as to ensure that all the bandwidth of the media pipe is allocated. Thereafter, the assigned/updated weights may be provided by the VR device/headset to a bandwidth annealing mechanism executing at the gateway for facilitating selection of a single bitrate per media content channel (from the available multi-bitrate representations), e.g., allocation or reallocation of bandwidth, as set forth at block 608.

In another embodiment, process 600B shown in FIG. 600B involves assigning a null weight to the media content channels that are on VD screens determined to be completely outside the subscriber's FOV (block 622). Such null-weighted media content channels may be time-shifted (block 624) according to the teachings of the present patent disclosure. Weights associated with the remaining non-time-shifted media channels may be used in channel annealing for selecting proper bitrates (i.e., selecting a single bitrate representation per media content channel), as set forth at block 626, whereupon the suitable bitrate stream may be joined by the gateway and the segments thereof may be cached for downloading to the VD screens via HTTP delivery. As and when the subscriber's point of view may be reoriented within the VR space, one or more TS media content channels may resume playback, wherein the bandwidth may be reallocated based on the reassigned or updated weights provided by the VR device (block 628), which will be described in additional detail further below.

Figure 7:
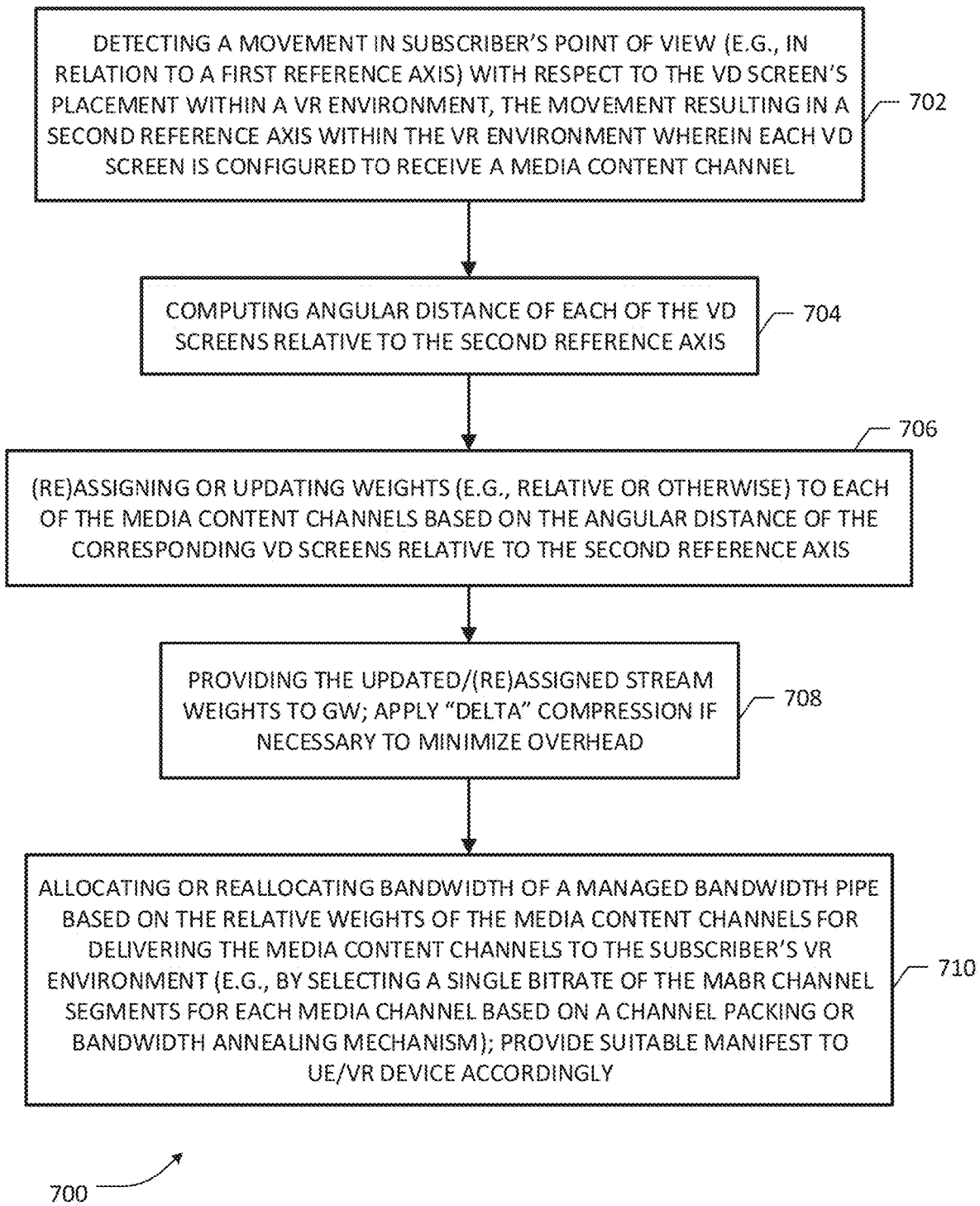
FIG. 7 is a flowchart of various blocks, steps and/or acts that may be (re)combined in one or more embodiments for facilitating a bitrate control scheme in additional detail.

FIG. 7 is a flowchart of various blocks, steps and/or acts that may be (re)combined with additional flowcharts of the present patent disclosure in one or more embodiments for facilitating a bitrate control scheme 700 in additional detail. At block 702, a movement in a point of view of a subscriber in relation to a first reference axis with respect to the VD screens' placement within a VR environment may be detected, determined or otherwise obtained, e.g., using various known or heretofore unknown tracking technologies operative in a VR application. One skilled in the art will recognize that in one embodiment when the VR environment is first effectuated with a number of VD screens presented/placed at several locations within the VR space, the subscriber's initial gaze may define a first reference axis in the 3D scenario simulated in the VR environment. Further, a first reference axis may be any arbitrary, initial line of view or sight of the subscriber (e.g., at any time during a VR session) from which the subscriber's point of view moves within the VR spatial environment as her head moves (e.g., by a designated amount and/or within a predetermined amount of time), resulting in a second reference axis within the VR environment wherein each VD screen is configured to receive a media content channel. At block 704, angular distances (e.g., either 3D or 2D angles) of each of the VD screens relative to the second reference axis may be computed using applicable curvilinear geometries (e.g., spherical, ellipsoidal, 3D-parabolic spaces, etc.) relative to creating the simulated VR spatial environment. Responsive to the determination of the angular distances (which may be computed along the vertical and/or horizontal planes, as noted previously), stream weights, priorities or other metrics (e.g., relative or otherwise) may be assigned to, initialized and/or updated for each of the media content channels based on the angular distance of the corresponding VD screens relative to the second reference axis (block 706). One skilled in the art will recognize that partitioning of the VR spatial environment based on such angular distances relative to a reference axis may be effectuated at varying levels of granularity. Further, the stream weights may be determined, configured or modulated based on subscriber, operator and/or content provider policies as well in some example embodiments. As noted previously, the subscriber's VR device is operative to provide the updated/assigned stream weights to a gateway node serving the subscriber premises (block 708), preferably sending only those updates/weights that have changed since prior updating (e.g., a "delta" compression may be applied), in order to minimize the control communications overhead. Responsive to the received stream weight updates, bandwidth of a managed bandwidth pipe may be (re)allocated based on the relative weights of the media content channels for delivering the media content channels to the subscriber's VR environment (e.g., by selecting a single bitrate of the MABR channel segments for each media channel responsive to a channel packing or bandwidth annealing mechanism), whereupon appropriate manifest(s) may be provided to the VR device, as set forth at block 710.

One skilled in the art will further recognize that although angular distances or deviations are specifically set forth herein, suitable metric distances (e.g., distances between two lines projected on a curved space) may also be used in weight assignment computations in an alternative embodiment of the present invention.

An example channel annealing scheme of the present invention is operative to choose or converge to a model in which bandwidth of a managed MABR pipe serving the VD screens of a VR environment may be redistributed optimally among the various media content channels sharing the assigned pipe based on the updated stream weights that may be continually changing responsive to the head movements of the VR subscriber. Accordingly, an already existing channel of the managed MABR pipe may experience lowering of its bandwidth, e.g., all the way down to its default value or to some other intermediate value in order to fit within the pipe, depending on its weight. Additionally or alternatively, bandwidth of the channels that are not being watched (e.g., in the context of time-shifted media channels) may be repurposed or reclaimed in order to improve the quality of the other channels of the media pipe. In one example implementation, selection of single bitrates of channels that can be packed into the media pipe serving the VR environment (which may be referred to as a "VR media pipe" that may be part of an overall subscriber premises bandwidth pipe), may be based on what is referred to herein as "inadequacy metric" that is used for selecting which streams are eligible for a bandwidth upgrade during annealing (i.e., iteratively changing bandwidth until no further optimal reallocation can be made). Basically, the inadequacy metric (IM) may be considered as a measure of how far out of balance an allocation to a stream is with regard to its priority/weight and the priority/weight of the other streams. Several examples of determining the inadequacy metric are listed below, although other measures of an imbalance can be used in practicing the disclosed embodiments. In one example methodology, given a list of channels and the ABR bandwidths available for each channel, the channels are first sorted by their priority (or other parameters relating to channel weight). A select minimum bandwidth version of the channel is added to the pipe plan. If the channel's minimum bandwidth does not fit (i.e., the pipe is overbooked), then it does not go in the pipe plan and the process moves on to the next channel for further iterations to see how much of an upgrade can be made to the pipe plan. As the channels in the list are sorted by the inadequacy metric, the process can start with the most inadequate channel allocation for attempting to upgrade the bandwidth to the next highest available version of a channel. As pointed above, if the upgrade does not fit within the pipe, that upgrade is skipped and the scheme proceeds to the next most inadequate channel. One skilled in the art should realize that a further variation in optimization may be where channels whose upgrade is impossible, they can be removed from consideration for the rest of the annealing loop. Once a channel is selected for upgrade, the inadequacy metric is recomputed and the scheme restarts the annealing loop, which may be configured to end when no channels can be upgraded to fit into the bandwidth allocation of a MABR virtual pipe serving the VR environment.

Several different inadequacy metrics can be implemented in practicing the foregoing scheme. In one example, the metric may be defined as a ratio of channel priority or weight to the bitrate, which guides the channel allocation toward a situation where each channel has a share of the bandwidth of the pipe proportional to its weight or priority. Another formulation could be a ratio of channel weight to its "quality", which can be quantized in some fashion (e.g., some function of the bitrate). A more complicated version might take into account the amount of action in a scene of the content, allowing bitrates to vary according to content. For instance, an action scene might get more of the pipe until the stream reaches a calmer moment in the content, at which point it returns bandwidth to the other streams in the pipe. In a still further variation, the IM may be defined as a function: IM=1/rate∥weight, where ∥ means a relative comparison of entities having different components.

For example, when comparing two metrics such as a1∥b1 and a2∥b2, we compare the first parts first. If the first parts are unequal, we use the first parts to determine the comparison. If the first parts are equal, then we compare the next part to determine the comparison. So, by way of illustration, 1∥100<2∥1, but 1∥100>1∥5. Given that definition, it can be seen that the 1/rate∥priority metric may result in all streams being allocated similar bandwidth. Regardless of how the IM is defined, each iteration of the annealing loop may be configured to upgrade the channel with the least bandwidth, and when there are multiple channels at the least bandwidth, it will upgrade the highest priority one first.

It should be noted that at least some of the bandwidth allocation and/or reallocation operations as well as channel joining operations responsive thereto set forth in the present disclosure make take place using a number of foregoing channel packing techniques that may involve pipe modeling schemes based on various pieces of parametric information such as composite device priorities (CDP), IM parametrics, and the like, potentially/preferably in conjunction with operator-, subscriber-, and/or content-based policy rules, wherein, for example, a new channel or an existing channel's particular bitrate representation may be added to the VR bandwidth pipe based on inadequacy metrics used for selecting which streams are eligible for a bandwidth upgrade during annealing (i.e., iteratively changing bandwidth until no further optimal reallocation can be made).

In some additional or alternative embodiments, a CDP-based channel packing may be employed in an annealing process involving MABR and/or UBAR video streams of the video pipe serving a subscriber premises. Additional details with respect to bandwidth divider implementations (e.g., dividing the total video pipe into a MABR portion and a UABR portion), as well as metrics-based stream management may be found in one or more of the following commonly owned U.S. patent application(s): (i) "UNICAST ABR STREAMING" (Ericsson Ref. No.: P43082-US1), application Ser. No. 14/246,920, filed Apr. 2, 2014, in the name(s) of Christopher Phillips et al., and (ii) MERGING MULTICAST ABR AND UNICAST ABR WITH PROGRESSIVE DOWNLOAD ABR IN A CUSTOMER PREMISES DEVICE WITHIN THE SAME VIDEO DELIVERY PIPE" (Ericsson Ref. No.: P43011-US1), application Ser. No. 14/246,880, filed Apr. 2, 2014, in the name(s) of Christopher Phillips et al., which are hereby incorporated by reference.

Figure 8A:
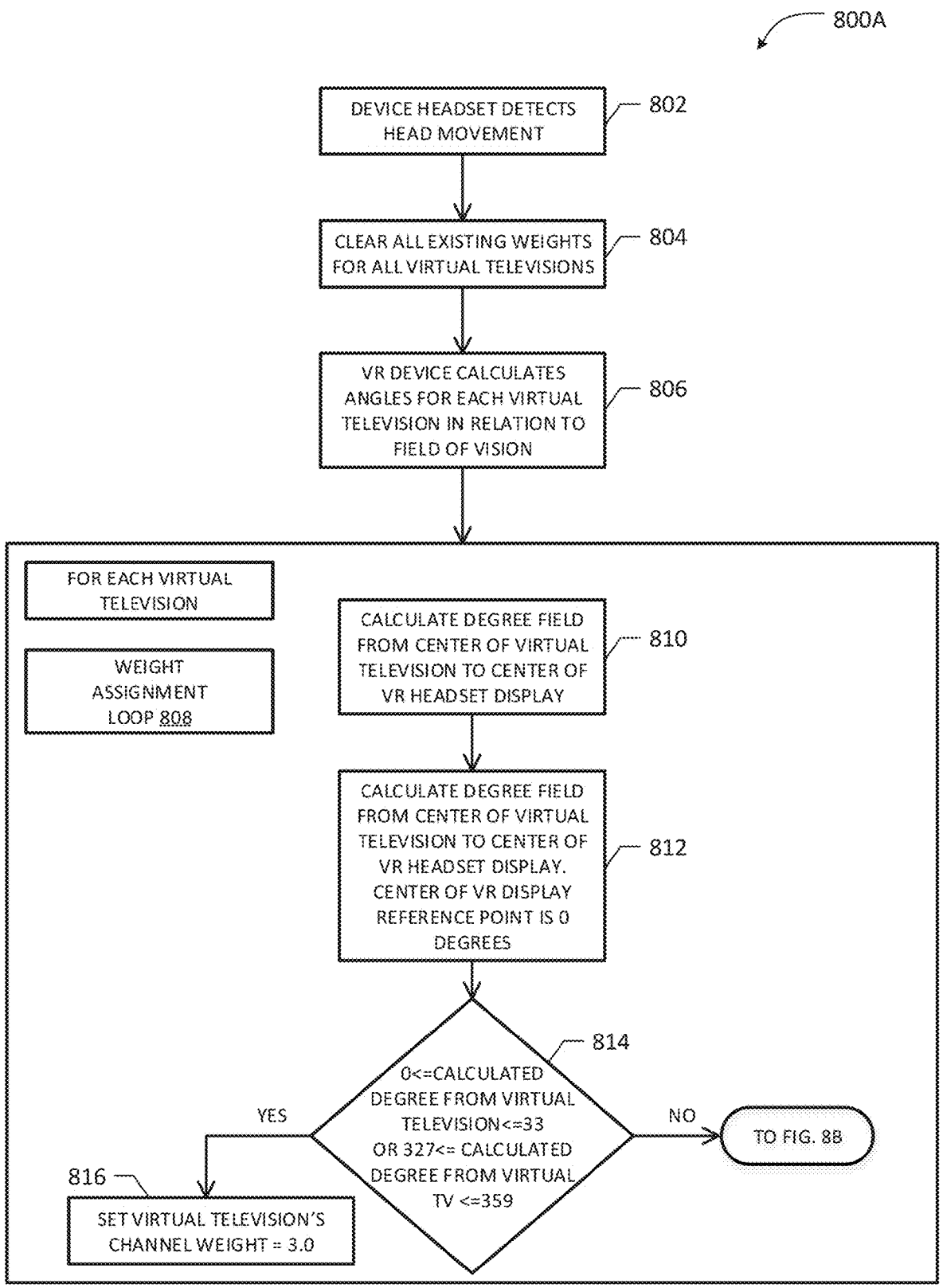
FIGS. 8A and 8B depict portions of a flowchart comprising various blocks, steps and/or acts that may be (re) combined in one or more arrangements that illustrate an example weight (re)assignment and/or updating process according to one embodiment of the present patent disclosure.
Figure 8B:
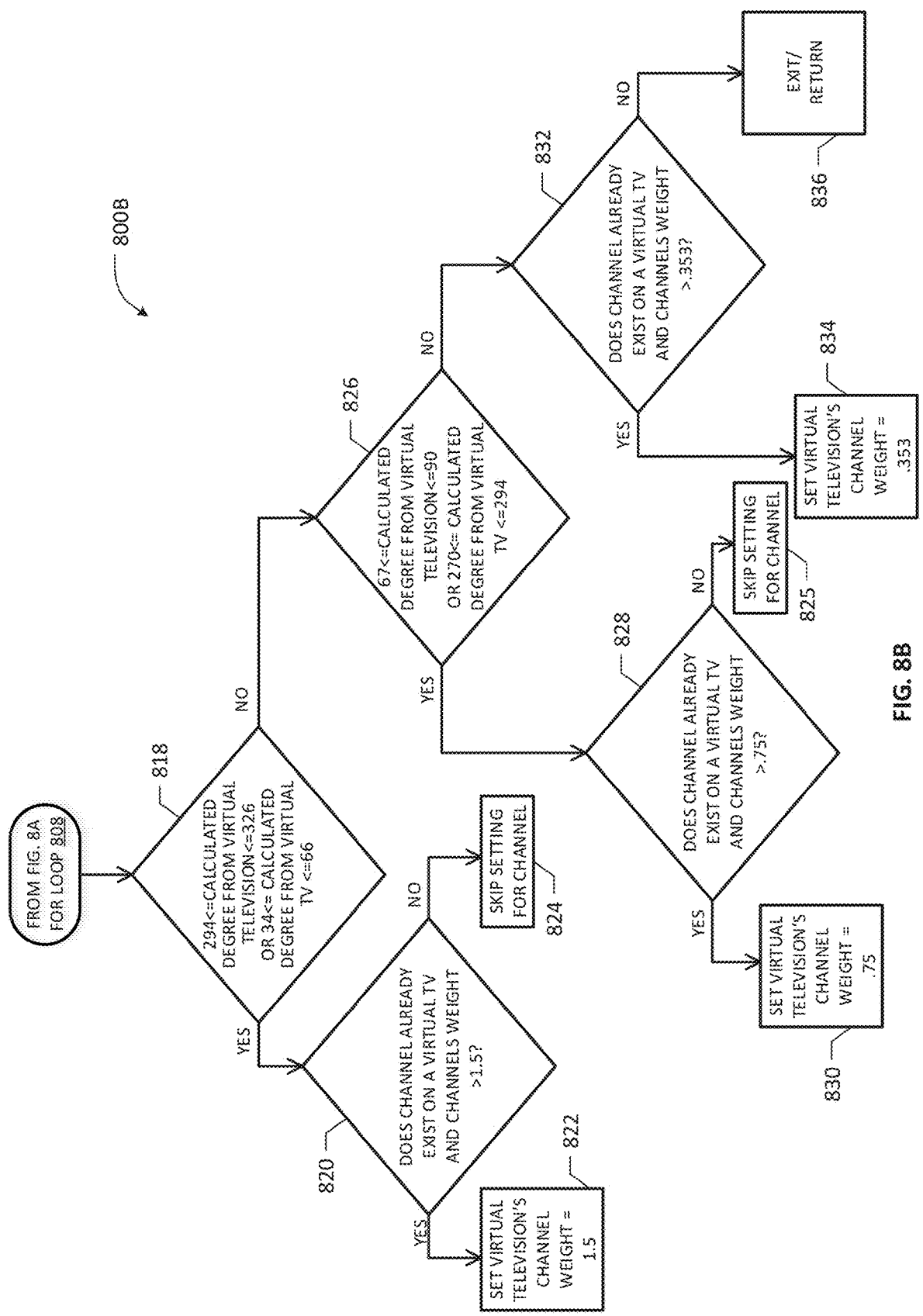
Figure 9A:
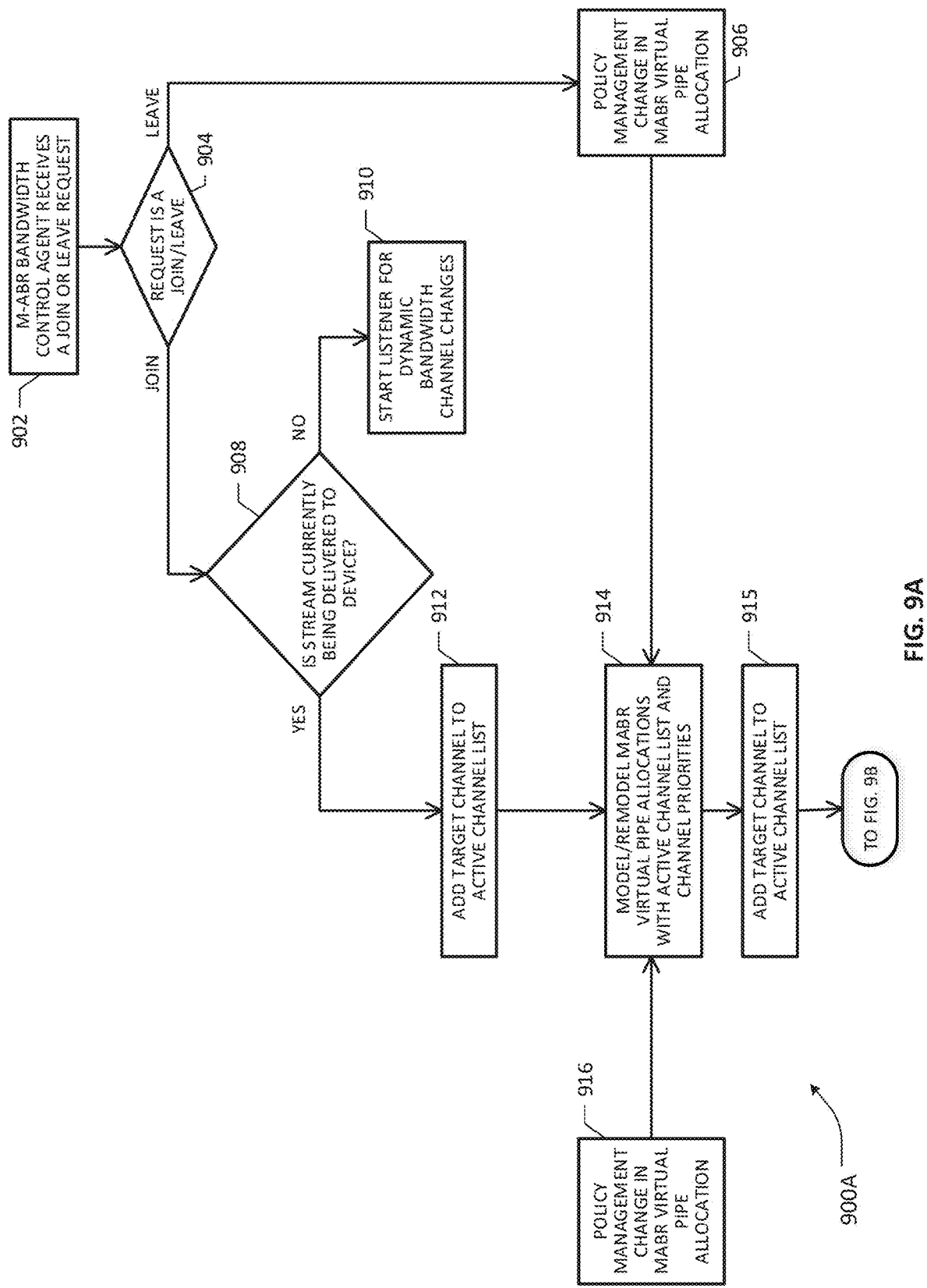
FIGS. 9A-9D depict portions of a flowchart comprising various blocks, steps and/or acts that may be (re)combined in one or more arrangements that illustrate an example channel annealing mechanism for dynamic selection of media content channel bitrates according to one embodiment of the present patent disclosure.
Figure 9B:
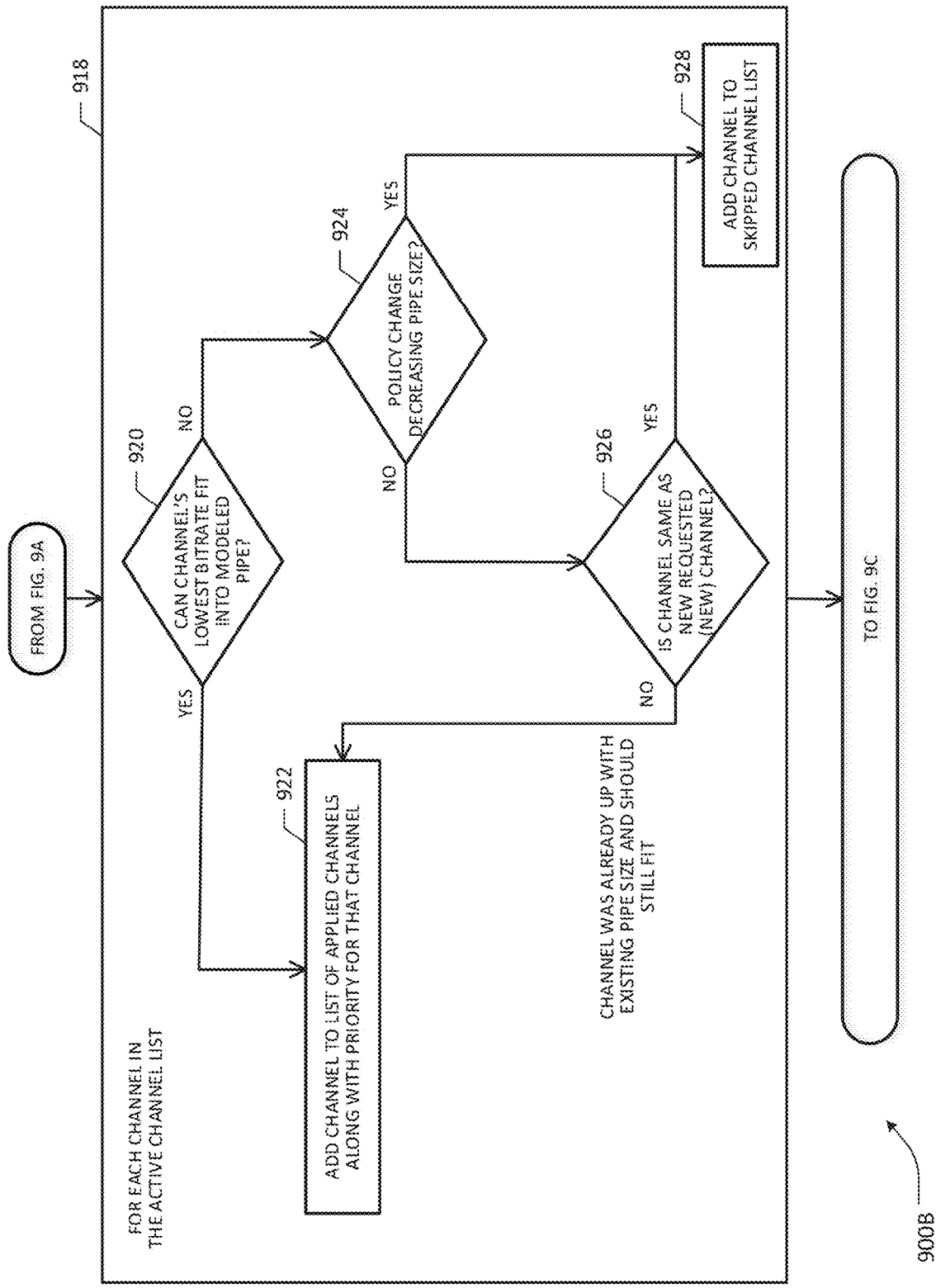
Figure 9C:
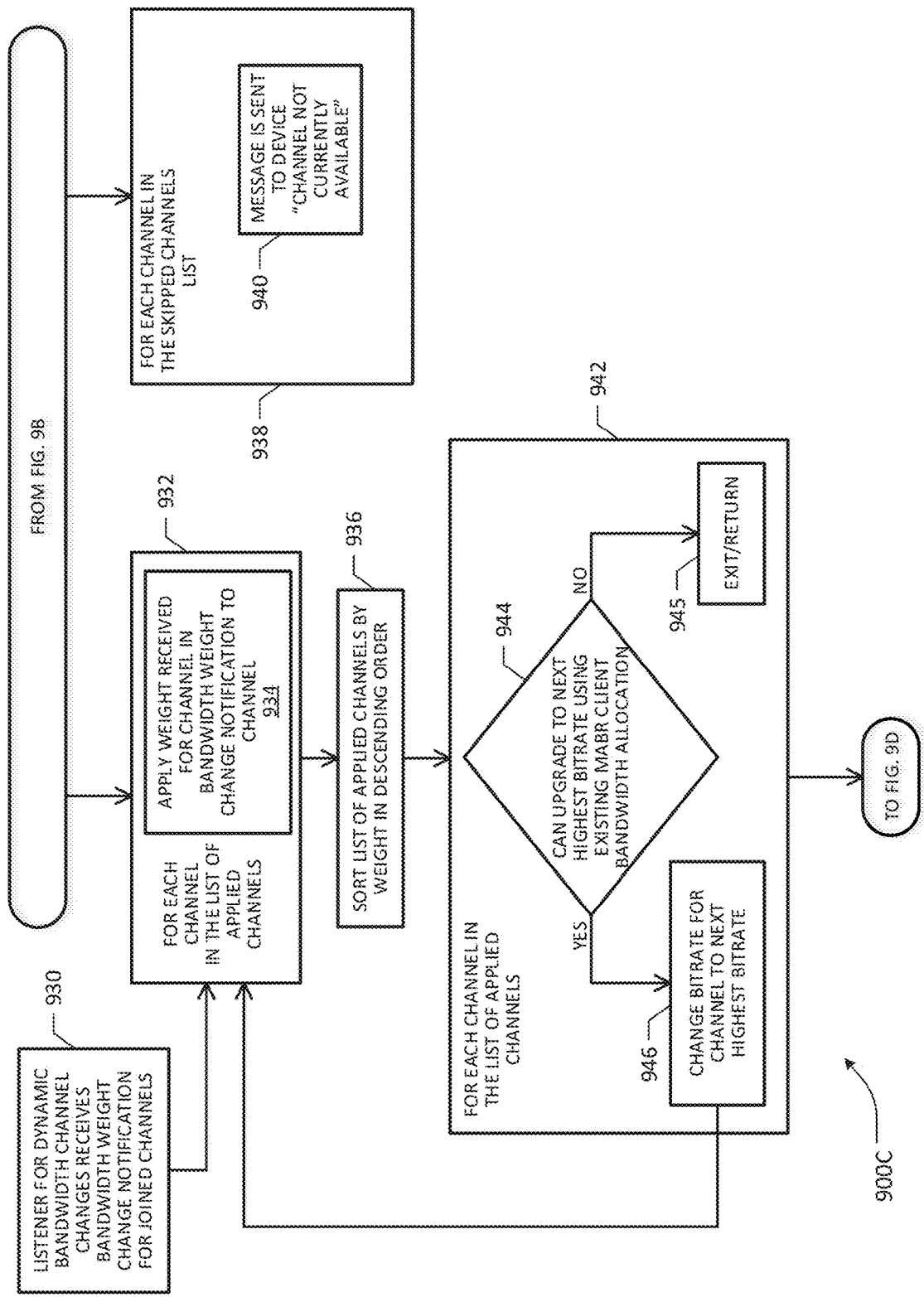
Figure 9D:
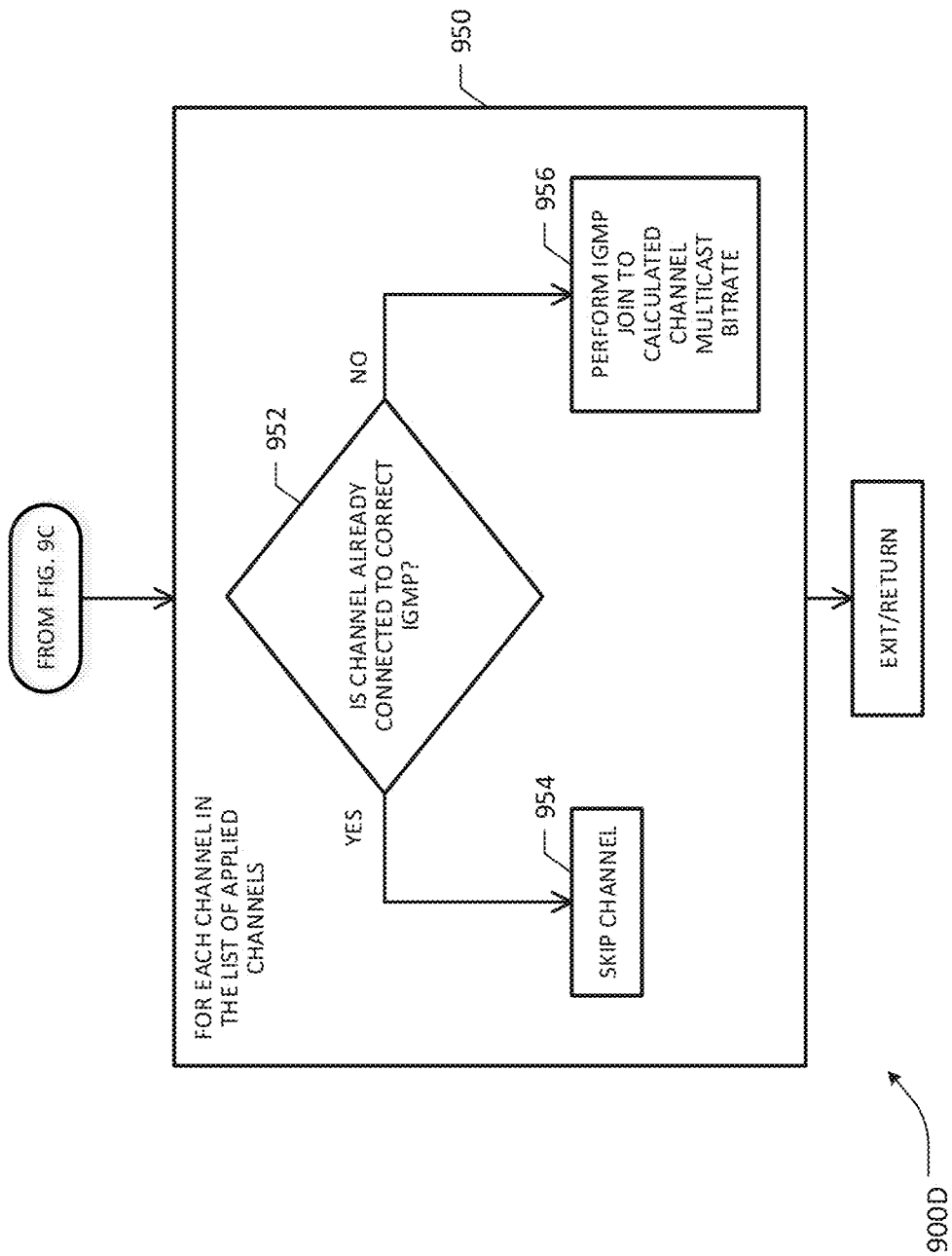

FIGS. 8A and 8B depict portions of a flowchart of various blocks, steps and/or acts that may be (re)combined in one or more arrangements that illustrate an example weight (re) assignment and/or weight updating process 800A/800B according to one embodiment of the present patent disclosure. A skilled artisan will recognize that an embodiment of process 800A/800B may be executed at or in combination with a subscriber's VR device based on detecting the subscriber's head movement or motion to decide or determine the weights associated with VD screens, using the underlying principle that VD screens being looked at directly have more weight than those in the peripheral vision, which in turn have more weight than those VD screens outside of view (i.e., non-visible VD screens). At block 802, subscriber's VR device headset detects the subscriber's head movement. Responsive thereto, existing weights for all VD screens or TVs may be cleared (block 804). In this example embodiment, accordingly, each time a head movement is detected, the weights are cleared or otherwise initialized for the subsequent process flow. At block 806, the VR device calculates angles for each VD screen in relation of the subscriber's field of vision. A weight assignment/updating loop 808 is then executed for each VD screen, which involves the following in an example implementation. At blocks 810, 812, a degree field or a line of field from the center of a VD screen to the center of the VR display device (or some other reference point with respect to the VR display device) is calculated, which is compared against a cone of high visibility (e.g., within ±33 degrees), as set forth at block 814. If the VD screen is within this cone, the media content channel associated with that VD screen is set to having a high weight value of 3.0. Otherwise, a series of further determinations may be made as set forth in FIG. 8B (e.g., depending on the granularity of comparison cones or sectors used in partitioning the subscriber's field of vision), e.g., as set forth at blocks 818, 826. If there is no media content channel associated with a VD screen that is determined to be within a cone, weight assignment for that channel may be skipped (e.g., as set forth at blocks 820, 824, 825, 828). Otherwise, the media content channels of the VD screens located in different visibility cones or sectors are (re)assigned weights of 1.5 (e.g., a medium value, as set forth at block 822), 0.75 (e.g., a low value set forth at block 830), or 0.353 (e.g., a still lower value set forth at block 834 responsive to a determination at block 832). After executing the weight assignment loop 808 for each VD screen, the flow exits (block 836).

FIGS. 9A-9D depict portions of a flowchart of various blocks, steps and/or acts that may be (re)combined in one or more arrangements that illustrate an example channel annealing mechanism 900A-900D for dynamic selection of media content channel bitrates for optimizing bandwidth allocation of a subscriber bandwidth pipe based on stream channel weights/updates according to one embodiment of the present patent disclosure. At block 902, a MABR bandwidth control agent or module (e.g., associated with a VMA) receives a Join or Leave request with respect to the media content channels being provided to the VR environment. If the request is a Leave request (as per determination at block 904), the channel is removed from the target channel list used for annealing or channel packing (block 906). If the request is a Join request, a further determination is made as to whether the stream segments are currently being delivered to the VD screen (block 908). If not, a "listener" process or module may be started for monitoring dynamic bandwidth channel changes (block 910). Otherwise, the channel is added to an active channel list (block 912), which feeds into an MABR virtual pipe allocation mechanism for modeling or re-modeling bandwidth allocations for the active channels (block 914). As set forth at block 916, policy management changes, if any, with respect to MABR virtual pipe allocation may also be input (e.g., from an MABR back office) into the modeling process.

The active channel list may be sorted, e.g., in a descending order based on a priority value, as set forth at block 915, whereupon a packing iteration loop 918 may be executed for each active channel. First, a determination may be made whether the channel's lowest bitrate representation may be accommodated into the modeled or simulated bandwidth pipe (block 920). If so, the channel is added to a list of applied channels along with a priority for that channel (block 922). Otherwise, a further determination is made at block 924 as to whether there is a policy change to decreasing the pipe size. If so, the channel is added to a skipped channel list (block 928). If the channel is not the same as the new/requested channel (block 926), it is either added to the list of the applied channels (block 922) or to the skipped channel list (block 928).

In the exemplary embodiment of annealing flow 900A-D shown in FIGS. 9A-9D, a message or warning 940 may be provided with respect to each channel in the skipped channels list as set forth at a message loop process 938. For each channel in the applied channels list, a weight application process 932 is executed wherein the weight/update received for the channel, e.g., via the listener monitoring (block 930) provided for the joined channels, as set forth at block 934. The applied channels list is then sorted based on the weights, e.g., in descending order, as set forth at block 936, whereupon a bitrate upgrade loop process 942 is executed for each of the applied channels for arriving at an optimal bitrate for each channel. A determination is made whether the channel can be upgraded to the next highest bitrate using the existing MABR channel bandwidth allocation (block 944). If so, the bitrate for that channel is changed to that next highest bitrate (block 946). Otherwise, no upgrading is performed for that channel and process loop returns to the next channel in the weight-sorted applied channel list (block 948).

Upon exiting the bitrate upgrade loop process 942, an IGMP loop process 950 is performed, which involves determining whether the channel at the selected single bitrate representation is already connected to the correct IGMP node/port (block 952). If so, that channel is skipped and the loop process iterates to the next channel's single bitrate (block 954). If the channel at the selected bitrate is not already joined to the correct IGMP, an IGMP Join operation is performed to connect to the multicast stream having the calculated/selected multicast bitrate (block 956). As one skilled in the art will recognize upon having reference hereto, the channel packing processes and/or sub-processes of flow 900A-D may therefore involve one or more bandwidth pipe modeling and annealing mechanisms set forth hereinabove.

Figure 10A:
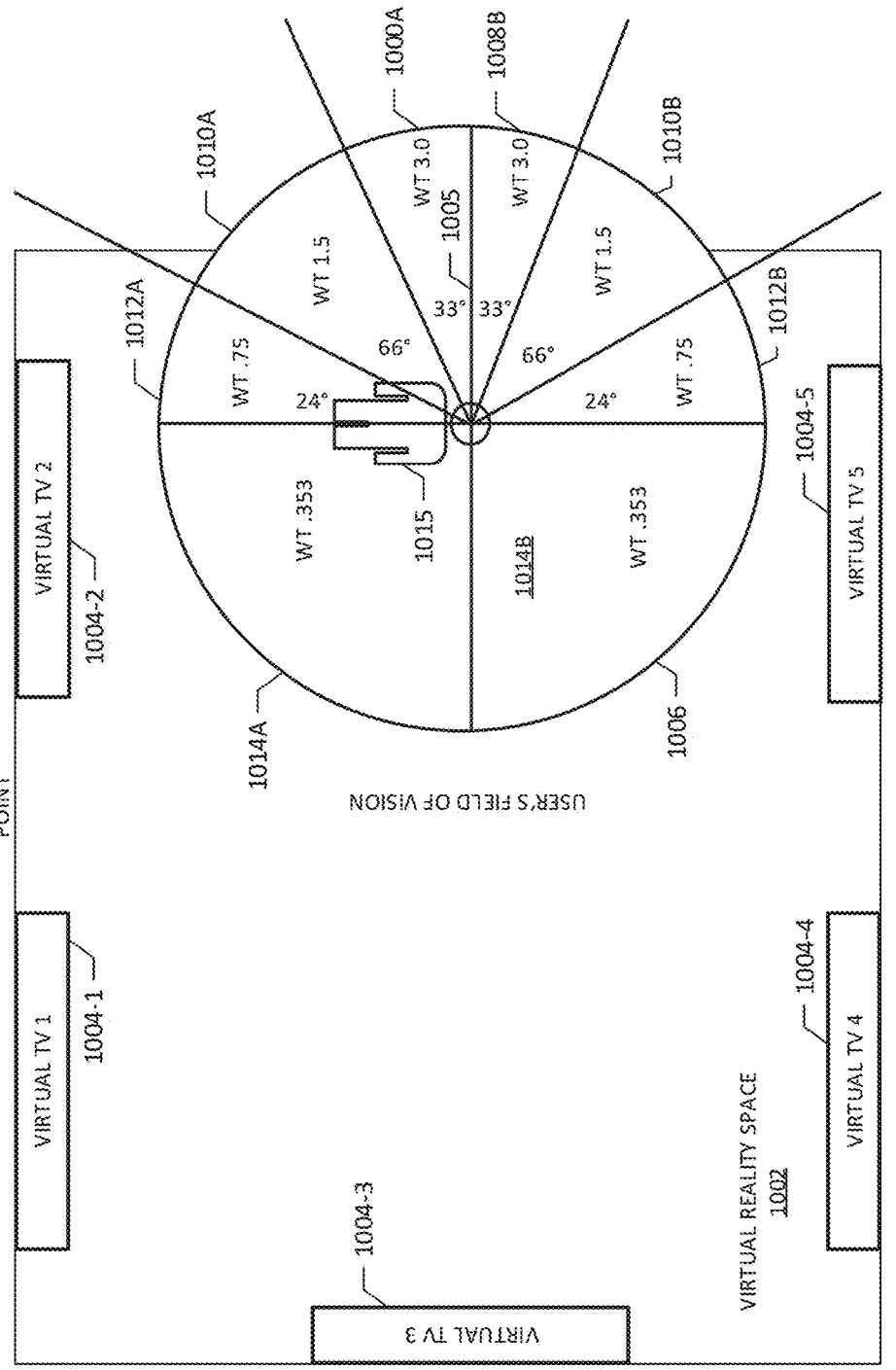
FIGS. 10A and 10B relate to example weight assignments and associated bandwidth allocation for media content channels in a VR environment having five VD screens in an illustrative use case scenario.

Turning to FIGS. 10A/10B to 13A/13B, various illustrative use case scenarios relating to example weight assignments and associated bandwidth allocations for media content channels in a VR environment or VR space having five VD screens are set forth therein, where a user/subscriber changes or shifts her viewpoints in relation to the VR spatial environment she is immersed in. In the example scenario 1000A shown in FIG. 10A, subscriber 1015 is disposed in a VR space 1002 having five VD screens or virtual TVs (VTVs) VTV-1 to VTV-5 (referred to by reference numerals 1004-1 to 1004-5) at or along different "walls" of the space 1002. As the subscriber 1015 is not viewing any VTVs directly, each of the VTVs is given a minimum available weight, e.g., 0.353. To prevent the VTVs from being completely blank, the user may be required to move her head in an example implementation. An example 360-degree field of view 1006 of the user 1015 may be partitioned into "high" weighted areas 1008A/1008B, "medium" weighted areas 1010A/1010B, "low" weighted areas 1012A/1012B that are within the 180-degree peripheral field, the areas being demarcated in relation to the user's viewpoint line 1005 (directly looking ahead, for example, in the VR space 1002). Non-visible areas 1014A/1014B (e.g., behind-the-head areas) may be given lowest available weights possible in an example implementation of the scenario 1000A set forth in FIG. 10A.

Corresponding to the equal weight distributions provided to the VTVs in the scenario of FIG. 10A, an example bandwidth allocation scheme 1000B illustrates a subscriber bandwidth pipe 1052 provided to a gateway 1050 of subscriber premises that includes a VR device or apparatus 1056. The total bandwidth of the subscriber pipe 1052 may be apportioned into a 10-Mbs managed MABR video pipe 1054A serving VR environment 1002, a data communications pipe 1054B as well as a voice communications pipe 1054C. Because of the equal weights accorded to VTVs, each channel (Channels 1-5) corresponding to the respective VTVs are allocated equal bandwidth (e.g., 1.8 Mbs, given the bitrate representations available for the channels), as shown by reference numerals 1056-1 to 1056-5. It should be appreciated that such an allocation may leave some of the managed MABR video pipe to be unused, since the highest bitrate representation that can be used for each channel is 1.8 Mbs, which amounts to 9.0 Mbs usage in total. If a next highest bitrate were to be selected, e.g., 4 Mbs, the managed pipe would not be able to accommodate all five channels at the same equal weighting factors.

Figure 11A:
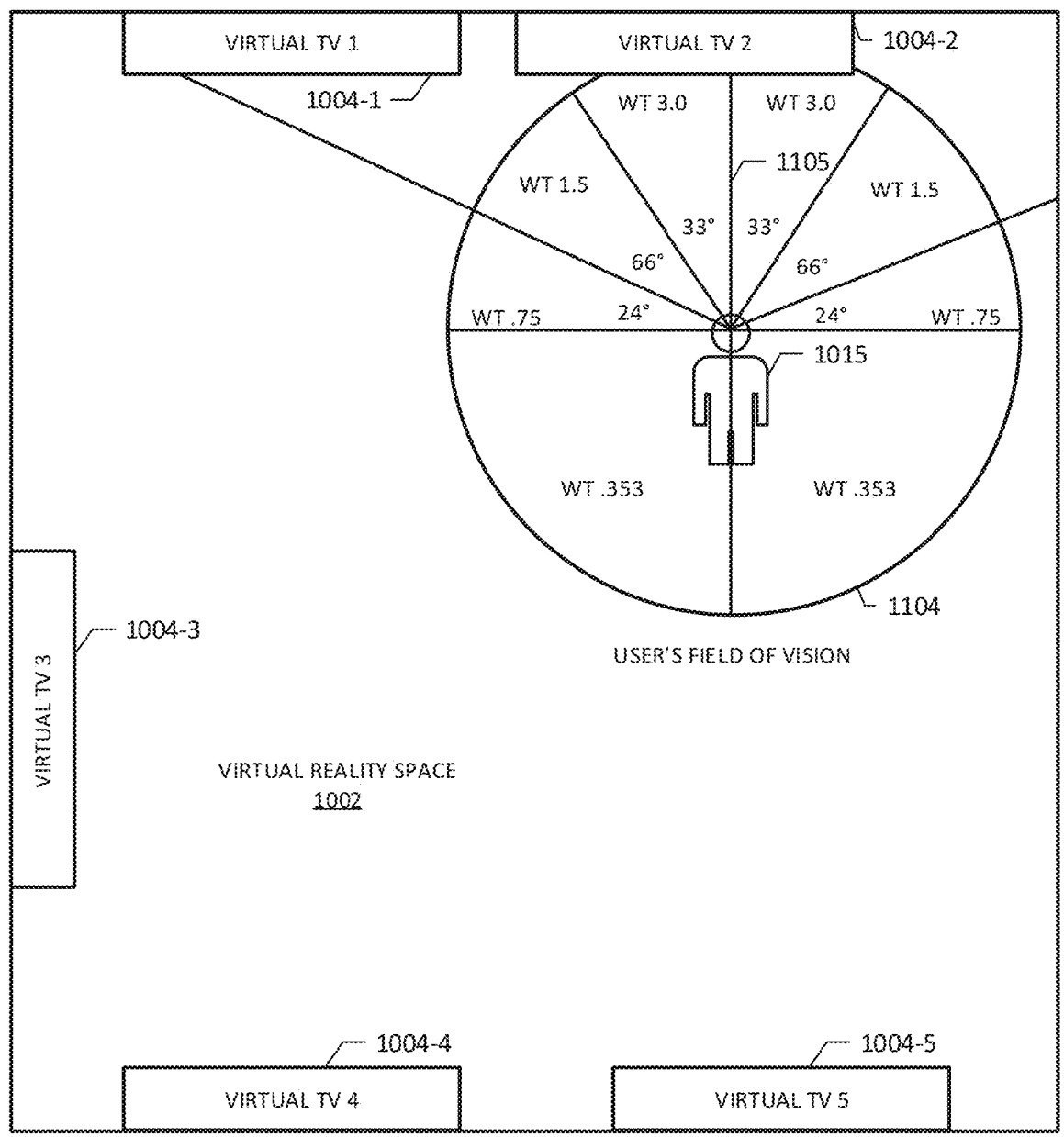
FIGS. 11A and 11B relate to example weight assignments and associated bandwidth allocation for media content channels in a VR environment having five VD screens in another illustrative use case scenario.
Figure 11B:
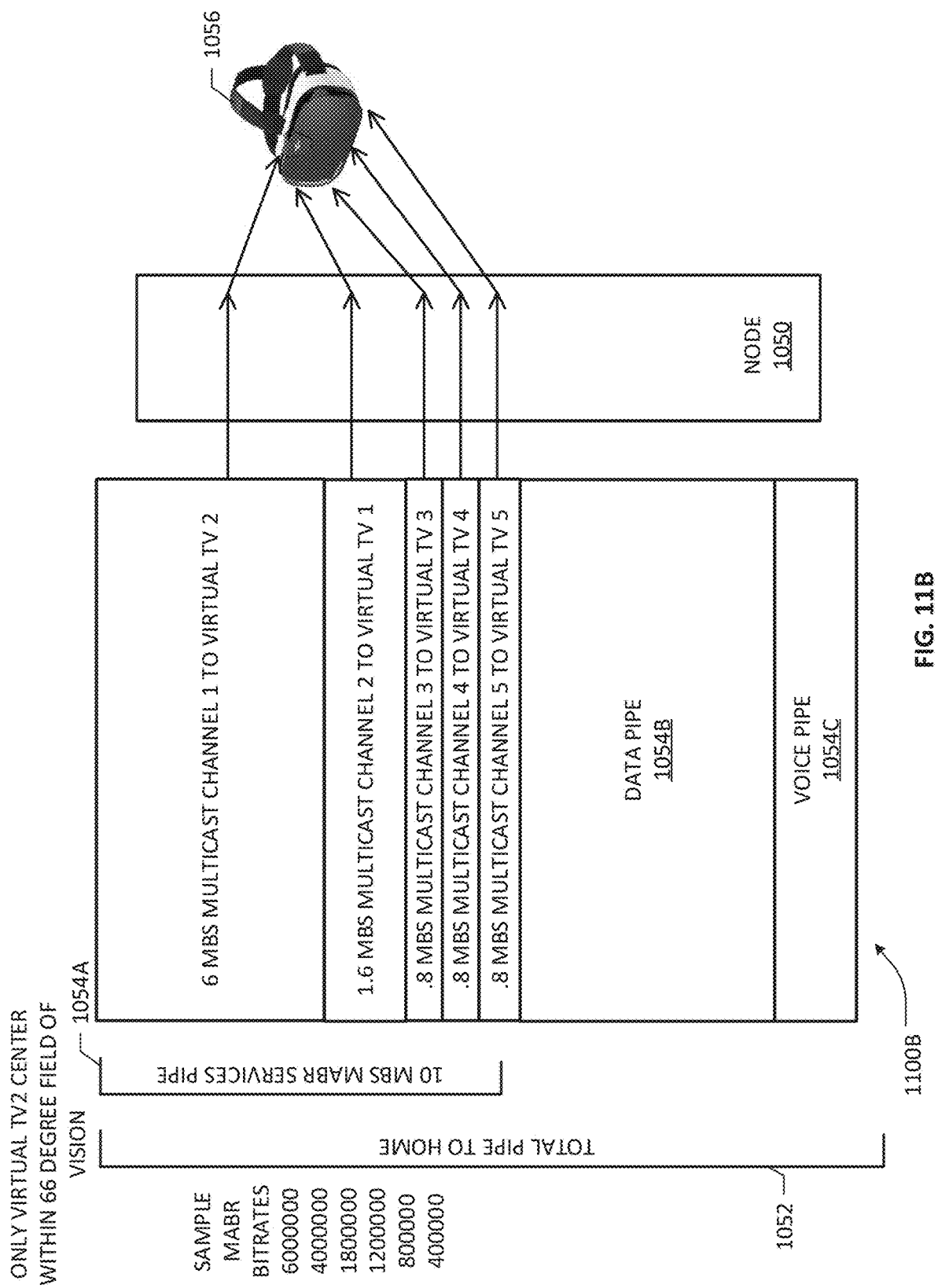

FIGS. 11A and 11B relate to example weight assignments and associated bandwidth allocation for media content channels in a VR environment having five VD screens in another illustrative use case scenario 1100A where a single VTV is directly viewed, another one in the peripheral vision and the remaining VTVs being unviewed. Reference numeral 1105 refers to a new viewpoint of the user 1015 in this use case scenario, with VTV-2 1004-2 being directly viewed, VTV-1 1004-1 being in a peripheral field. The weight assignment process of the present invention may therefore (re)assign or update the previously-assigned weights accordingly as shown in FIG. 11A, which results in higher bandwidth allocation for the channel shown on VTV-2 because of its weight being updated to 3.0, e.g., 6 Mbs allocation as exemplified in the allocation scheme 1100B of FIG. 11B. VTV-1 being a peripheral screen gets an updated weight of 0.75, resulting in a smaller bandwidth allocation therefor. Still smaller bandwidth allocations may be provided for the remaining VTVs, each now having a weight of 0.353. It should be noted that in one example implementation, only those weights that are changed or updated to different values may be transmitted by the VR device 1056 to the gateway's bandwidth allocation/annealing mechanism in order to minimize the communications overhead.

Figure 12A:
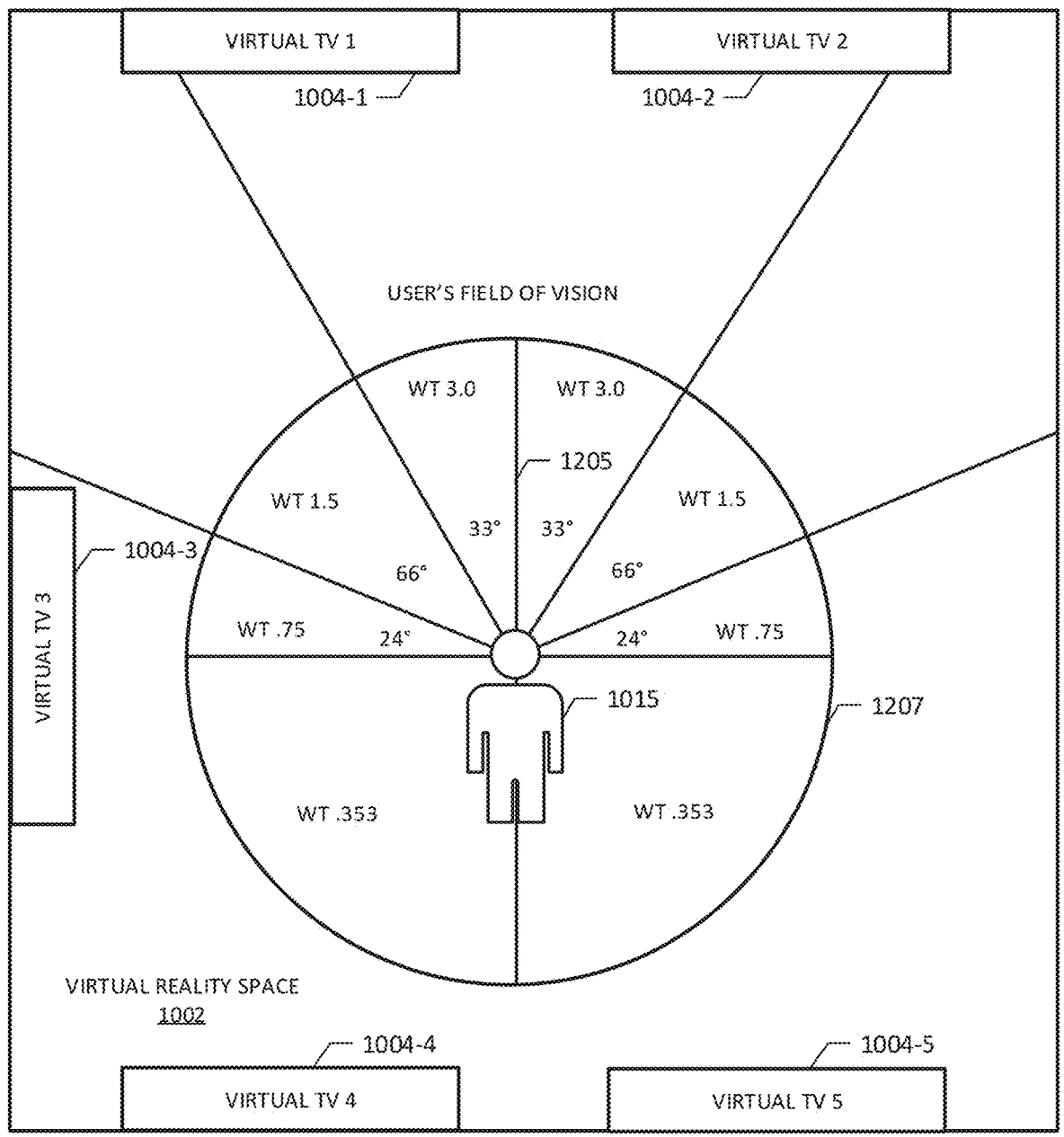
FIGS. 12A and 12B relate to example weight assignments and associated bandwidth allocation for media content channels in a VR environment having five VD screens in yet another illustrative use case scenario.
Figure 12B:
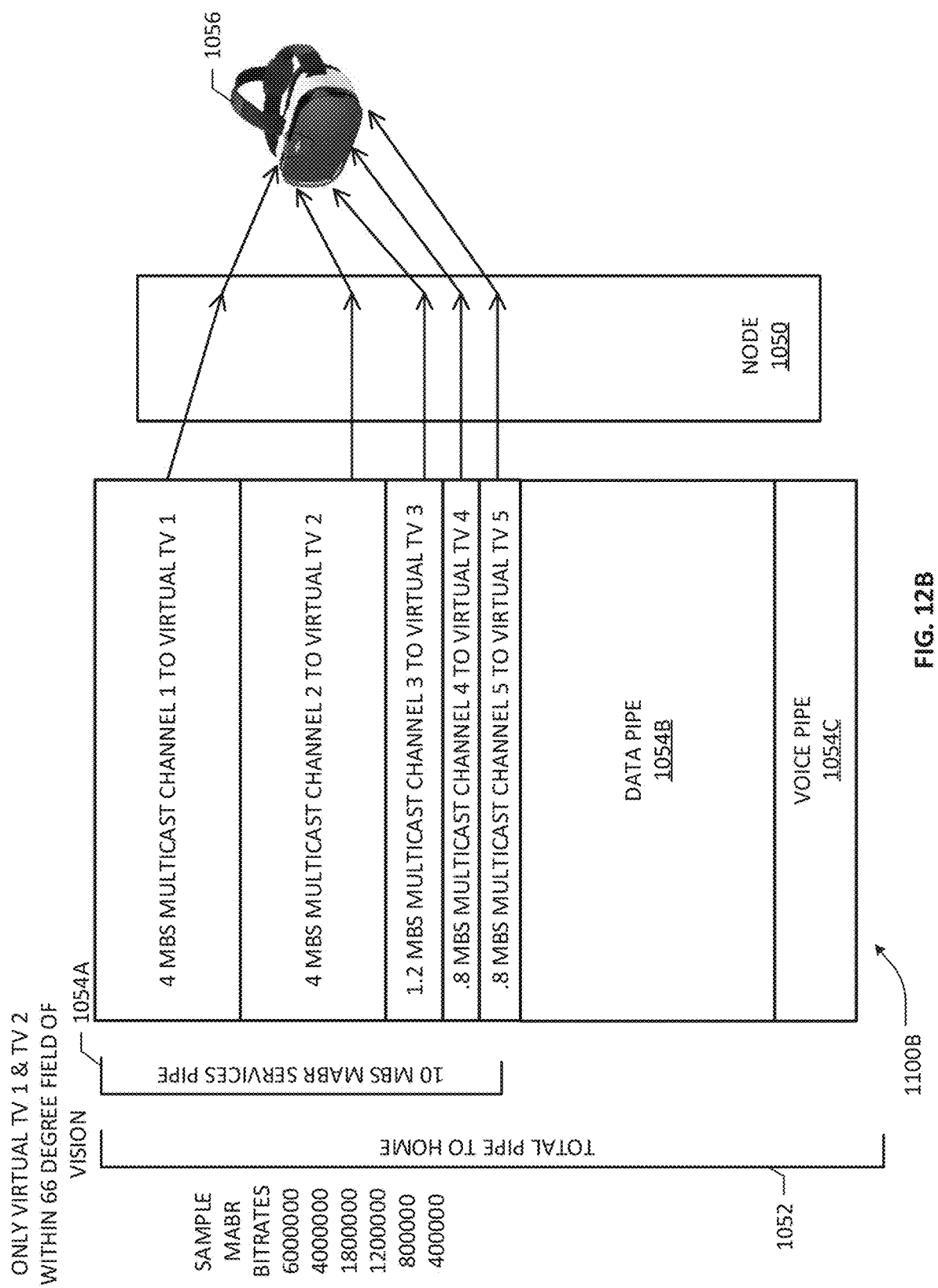
Figure 13A:
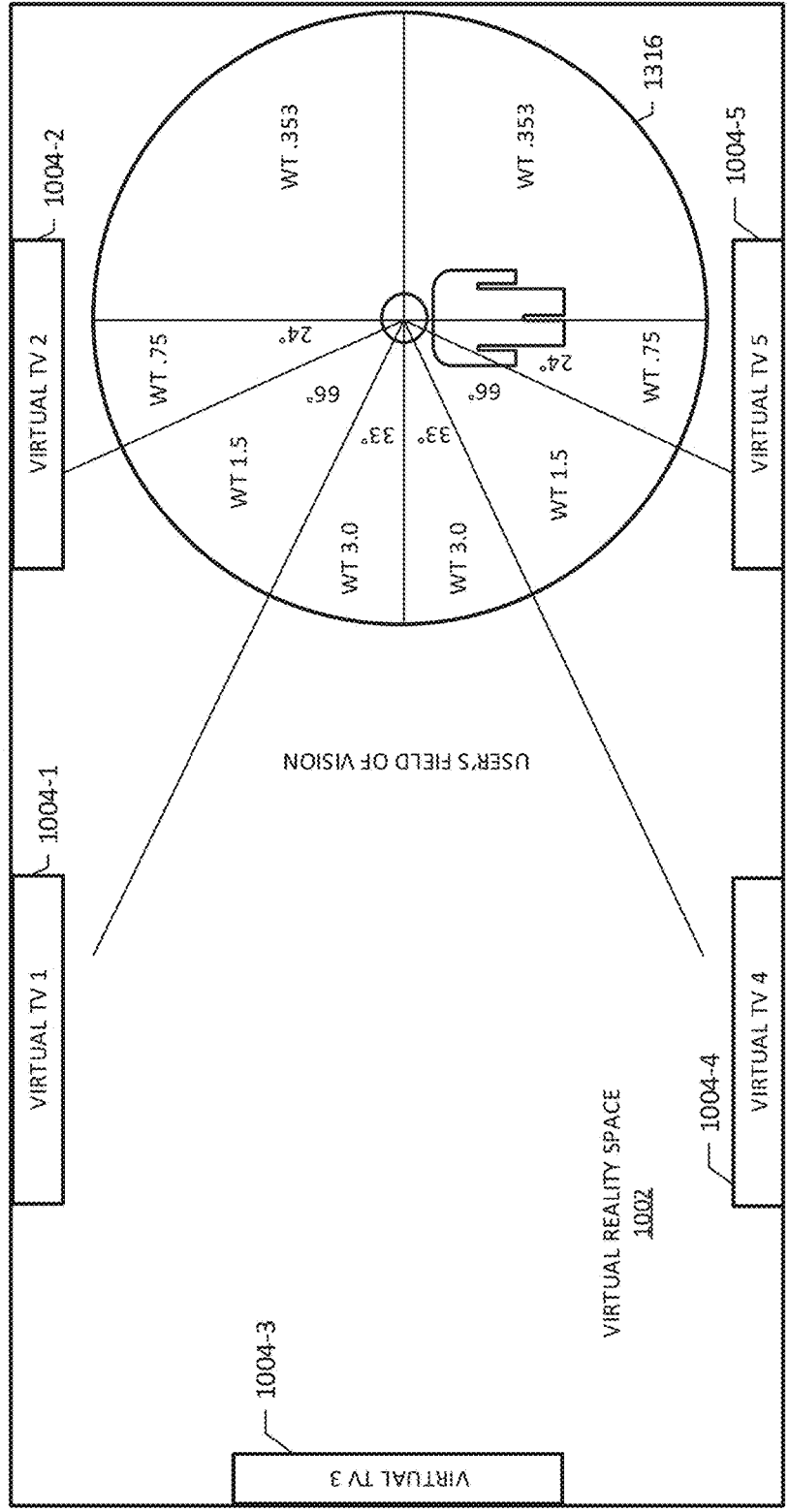
FIGS. 13A and 13B relate to example weight assignments and associated bandwidth allocation for media content channels in a VR environment having five VD screens in yet another illustrative use case scenario.
Figure 13B:
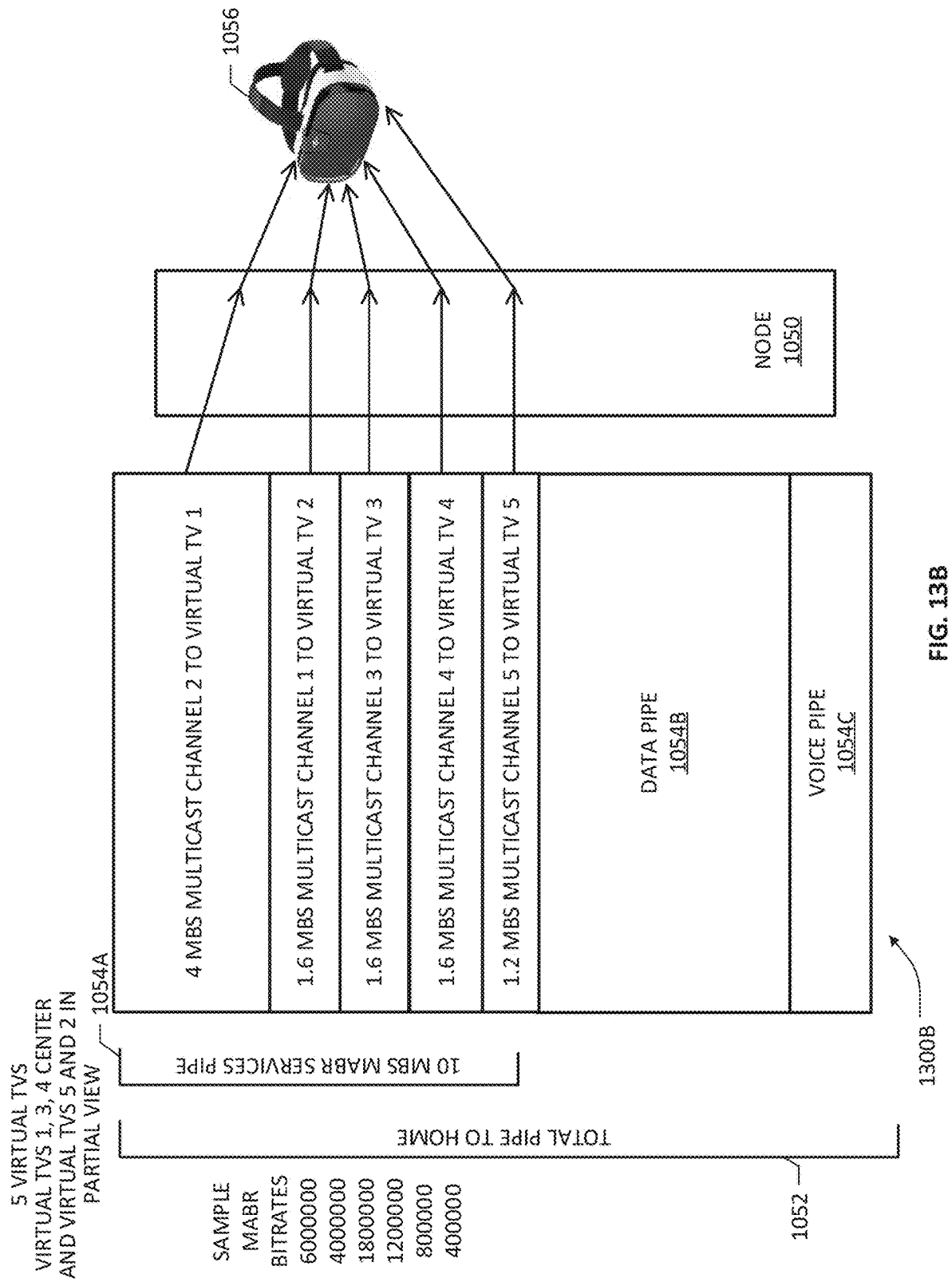

FIGS. 12A and 12B relate to example weight assignments and associated bandwidth allocation for media content channels in a VR environment having five VD screens in yet another illustrative use case scenario 1200A where two VTVs (VTV-1 and VTV-2) are in direct view, VTV-3 is in peripheral view, and remaining VTV-4 and VTV-5 are not visible at all, taken in reference to a new line of view 1205 within the user's field of view 1207. Corresponding bandwidth allocation scenario 1200B accordingly illustrates 4 Mbs allocations for Channel 1 and Channel 2 showing on VTV-1 and VTV-2, respectively, each having a weight of 3.0. Bandwidth allocations for the remaining channel are also correspondingly adjusted based on the new selected single bitrate representations for them in accordance with the teachings of the present patent disclosure. A still further illustrative use case scenario 1300A and related bandwidth allocation scheme 1300B are shown in FIGS. 13A and 13B. In the scenario 1300A, three VTV screens (VTV-1, VTV-3 and VTV-4) are within a direct view cone of the subscriber's field of view 1316, and hence may be deemed as being looked at directly, thereby getting an equal weight of 3.0. The remaining two VD screens (VTV-2 and VTV-5) are still visible but near the visual periphery of the subscriber 1015, which are therefore assigned a 0.75 weight. Because there is not enough bandwidth to fit all VTVs at their weights, when bandwidth is distributed, available bitrates may be chosen in an unintuitive manner in order to prevent unused bandwidth in an example embodiment of the present invention. By way of illustration, a select first VTV (e.g., VTV-1) may be arbitrarily allowed more bandwidth than the equally weighted VTVs, e.g., VTV-3 and VTV-4. Similarly, VTV-2 is at a higher bitrate than the equally weighted VTV-5, as exemplified in the bandwidth allocation scheme 1300B of FIG. 13B. It should be appreciated that in both cases an objective of the embodiments herein is to use all available bandwidth, even if there is not enough leftover bandwidth to upgrade all VTVs in the same weight class.

Figure 15:
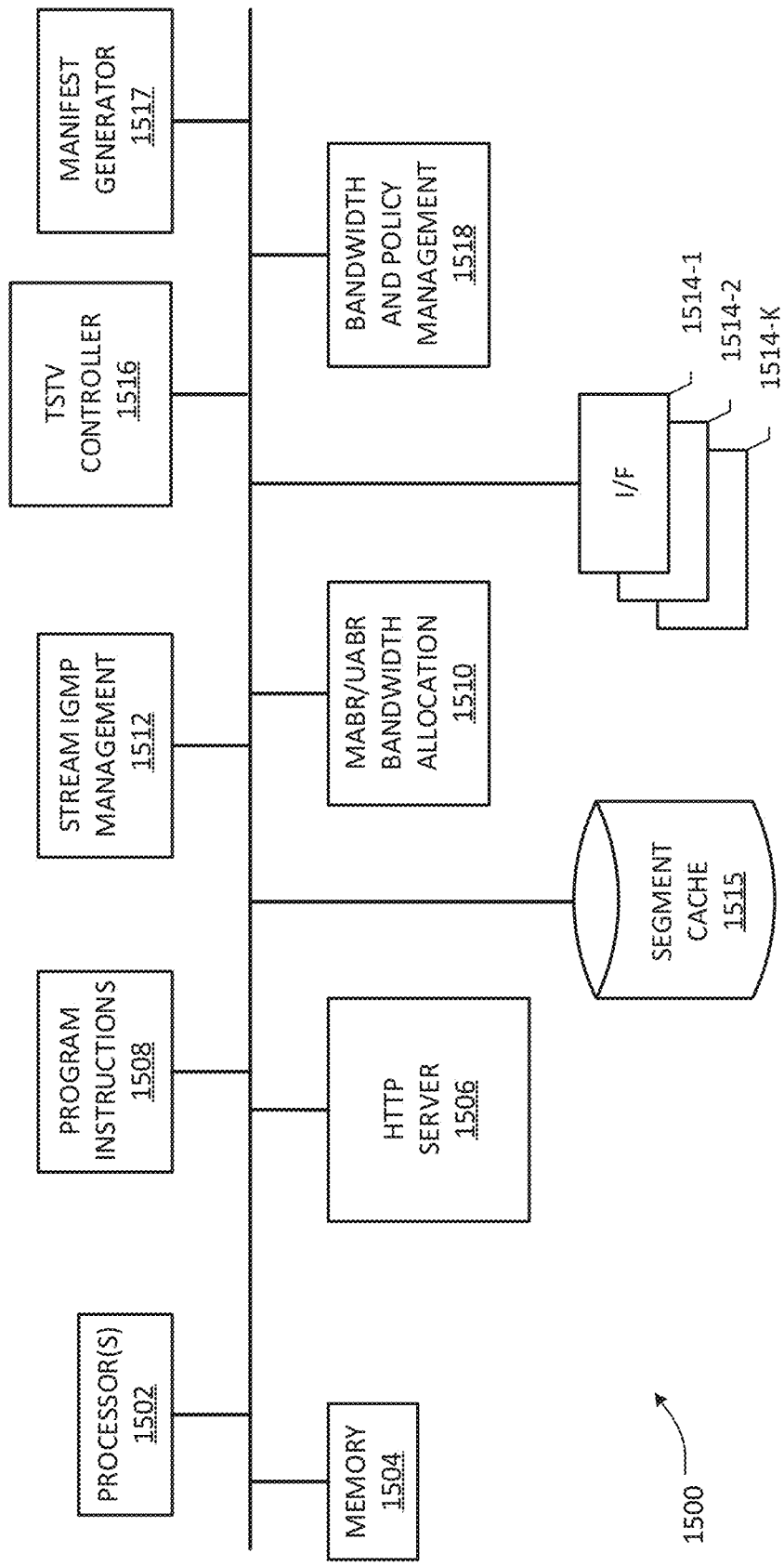
FIG. 15 depicts a block diagram of a computer-implemented apparatus that may be configured as a gateway node or subsystem operative in an MABR communications network of the present invention.

FIG. 15 depicts a block diagram of an apparatus 1500 that may be configured as an element, node or subsystem operative in an MABR communications network according to an embodiment of the present patent application. For example, apparatus 1500 may be configured in one embodiment as MVMA functionality in a gateway agent implementation such as GW 402 set forth hereinabove. In an additional or alternative embodiment, apparatus 1500 may be configured as a gateway node operative to execute or otherwise facilitate time-shifting of unwatched media content channels while providing bitrate control in a VR implementation, e.g., according to an embodiment of a combination of processes 600A/600B, as will be set forth in later sections of the present patent application further below.

One or more processors 1502 may be operatively coupled to various modules that may be implemented in persistent memory for executing suitable program instructions or code portions with respect to one or more processes set forth hereinabove for facilitating channel packing, channel joining/leaving, de-gapping, and/or bandwidth allocations, etc., depending on a particular configuration. A stream IGMP management module 1512 is operative to perform various processes for generating appropriate signals to an IGMP switch and/or upstream nodes such as DSLAM nodes or BNG nodes, for joining the requested channels at selected bitrates in accordance with the teachings set forth hereinabove. An MABR bandwidth allocation module 1510 is operative to apply suitable bandwidth allocation policies to a subscriber premises pipe, including a managed video pipe serving a VR environment, under suitable program instructions, e.g., program instructions 1508 and/or other code portions in memory 1504, or in conjunction with a bandwidth policy manager 1518 to effectuate stream bitrate selection and channel packing. A suitable segment cache 1515 may also be provided as part of or in addition to the memory system of the apparatus 1500 that is operative to store a select number of segments (for instance, a predetermined number) per each channel at select bitrates, e.g., single bitrate representations per channel. A manifest generator 1517 is configured or programmed to generate, under or as suitable program code executed by processors 1502, a manifest referencing gateway segment cache addresses or locations (e.g., as URLs) of the stored segments in single bitrate representations, that may be provided to a VR-capable client device or CPE. In a further arrangement, apparatus 1500 may also be (re)configured to provide TSTV controller functionality 1516 for facilitating time-shifting of unwatched channels in a VR environment. Depending on the configuration, various network interfaces (I/F) 1514-1 to 1514-K may be appropriately provided with respect to effectuating communications with, inter alia, MABR bandwidth/QoS policy manager nodes, back office nodes, SAG units and/or MSF functionalities, Session Resource Management (SRM) nodes, IGMP switches, unicast switches, BNG/DSLAM nodes, standalone or CDN edge-based TSTV systems, and the like. In similar fashion, interfaces 1514-1 to 1514-K may also include interfaces operative to effectuate communications with a plurality of client devices, including VR-capable CPEs of a subscriber premises (in a gateway agent implementation, for example) via a suitable premises network as set forth hereinabove, for receiving stream weight updates and/or TSTV control message inputs. An HTTP server module 1506 is configured to deliver segments of the media content channels from cache 1515 at respective single bitrates to the VD screens of a subscriber's VR environment responsive to suitable http messaging processes.

Figure 16A:
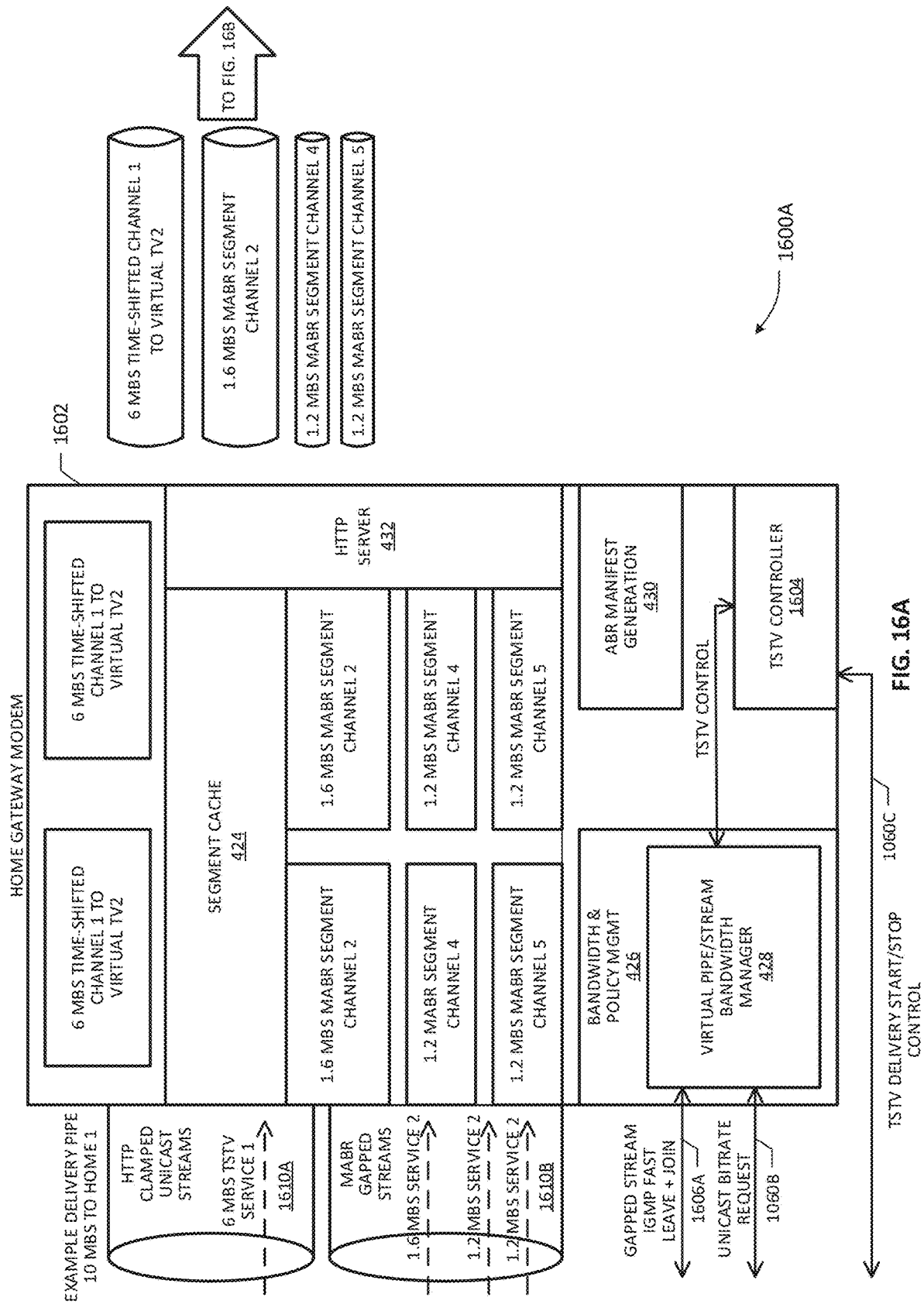
FIGS. 16A and 16B depict block diagrams of a subscriber premises gateway or node and a subscriber premises configured according to an embodiment of the present invention for delivering select single bitrate representations of the media content channels to VD screens in addition to facilitating time-shifting of selected media content channels of a subscriber's VR environment in an example architecture.
Figure 16B:
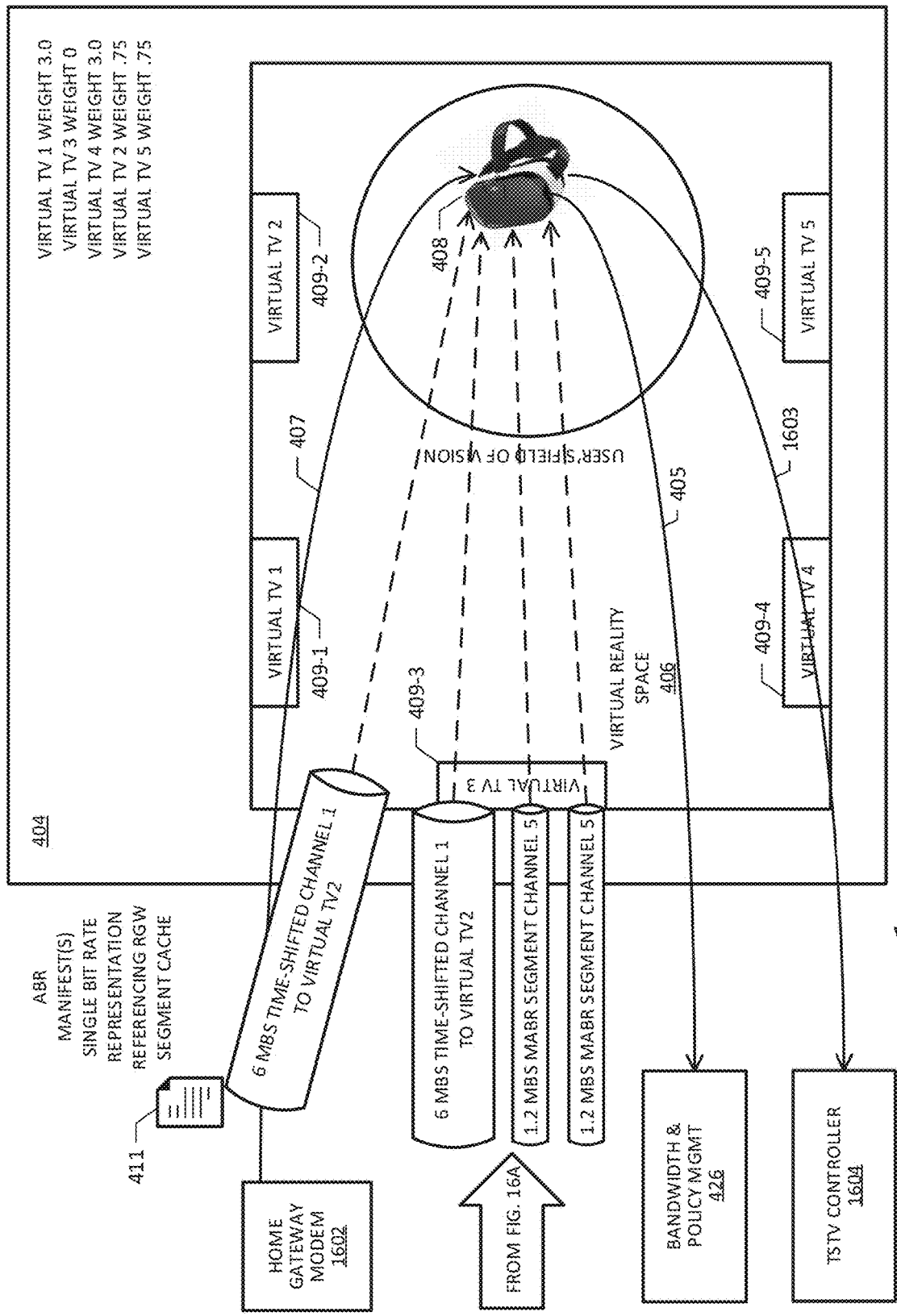

Turning now to FIGS. 16A and 16B, depicted therein is an arrangement with respect to a subscriber premises gateway or node 1602 that may configured as apparatus 1500 set forth above according to an embodiment of the present invention for delivering select single bitrate representations of the media content channels to VD screens in addition to facilitating time-shifting of selected media content channels of a subscriber's VR environment in an example gateway implementation architecture 1600A/1600B. One skilled in the art will recognize that the overall structural arrangement of the architecture 1600A/B is substantially similar to the gateway implementation architecture 400A/B of FIGS. 4A-4B. Accordingly, the detailed description provided hereinabove with respect to FIGS. 4A-4B is also applicable to the embodiment shown in FIGS. 16A-16B, mutatis mutandis. An example TSTV controller 1604 of GW 1602, responsive to receiving appropriate TS-based messages or indications from subscriber VR device 408 via an interface 1603, is operative in association with virtual pipe stream manager 428 for interfacing with a TSTV system via suitable signaling 1606 for effectuating time-shifting of select media content channel(s) of the subscriber's VR environment 406. As will be described below, replay or playback of time-shifted channels (TS channels) may be effectuated as unicast streams from a standalone TSTV system or a TSTV system associated with a CDN edge node for downloading by a network HTTP server, which unicast streams may be received via a unicast pipe portion 1610A of a managed video delivery pipe 1608 serving the gateway node. Managed MABR media content channels (non-time-shifted or NTS media channels) for delivery to the subscriber's VR environment 406 may continue to take place via a managed MABR portion 1610B of the video pipe 1608, wherein the bandwidth may be managed by selecting appropriate bitrates as previously described.

By way of illustration, VTV 409-2 is exemplified as a VDS showing Channel 1 designated for time-shifting. A unicast stream of having a select clamped bitrate for Channel 1 is received via the unicast pipe 1610A, which segments are passed through GW 1602, e.g., without being cached thereat in segment cache 424, in a unicast download path 1609 to the VR device. In contrast, it will be recalled that the segment cache 424 is used for storing media segments for the "live play" or NTS sessions provided to the NTS screens of the subscriber's VR environment 406. As before, HTTP server 432 is operative to download the stored media segments requested by the VTVs responsive to the ABR manifest referencing the cached locations.

Figure 17A:
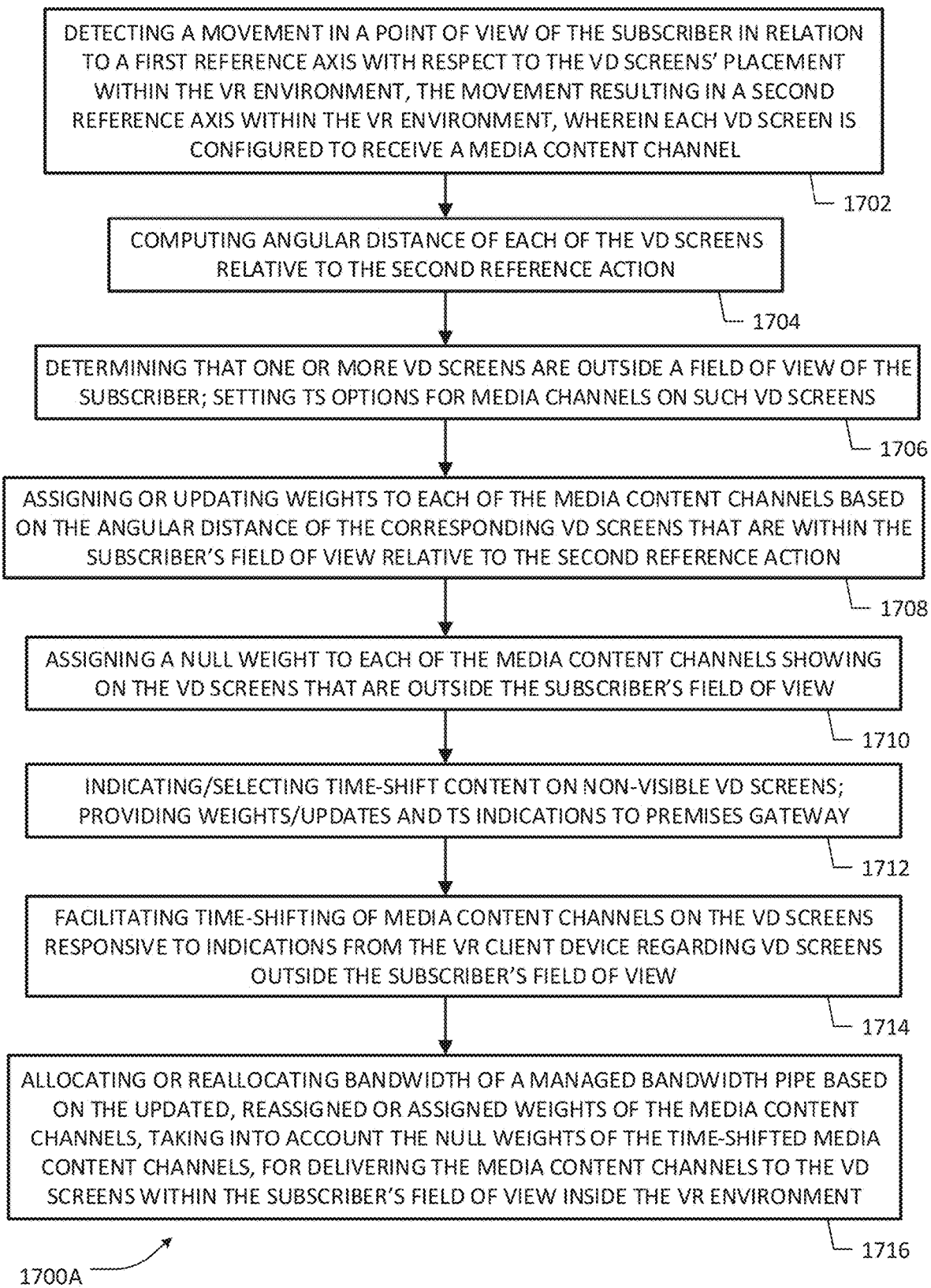
FIGS. 17A and 17B are flowcharts of various blocks, steps and/or acts that may be (re)combined in one or more arrangements, with respect to the embodiments of FIGS. 6A and/or 6B, in a further embodiment of the present invention.
Figure 17B:
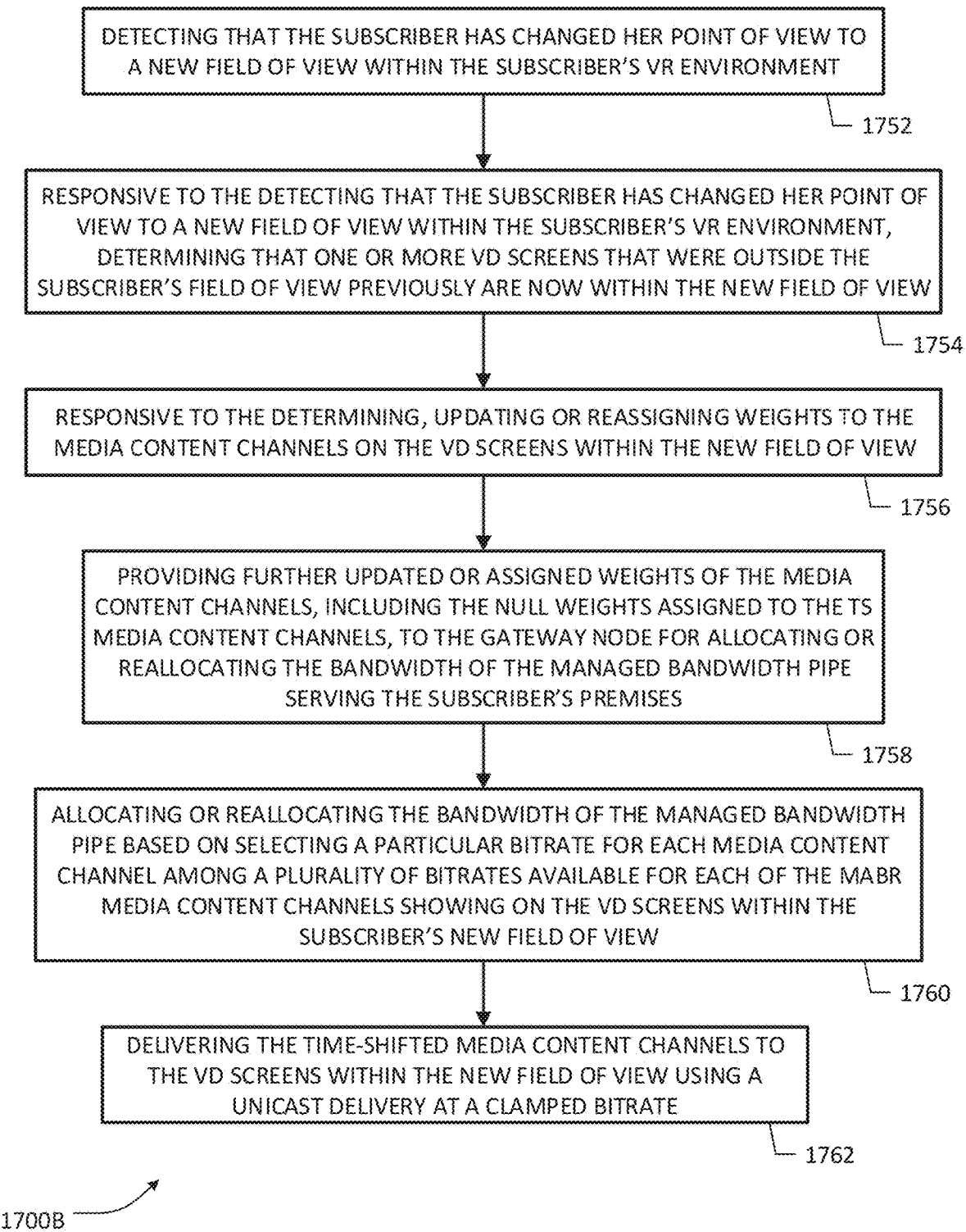

FIGS. 17A and 17B are flowcharts of various blocks, steps and/or acts that may be (re)combined in one or more arrangements, with respect to the embodiments of FIGS. 6A and/or 6B, in a further embodiment of the present invention for managing bitrate control in a VR environment while providing for time-shifting of media content channels. In example process 1700A of FIG. 17A, a change or a movement in a point of view of the subscriber in relation to a first reference axis may be detected with respect to the VD screens' placement within the VR environment (e.g., VRE 406), as set forth at block 1702. As noted previously, such a change or movement may result in a different viewpoint (e.g., defining or having a second reference axis) within the VR environment, wherein each VD screen is configured to receive a media content channel. Further, similar to the embodiments set forth in FIGS. 6A/6B and 7, angular distance of each of the VD screens relative to the second reference axis may be computed (block 1704). Based on the angular distances, a determination may be made whether one or more VD screens are outside a current field of view of the subscriber (block 1706). If so, media channels on the non-visible VD screens may be set or selected for time-shifting. Further, weights of teach of the VD screens and their media content channels may be set, reset, or otherwise updated based on the angular distance of the corresponding VD screens that are within the subscriber's field of view relative to the second reference axis, which may include assigning a null weight to each of the media content channels showing on the VD screens that are outside the subscriber's field of view, as set forth at blocks 1708 and 1710. Subscriber's VR device may be configured to indicate the TS selections on non-visible VD screens to the serving gateway, in addition to sending the updated weights including the null or zero weights (block 1712). Responsive to the TS selection indications, a TSTV controller of the gateway node effectuates time-shifting of the selected media content channels by providing session IDs corresponding thereto (block 1714) to a standalone TSTV system or a CDN edge-based TSTV system depending on the implementation. The received weight/updates, including null weights, may be utilized in a channel annealing mechanism as before for selecting optimal single bitrates for each of non-TS media channels, whereby the managed MABR media pipe's bandwidth may be (re)allocated (block 1716).

Example process flow 1700B of FIG. 17B is illustrative of a situation where previously time-shifted media channels of non-visible VDSs may be resumed for playback upon determining that one or more such VDSs have become visible due to a change in the user's viewpoint. As before, a determination or detection is made that the subscriber has changed her point of view to a new field of view within the subscriber's VR environment (block 1752). Responsive to the detecting that the subscriber has changed her point of view to a new field of view within the subscriber's VR environment, a further determination may be made whether one or more VD screens that were outside the subscriber's field of view previously are now within the new field of view (block 1754). Responsive to the determining, weights of the media content channels on the VD screens within the new field of view (including the newly visible VDSs and/or those previously VDSs that may have become non-visible in the new field of view) may be (re)assigned or updated (block 1756). All such updates may be provided (including the null weights assigned to the new TS media content channels) to the serving gateway node for (re)allocating the bandwidth of the managed bandwidth pipe serving the subscriber's premises based on another iteration of the channel annealing mechanism (blocks 1758, 1760). As previously noted, only those weights that have been changed due to the change in the subscriber's FOV may be transmitted to the gateway node, i.e., a "delta" compression of weights, which transmission may be effectuated as pushing, pulling or as a request/response mechanism. Suitable session IDs and control messages to start playback of the previously time-shifted media content channels may be provided to the TSTV system, along with applicable bitrate requests based on the channel annealing operations, for facilitating delivery of the resumed media channels using a unicast at clamped bitrates (block 1762). It will be further realized that similar to the acts of block 710, appropriate manifest(s) may be provided to the UE/VR device by the gateway node with respect to blocks 1716 and/or 1760 responsive to bitrate selection based on channel bandwidth annealing and allocation. Moreover, the terms "allocate" and "reallocate" as well as terms of similar import may be used interchangeably in the context of the present disclosure. Likewise, terms such as "update", "assign", "reassign", and terms of similar import may also be used roughly synonymously for purposes of an embodiment of the present patent application.

Accordingly, skilled artisans will appreciate that although resumed TS channels may be accorded weights, such weights are handled differently in an example embodiment of the present invention. Consider a TSTV channel that will get a weight of 3.0 (on a visible VDS) or 0 (on a non-visible VDS) in an example. The channel annealing mechanism calculates the bitrates just like it does for MABR media channels for live sessions. Whereas for MABR media channels, the bandwidth is controlled by multicast Leave/Join operations, the bitrate for the TSTV channels is controlled by the GW node requesting the TSTV system to deliver the bitrate segments as per calculated bitrates from the annealing mechanism. If the weight is 0 then no bandwidth will be allocated to the TSTV stream and the pipe will be fully utilized for all current MABR streams. It will be appreciated that there is no need for bandwidth to be allocated for the unicast streams for channels that may be currently paused.

Embodiments of the present invention therefore provide a gateway implementation wherein gapped streams are delivered to the premises gateway for regular multicast content while unicast http content is used for TS channels since it individualized (i.e., specific to each VDS of the VR environment). The client VR device is advantageously configured to report what weights each VDS should get based on the subscriber's gaze or viewpoint, and is responsible for starting/stopping TS content as well as switching between URLs for time-shifted content or live content.

Figure 18A:
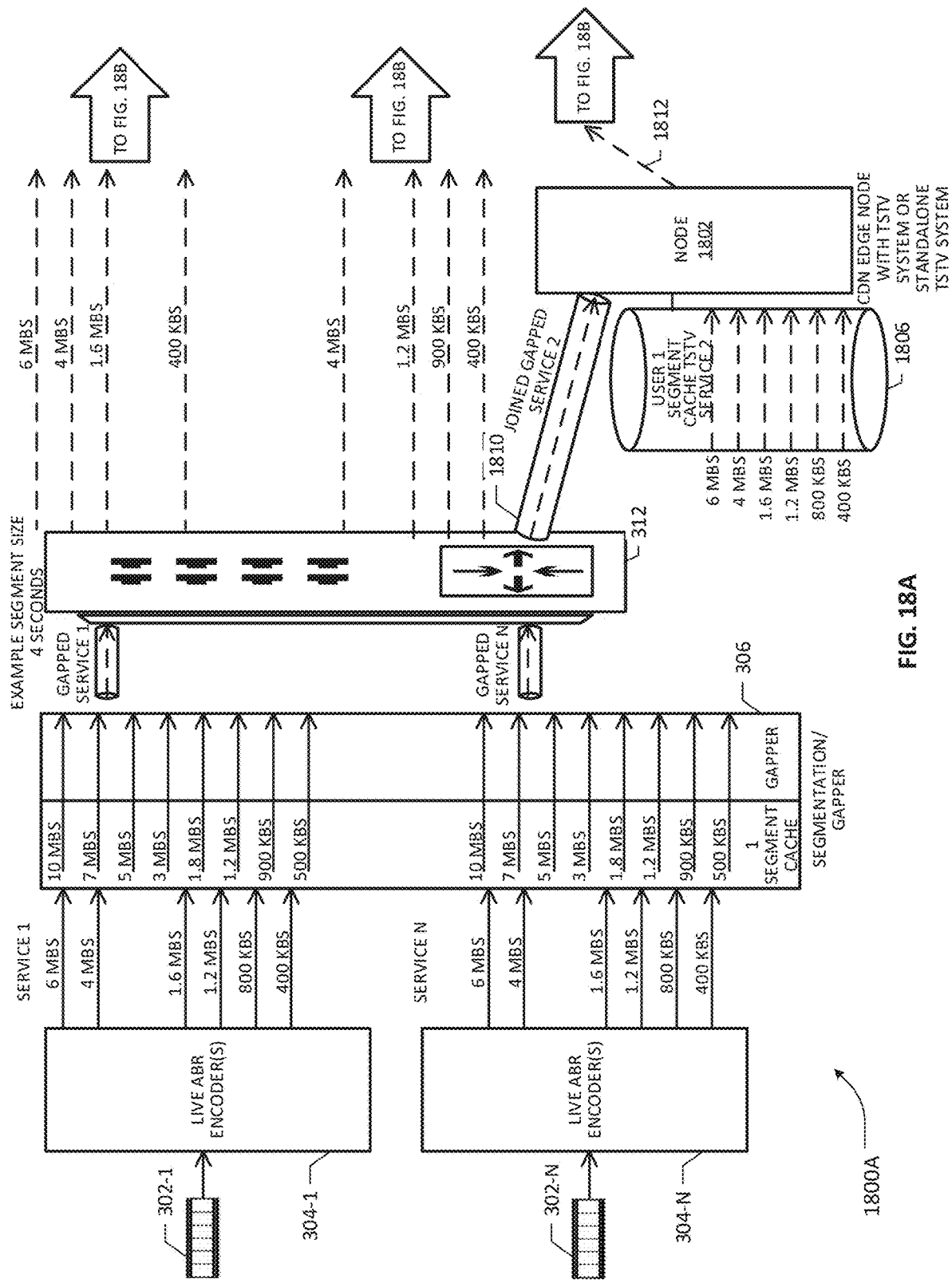
FIGS. 18A and 18B depict further details of a network portion of an example MABR network architecture of FIG. 1 for facilitating TSTV channels in a VR environment according to an embodiment for purposes of the present patent application.
Figure 18B:
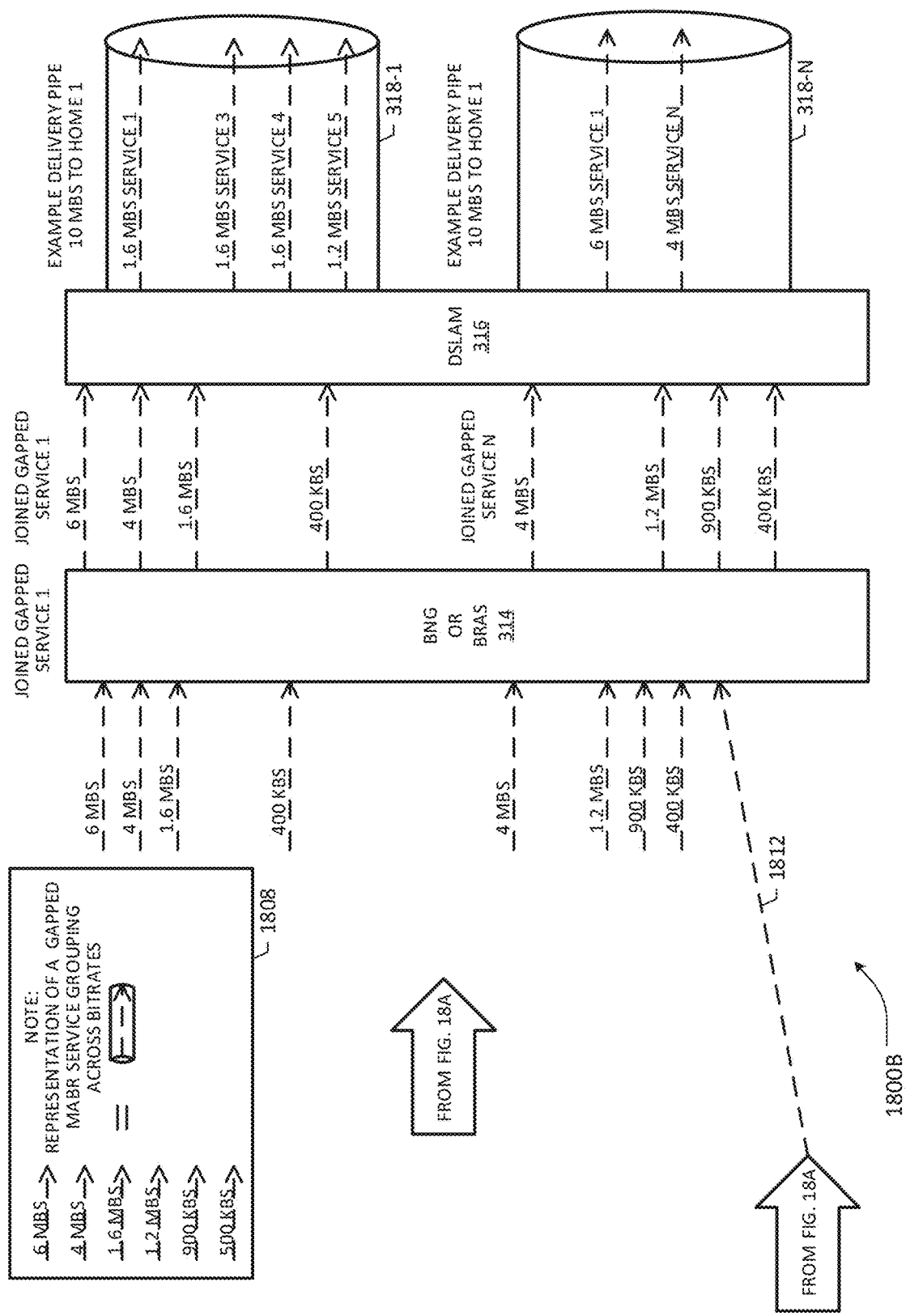

FIGS. 18A-18B depict further details of a network portion 1800A/1800B that may implemented as part of an example MABR network architecture of FIG. 1 for facilitating TSTV channels in a VR environment according to an embodiment for purposes of the present patent application. Similar to the network portion 300A-C of FIGS. 3A-3C, encoders 304-1 to 304-N are operative to receive video source feeds 302-1 to 302-N in respect of N service channels, which are provided to segmentation/gapper 306 as streams at different encoding bitrates. Each gapped service provided by segmentation/gapper 306 therefore comprises a plurality of bitrate representations as indicated by a shorthand notation or legend 1808, which are received IGMP switch 312. Joined gapped services across the select bitrates may be provided to BNG 314 as before for live sessions. On the other hand, a TSTV system 1802 receives a joined gapped service that has been selected for time-shifting, as indicated by service channel path 1810. Example TSTV system 1802 may include a database or file storage 1806 for caching the segments of the TS channels for a subscriber, which may be stored on a VDS-by-VDS basis, per subscriber IDs, as well as based on session IDs. Further, example TSTV system 1802 may be configured to provide or otherwise transmit segments of a resumed TS channel at a select bitrate to BNG 314 for delivery to the VDS via a particular subscriber pipe, e.g., pipe 318-1, based on http mechanisms.

Figure 19:
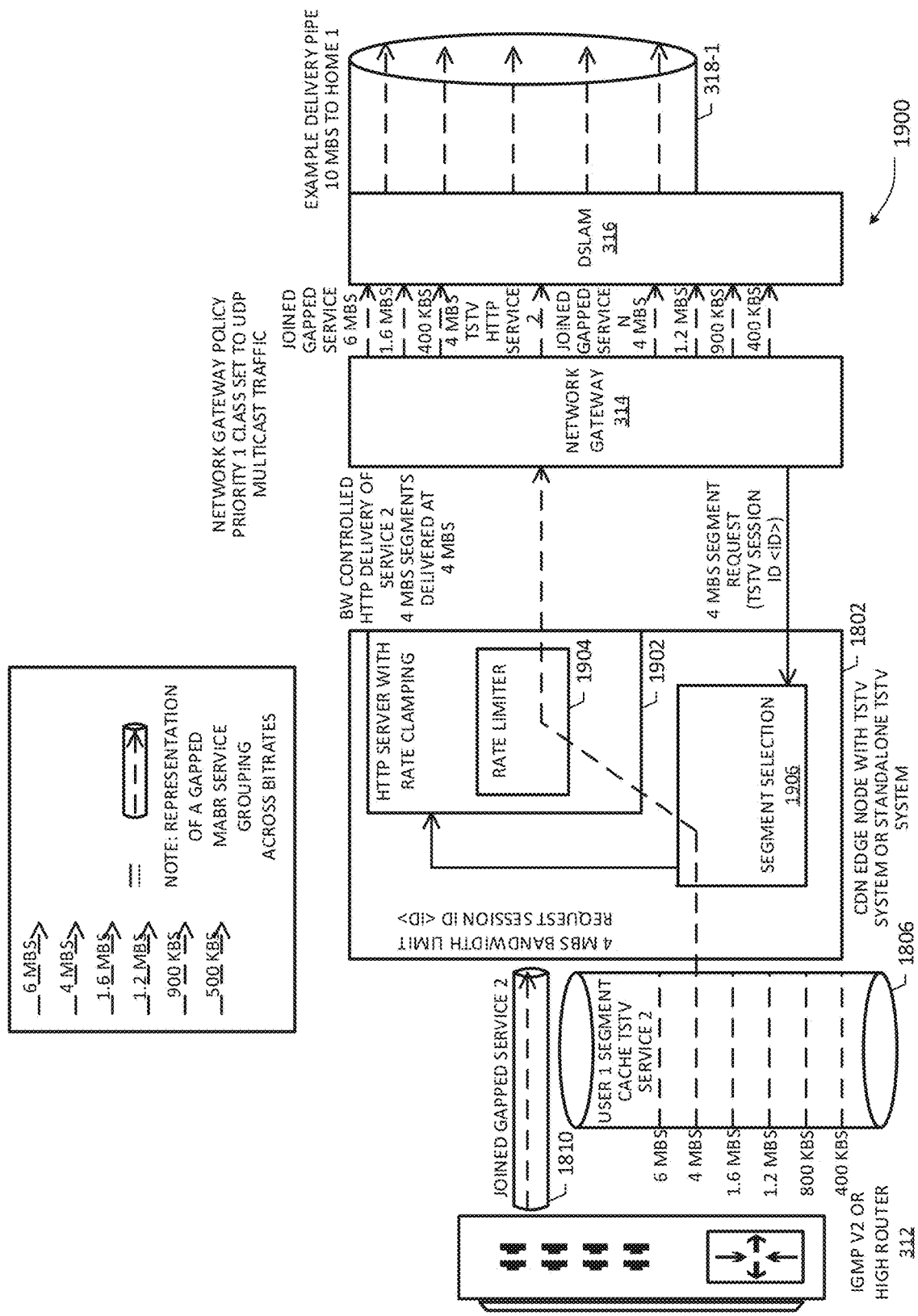
FIG. 19 depicts further details of a TSTV system that may be used in association with the network portion embodiment shown in FIGS. 18A-18B.

FIG. 19 depicts further details of a TSTV arrangement 1900 that may be used in association with the network portion embodiment shown in FIGS. 18A/18B. A segment request 1908 (including TSTV session ID and select bitrate) is received by a segment selection module 1906 of example TSTV system 1802, which generates a bandwidth limit or clamping request 1905 to a rate limiter 1904 associated with an HTTP server 1904 executing at the TSTV system 1802. As noted previously, the select bitrate may be determined based on weight assignment with respect to the VDS in conjunction with a channel annealing process executed by the premises gateway. From a cache of segments having various bitrates, a particular representation having an appropriate bitrate 1910 (based on requested bitrate and/or bitrate clamping) may be selected for transmission to BNG 314 for eventual delivery to the requesting VDS. It should be further appreciated that BNG 314 may be constrained by network gateway policies, priorities, differential servicing and classes of service, etc., with respect to the UDP traffic.

Figure 20A:
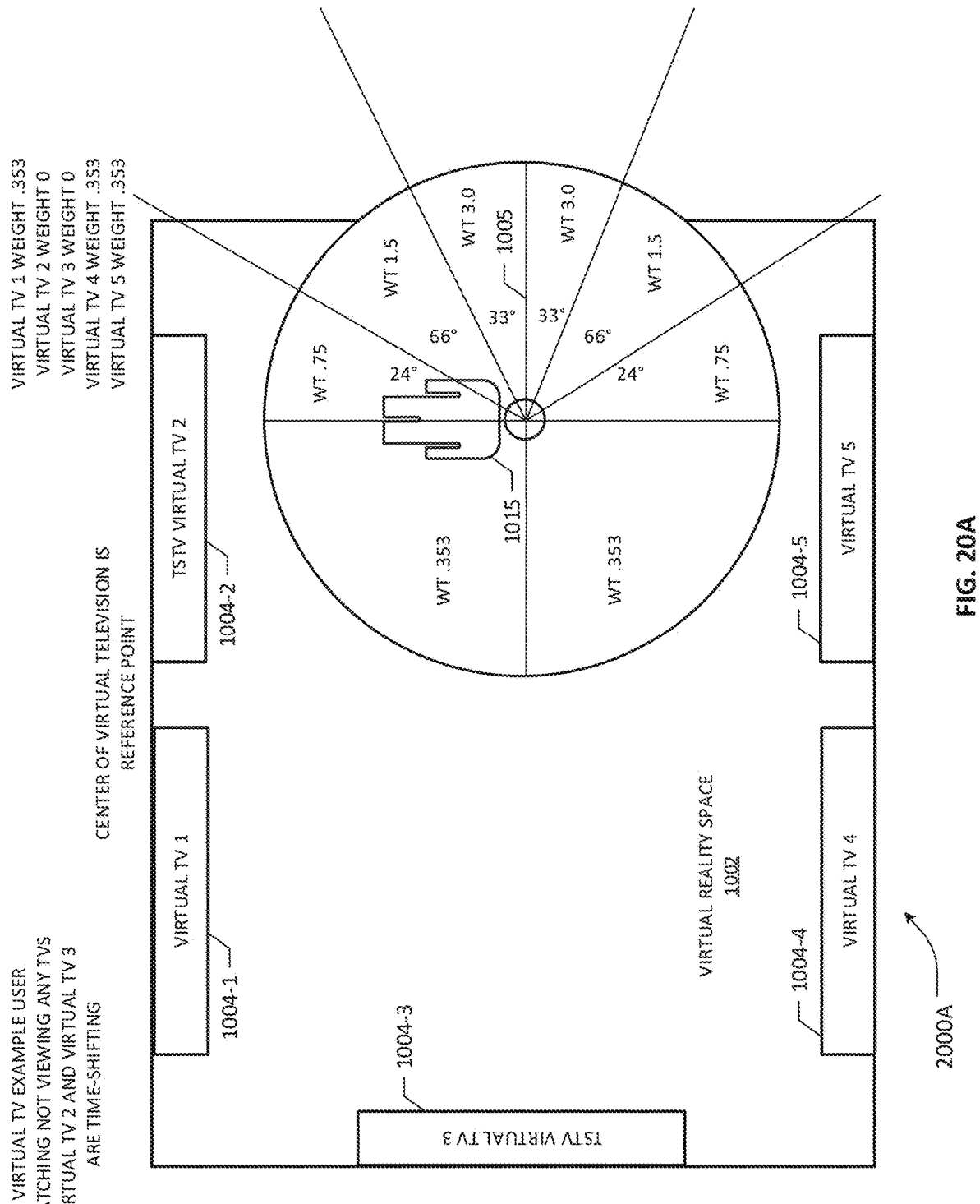
FIGS. 20A and 20B relate to example weight assignments and associated bandwidth allocation for media content channels in a VR environment having five VD screens in an illustrative use case scenario involving time-shifting of one or more channels.
Figure 20B:
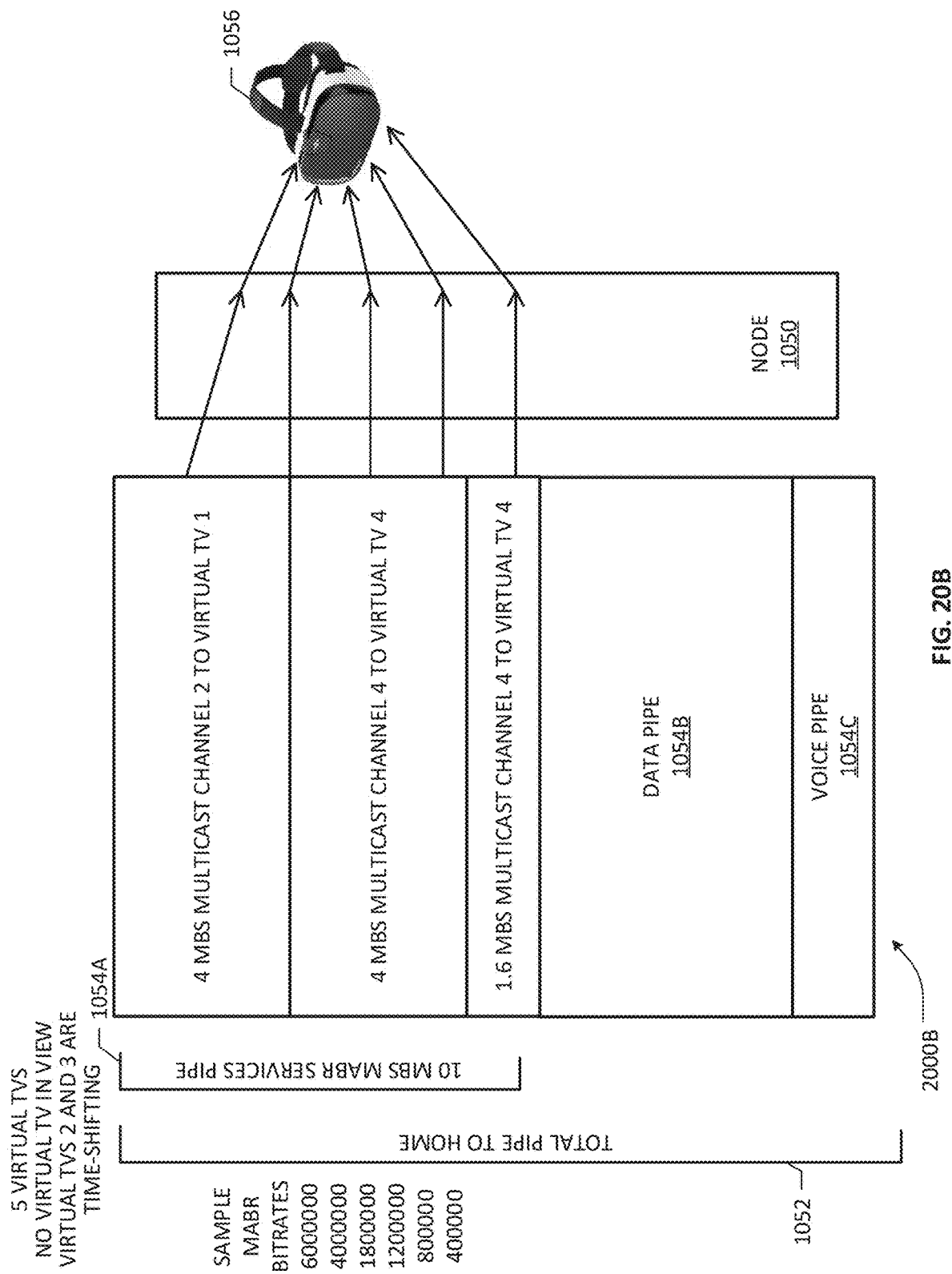

Various illustrative use case scenarios relating to example weight assignments and associated bandwidth allocations for media content channels in a VR environment or VR space having five VD screens are set forth at FIGS. 20A/20B to 23A/23B, where a user/subscriber changes or shifts her viewpoints in relation to the VR spatial environment and selects different media channels to be time-shifted. Similar to the example scenario 1000A shown in FIG. 10A, scenario 2000A of FIG. 20A represents a situation where subscriber 1015 is disposed in a VR space 1002 having five VTVs VTV-1 to VTV-5 (referred to by reference numerals 1004-1 to 1004-5) at or along different "walls" of the space 1002. Whereas the subscriber 1015 is not viewing any VTVs directly, VTV-2 and VTV-3 are selected for or set to time-shifting. Accordingly, each of the non-TS VTVs is given a minimum available weight, e.g., 0.353, while VTV-2 and VTV-3 each get a null or zero weight. As in the example implementation of FIG. 10A, a 360-degree field of view 1006 of the user 1015 may be partitioned into "high" weighted areas 1008A/1008B, "medium" weighted areas 1010A/1010B, "low" weighted areas 1012A/1012B that are within the 180-degree peripheral field, the areas being demarcated in relation to the user's viewpoint line 1005 (directly looking ahead, for example, in the VR space 1002). Non-visible areas 1014A/1014B (e.g., behind-the-head areas) may be given lowest available weights possible, consistent with the example implementation of the scenario 1000A set forth in FIG. 10A.

Figure 10B:
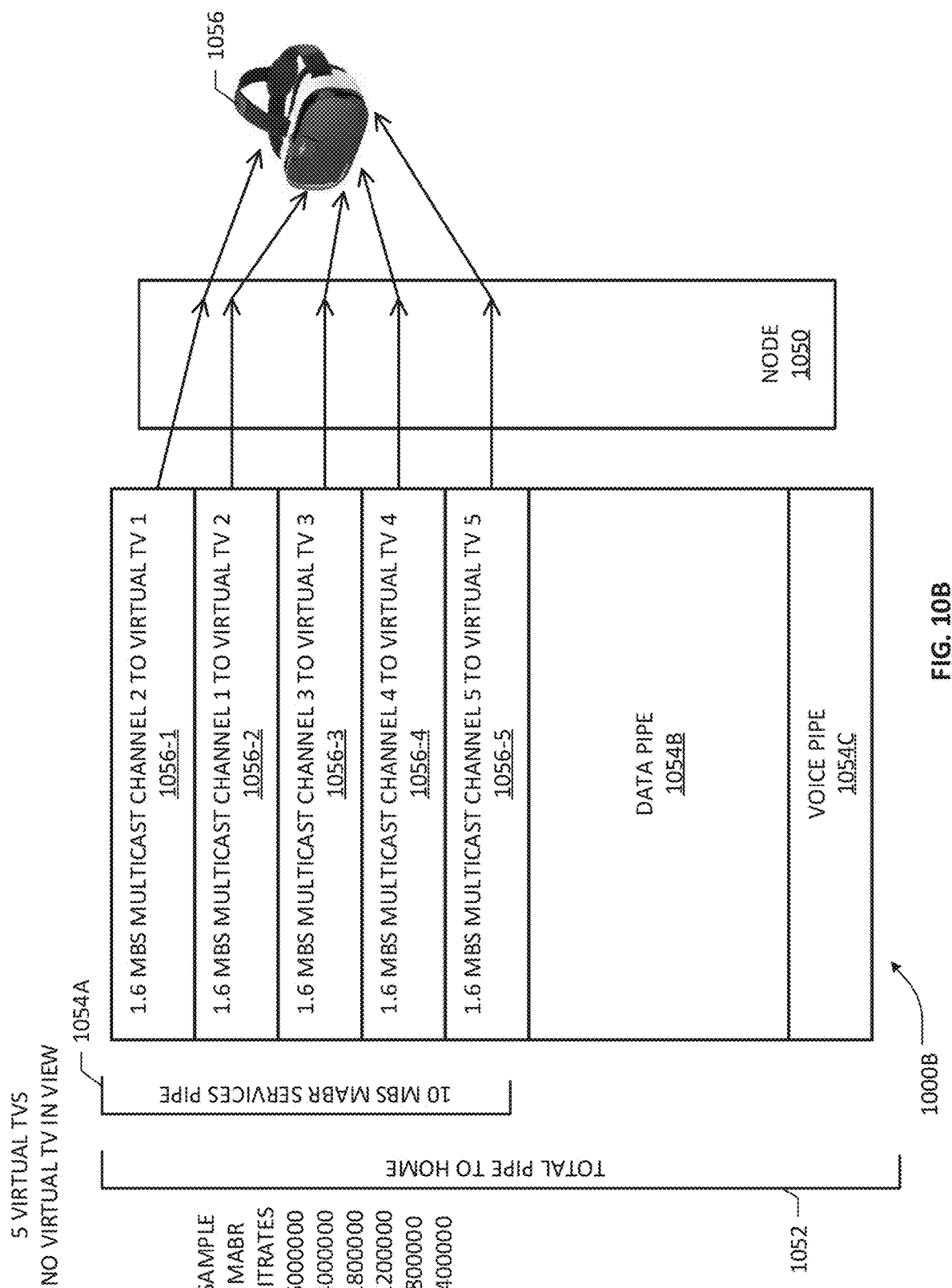

Corresponding to the weight distributions provided to the VTVs in the scenario of FIG. 20A, an example bandwidth allocation scheme 2000B illustrates a subscriber bandwidth pipe 1052 provided to a gateway 1050 of subscriber premises that includes a VR device or apparatus 1056. As before, the total bandwidth of the subscriber pipe 1052 may be apportioned into a 10-Mbs managed MABR video pipe 1054A serving VR environment 1002, a data communications pipe 1054B as well as a voice communications pipe 1054C. Because of the null weights assigned to VTV-2 and VTV-3, no bandwidth is allocated to the TS channels corresponding to these VTVs. Although equal weights are accorded to the remaining VTVs, VTV-1 and VTV-4 are allocated 4 Mbs each while VTV-5 is allocated only 1.6 Mbs, based on the available sample MABR bitrates, while maximizing the pipe's utilization. Accordingly, it should be appreciated that compared to the bandwidth allocation scheme 1000B of FIG. 10B, VTV-1 and VTV-4 now have a higher bandwidth, hence better quality of video, in the example allocation scheme 2000B.

Figure 21A:
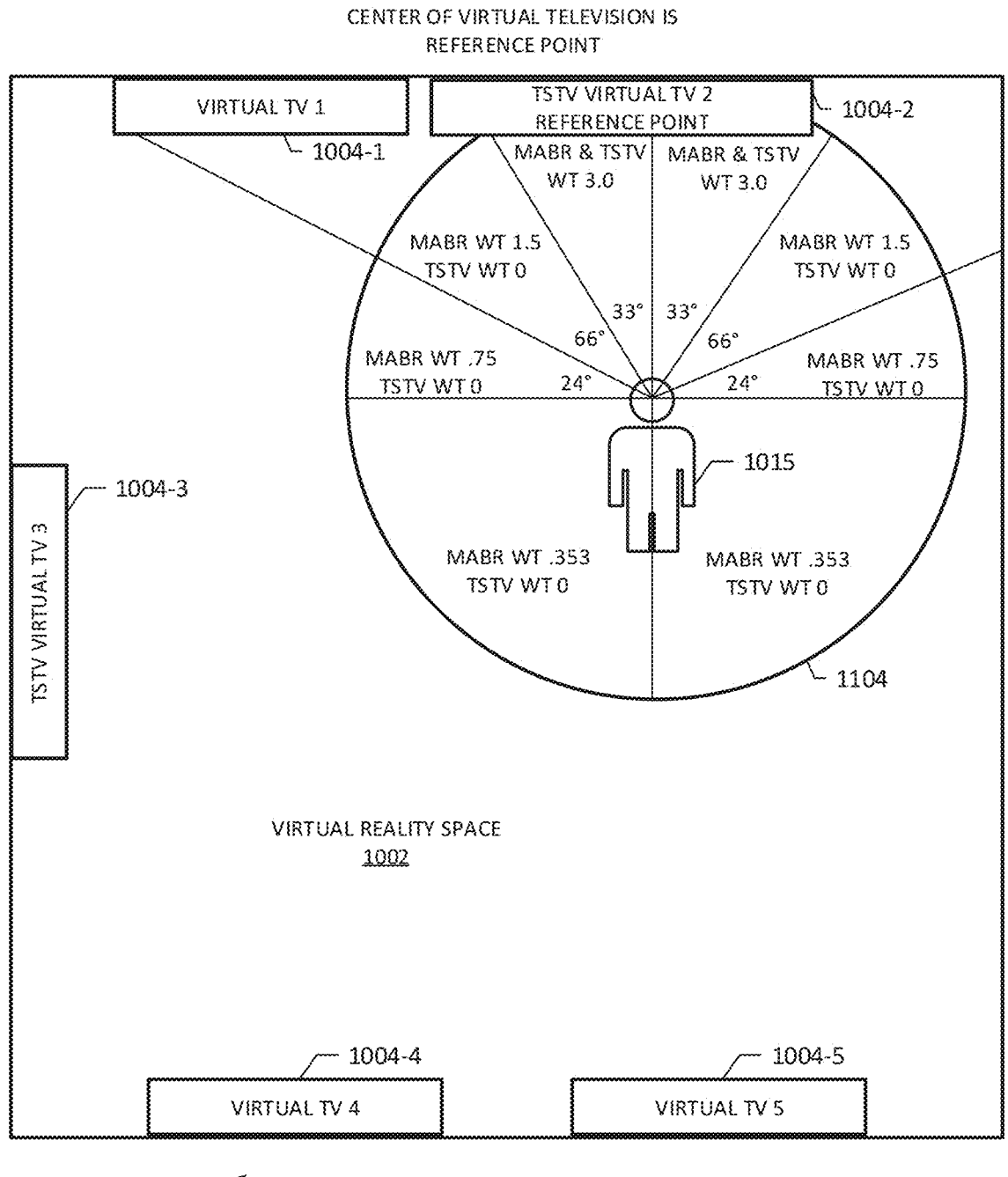
FIGS. 21A and 21B relate to example weight assignments and associated bandwidth allocation for media content channels in a VR environment having five VD screens in another illustrative use case scenario involving time-shifting of one or more channels.
Figure 21B:
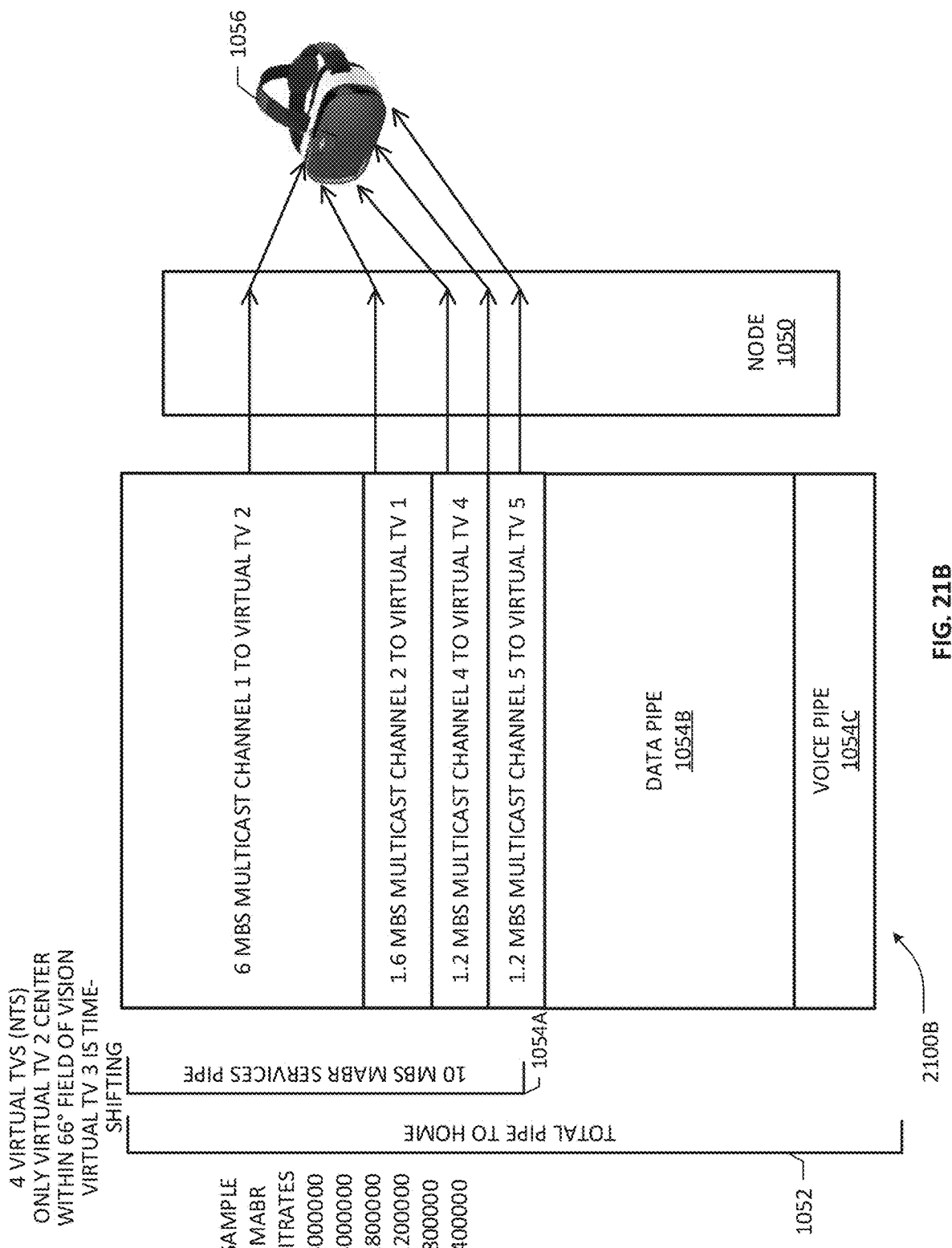

FIGS. 21A and 21B relate to another illustrative use case scenario 2100A where a single VTV is directly viewed, another one in the peripheral vision and the remaining VTVs being unviewed, while one of unviewed VTVs is in TS mode rather than playing at a low bitrate. Similar to the scenario 1100A shown in FIG. 11A, a new viewpoint 1105 of the user 1015 defines a new/current reference axis in this use case scenario, with VTV-2 1004-2 being directly viewed (which was previously in TS mode), VTV-1 1004-1 being in a peripheral field, with VTV-3 remaining in TS mode. The weight assignment process of the present invention may therefore (re)assign or update the previously-assigned weights accordingly as shown in FIG. 21A, which results in an allocation scheme for four non-TS VTVs as set forth in FIG. 21B. Higher bandwidth allocation is provided for the resumed channel shown on VTV-2 because of its weight being updated to 3.0, e.g., 6 Mbs allocation as exemplified in the allocation scheme 2100B of FIG. 21B. VTV-1 being a peripheral screen gets an updated weight of 0.75, resulting in a smaller bandwidth allocation therefor, as before. However, VTV-4 and VTV-5 enjoy a higher bandwidth allocation than was available under the allocation scheme of 1100B.

Figure 22A:
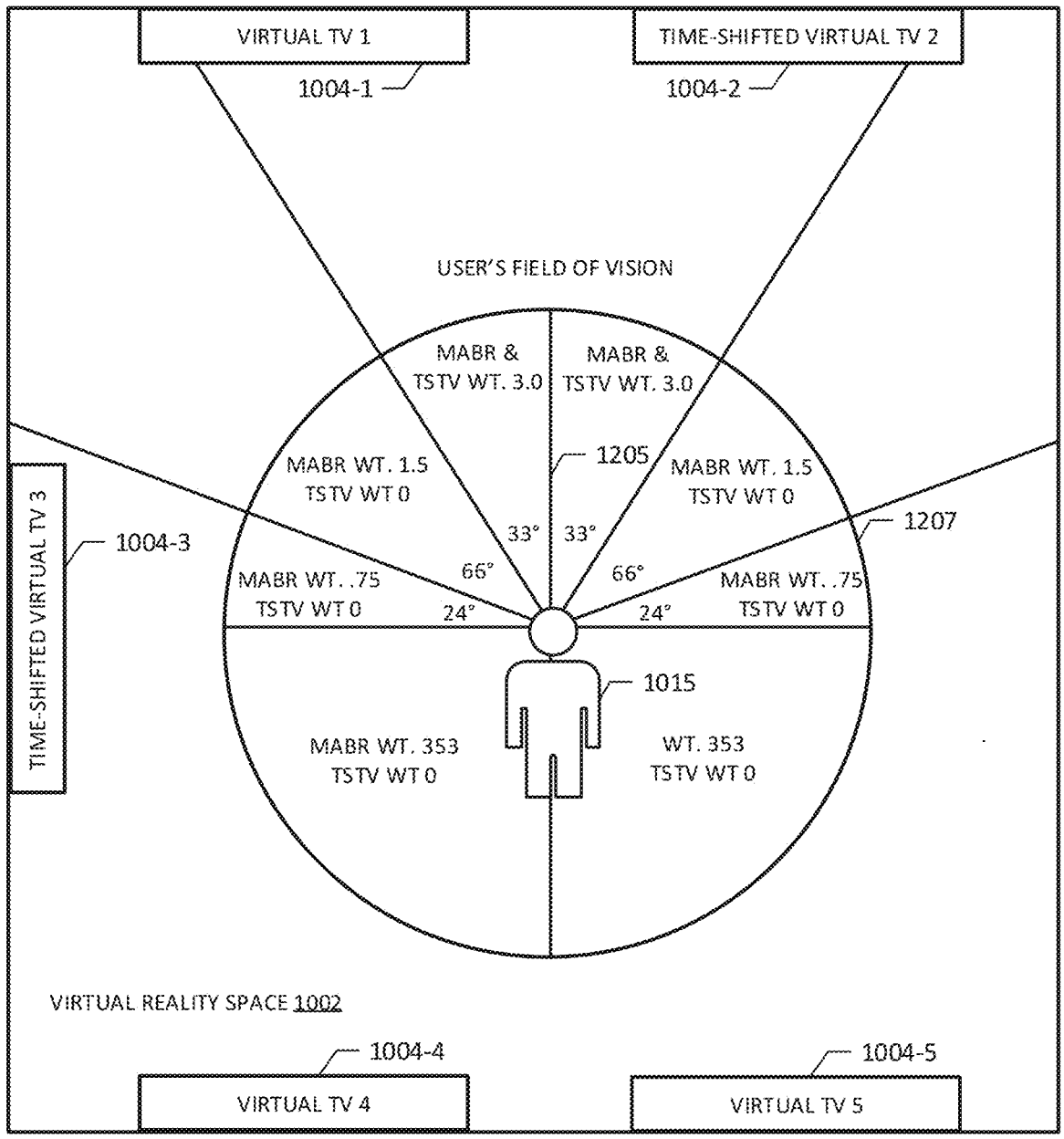
FIGS. 22A and 22B relate to example weight assignments and associated bandwidth allocation for media content channels in a VR environment having five VD screens in yet another illustrative use case scenario involving time-shifting of one or more channels.
Figure 22B:
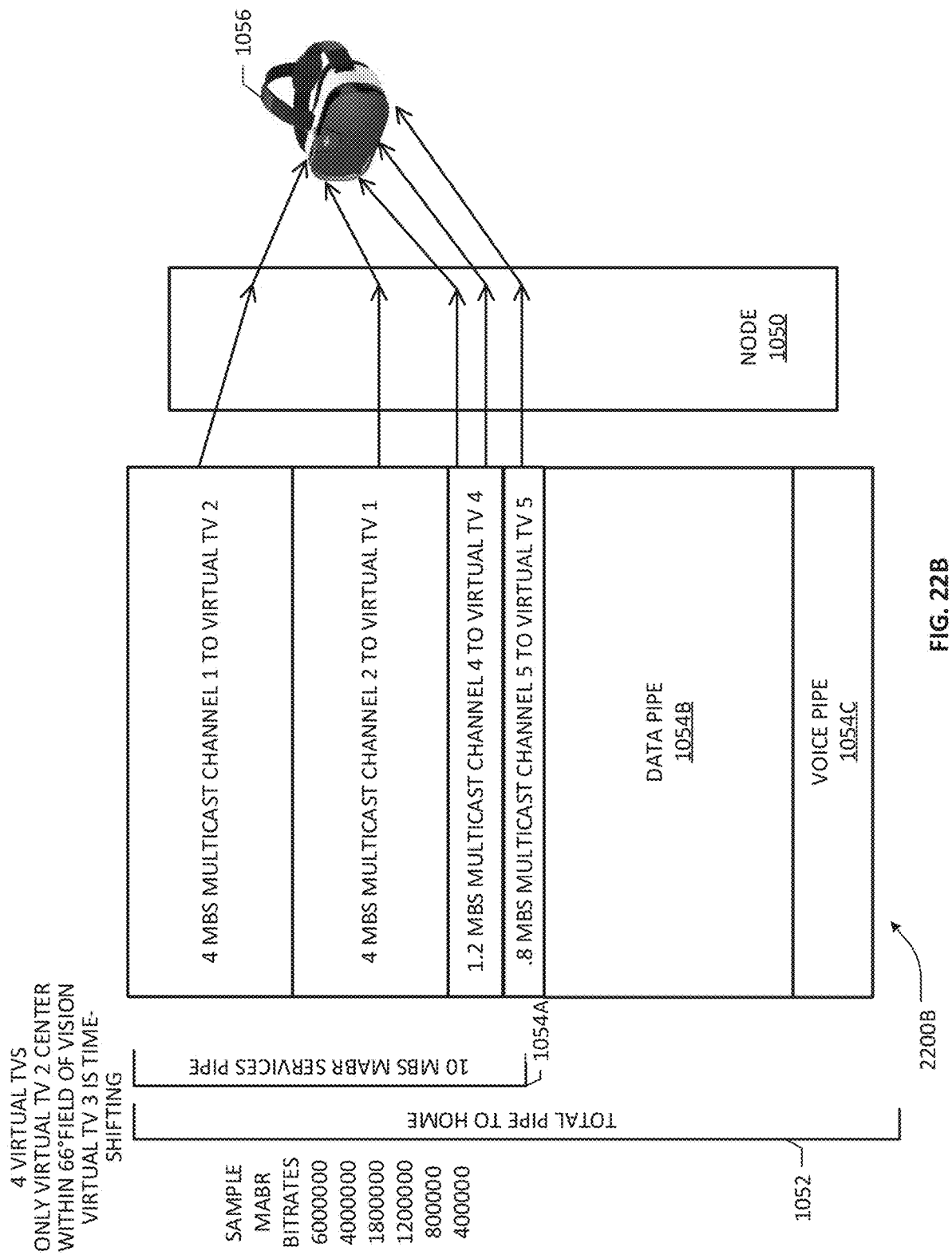
Figure 23A:
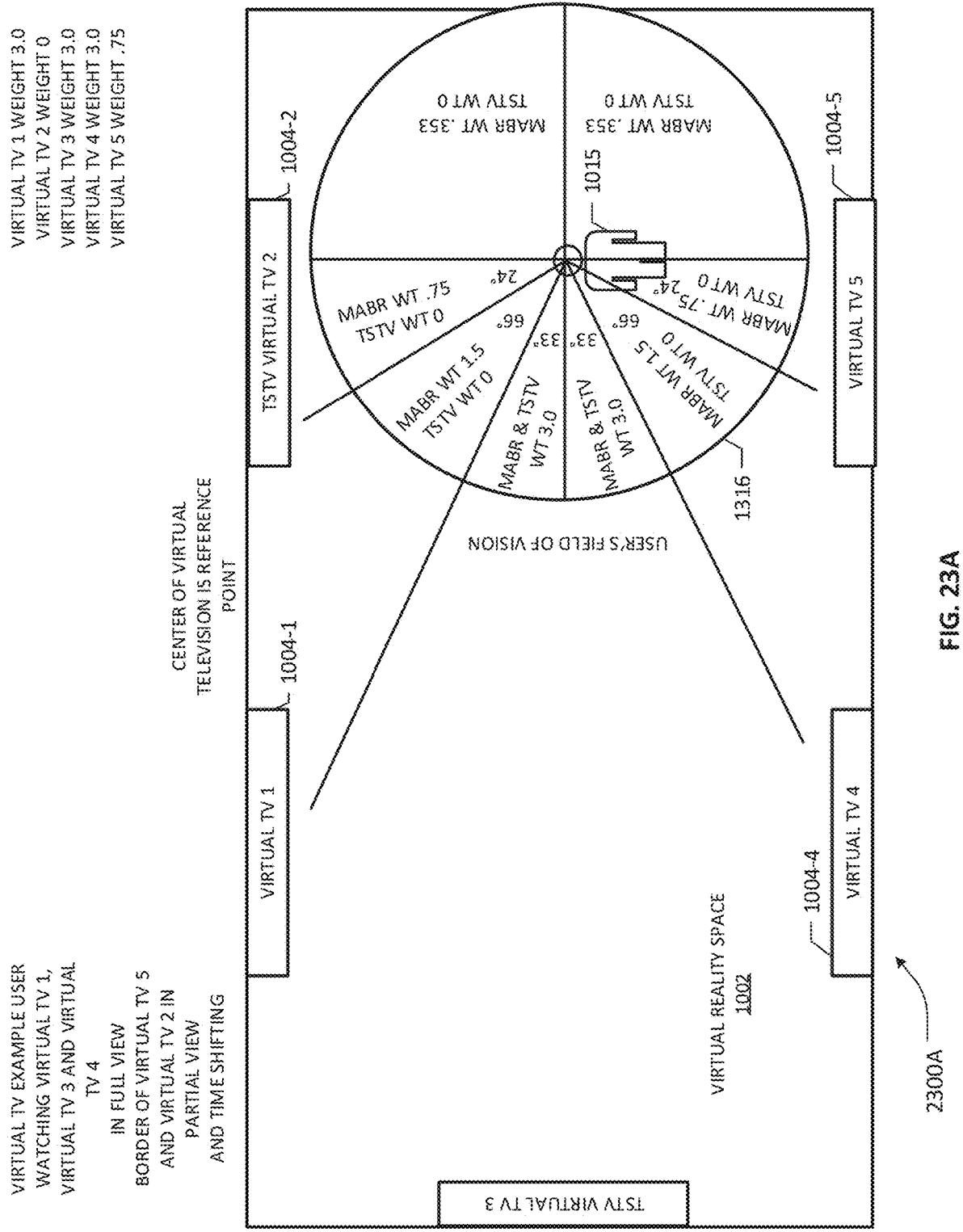
FIGS. 23A and 23B relate to example weight assignments and associated bandwidth allocation for media content channels in a VR environment having five VD screens in yet another illustrative use case scenario involving time-shifting of one or more channels.
Figure 23B:
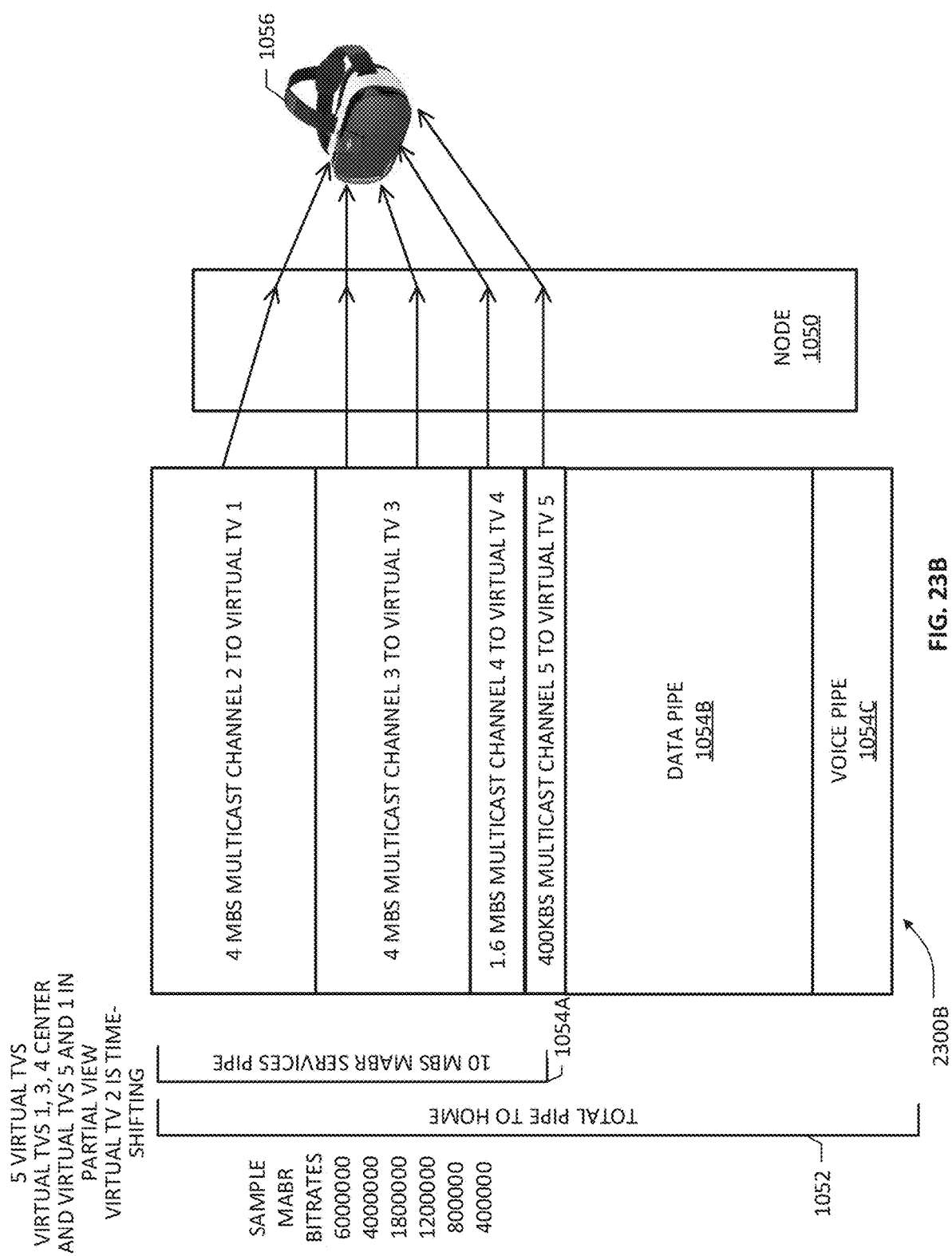

FIGS. 22A and 22B relate to example weight assignments and associated bandwidth allocation for media content channels in a VR environment having five VD screens in yet another illustrative use case scenario 2200A where two VTVs (VTV-1 and VTV-2) are in direct view (despite VTV-2 still potentially playing non-current content, i.e., TS content), VTV-3 is in peripheral view, and remaining VTV-4 and VTV-5 are not visible at all. Corresponding bandwidth allocation scenario 2200B accordingly illustrates 4 Mbs allocations for Channel 1 and Channel 2 showing on VTV-1 and VTV-2 (which may be showing TS content), respectively, each having a weight of 3.0. Bandwidth allocations for the remaining channel are also correspondingly adjusted based on the new selected single bitrate representations for them in accordance with the teachings of the present patent disclosure. A still further illustrative use case scenario 2300A and related bandwidth allocation scheme 2300B are shown in FIGS. 23A and 23B. In the scenario 2300A, three VTV screens (VTV-1, VTV-3 and VTV-4) are within a direct view cone of the subscriber's field of view 1316 (similar to the scenario 1300A of FIG. 13A), and hence may be deemed as being looked at directly, thereby getting an equal weight of 3.0, although VTV-3 may be resuming playback of content that was previously time-shifted. The remaining two VD screens (VTV-2 and VTV-5) are still visible but near the visual periphery of the subscriber 1015. As VTV-2 is selected for TS, it gets a weight of 0, while VTV-5 is non-TS and therefore is assigned a low 0.75 weight. Because there is not enough bandwidth to fit all four non-TS VTVs at their weights, when bandwidth is distributed, available bitrates may be chosen in an unintuitive manner as in the bandwidth allocation scheme 1300B of FIG. 13B. However, it can be seen that the bandwidth allocation for VTV-3 has improved in the scheme 2300B (4 Mbs here vs. 1.6 Mbs in scenario 1300B) due to the reclaimed bandwidth now available because of time-shifting of VTV-2. Thus, one skilled in the art will recognize that first two screens, VTV-1 and VTV-3, in the same weight class, are arbitrarily allowed more bandwidth than VTV-4, which is also in the same weight class.

Figure 24A:
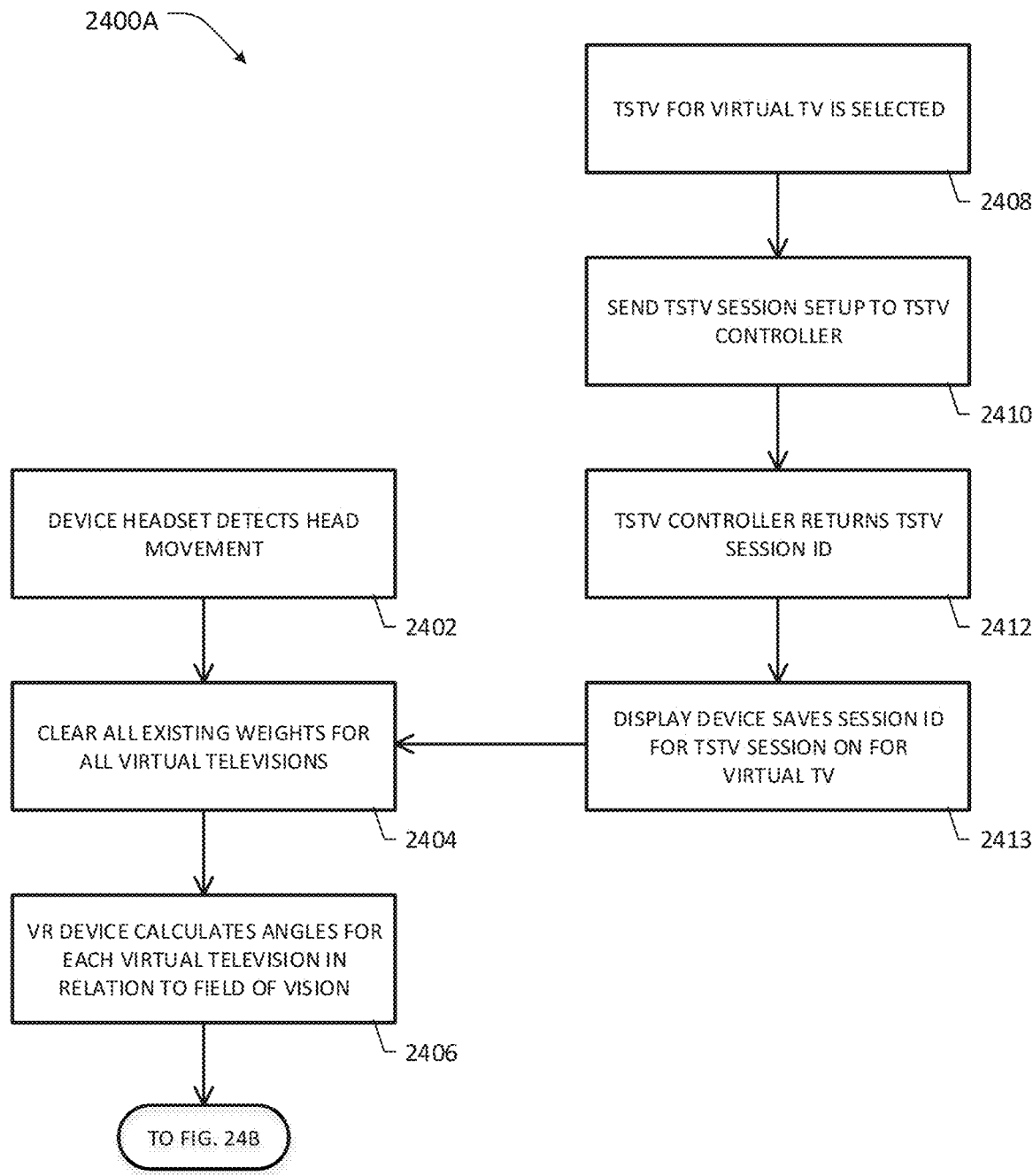
FIGS. 24A and 24B depict portions of a flowchart comprising various blocks, steps and/or acts that may be (re)combined in one or more arrangements that illustrate a process flow for delivering TS content to a VD screen according to an embodiment of the present invention.
Figure 24B:
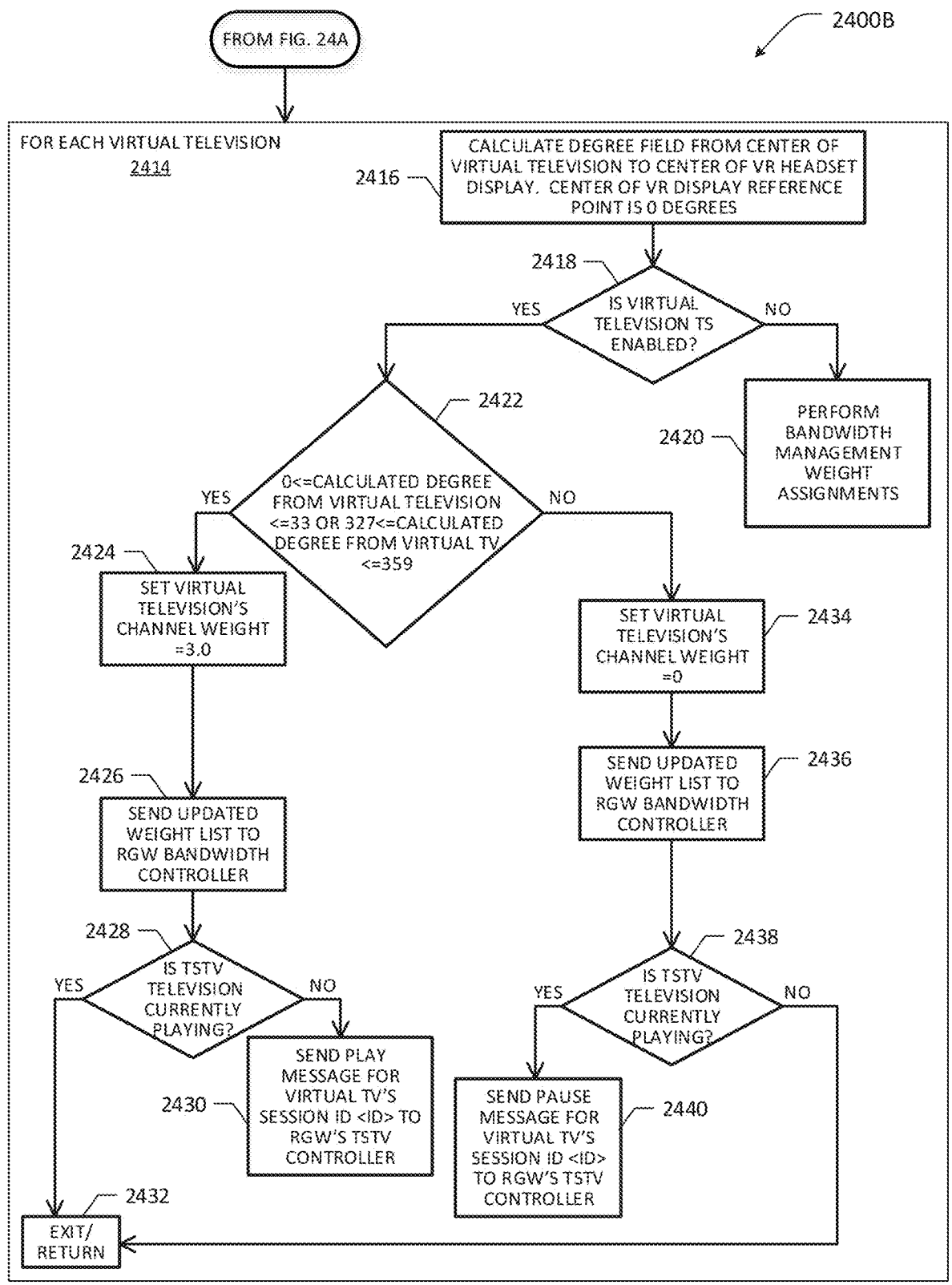
Figure 26A:
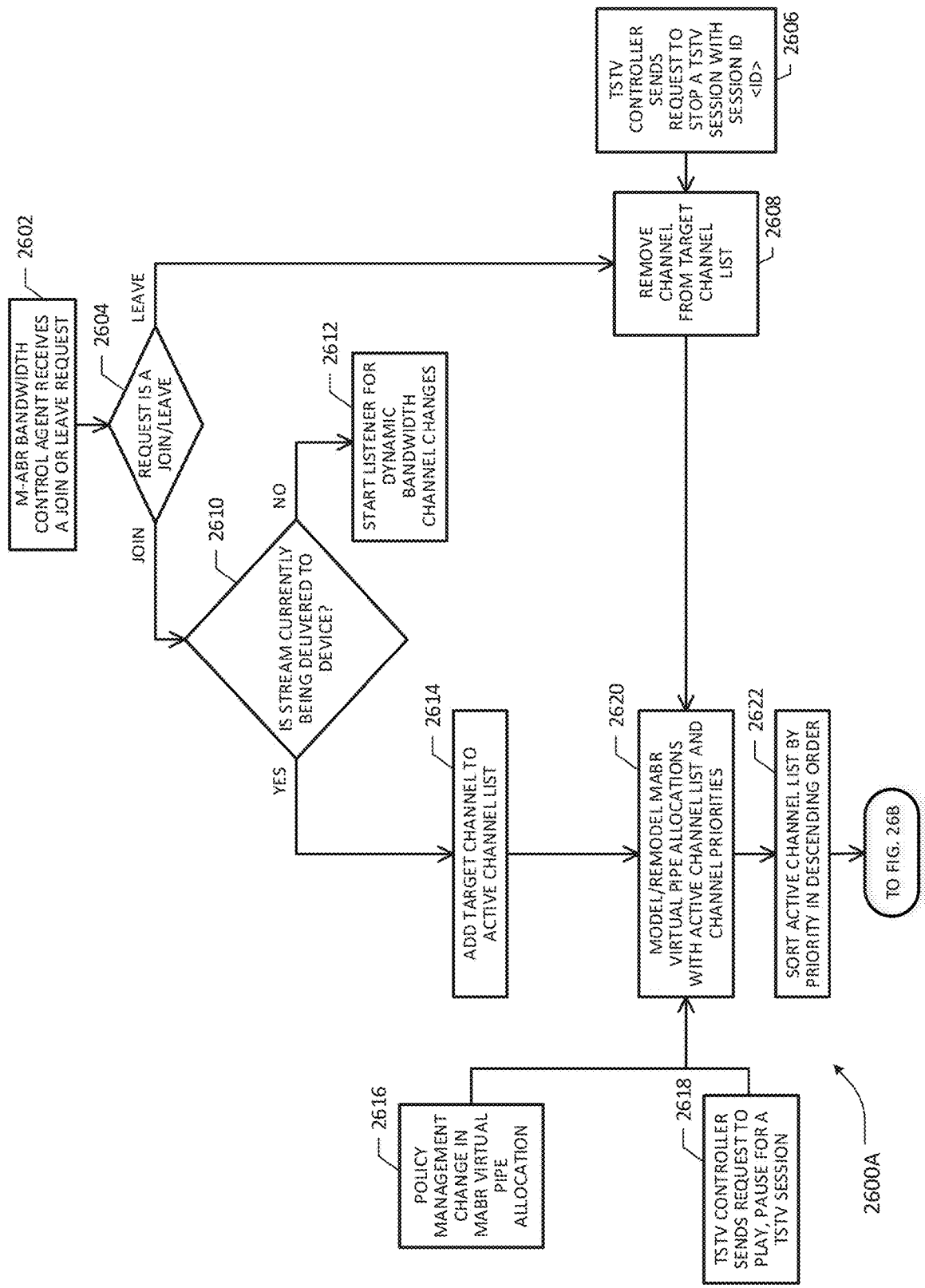
FIGS. 26A-26D depict portions of a flowchart comprising various blocks, steps and/or acts that may be (re)combined in one or more arrangements that illustrate an example channel annealing mechanism for selecting media content channel bitrates in view of time-shifting of select channels according to one embodiment of the present patent disclosure.
Figure 26B:
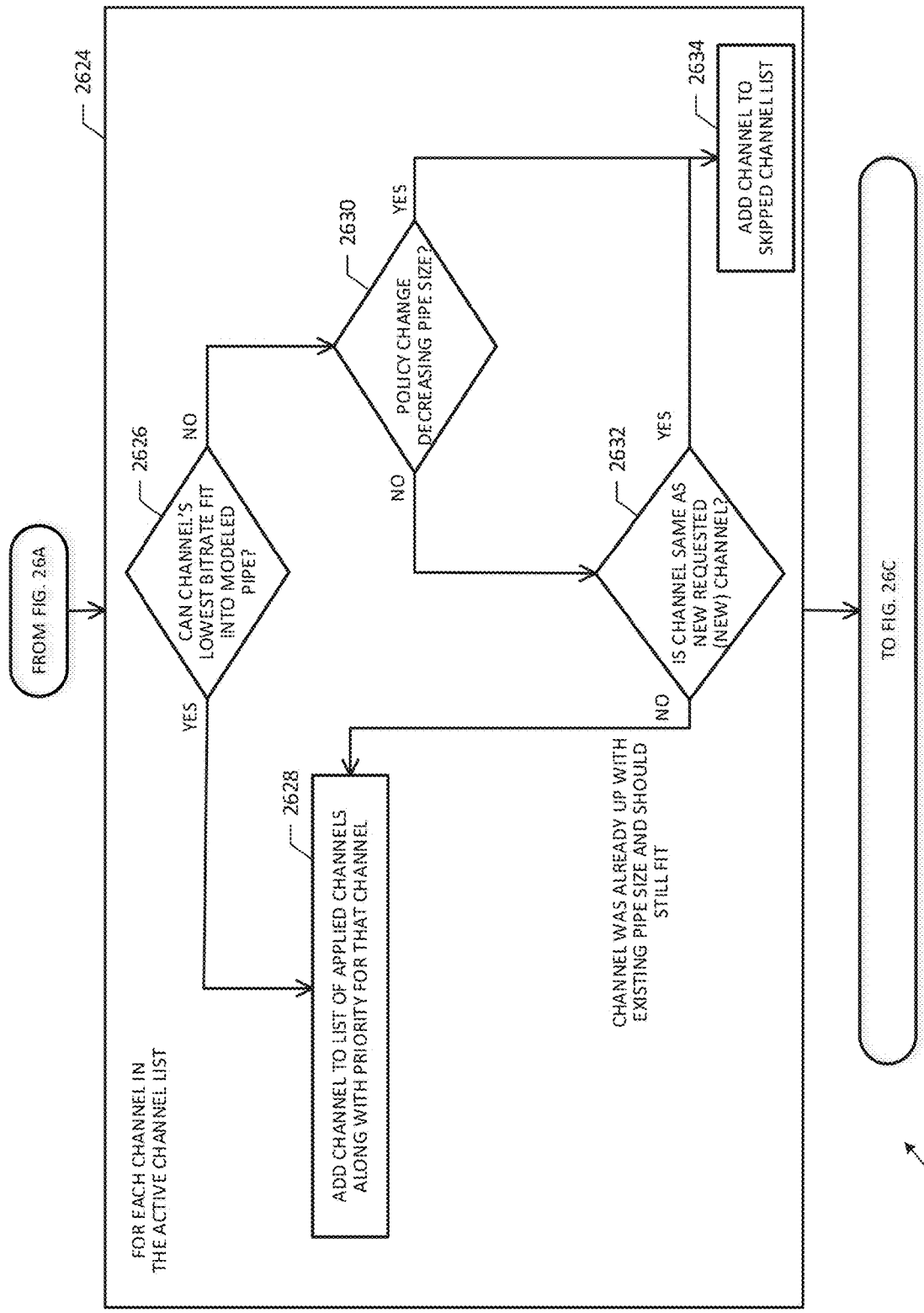
Figure 26C:
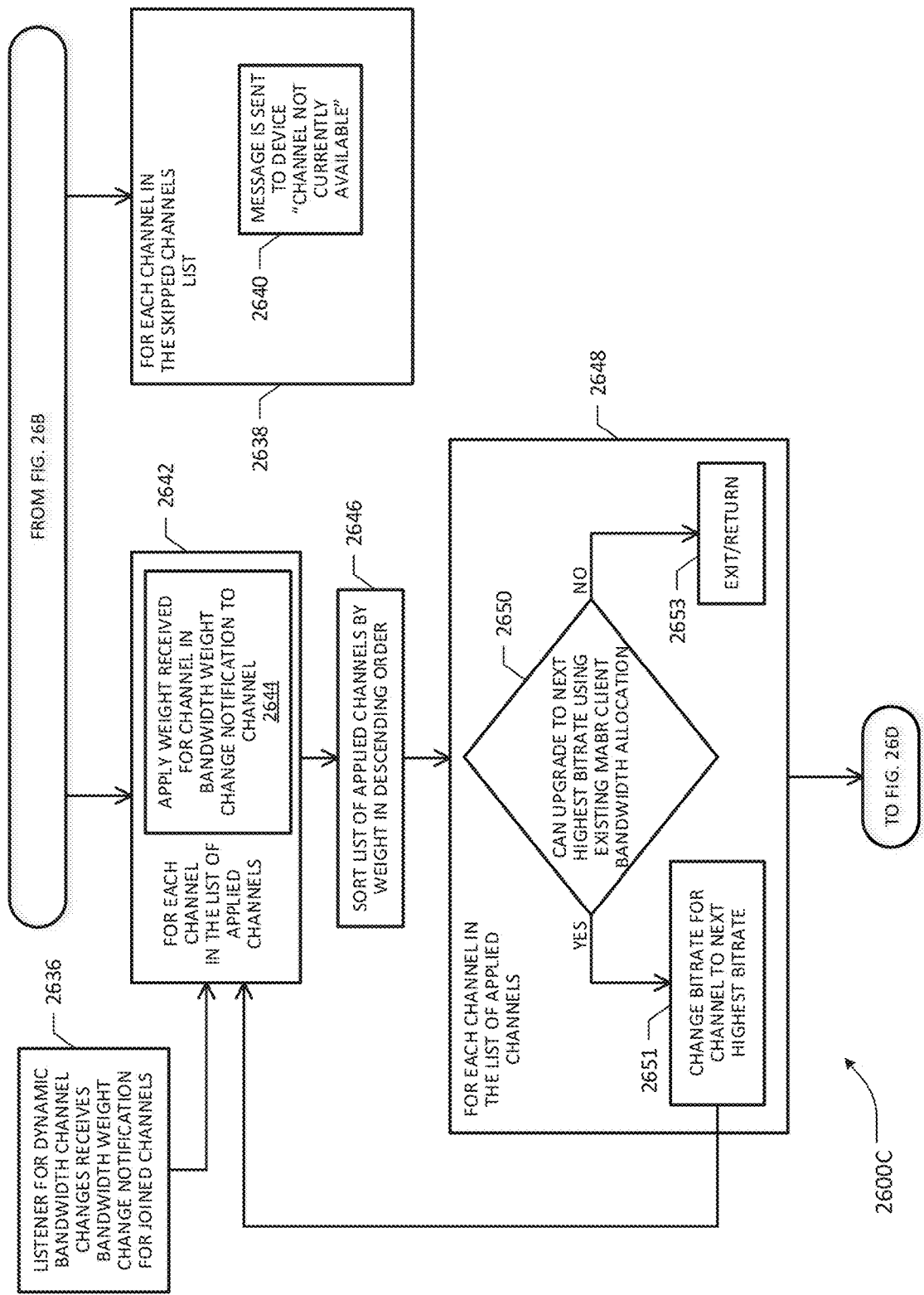
Figure 26D:
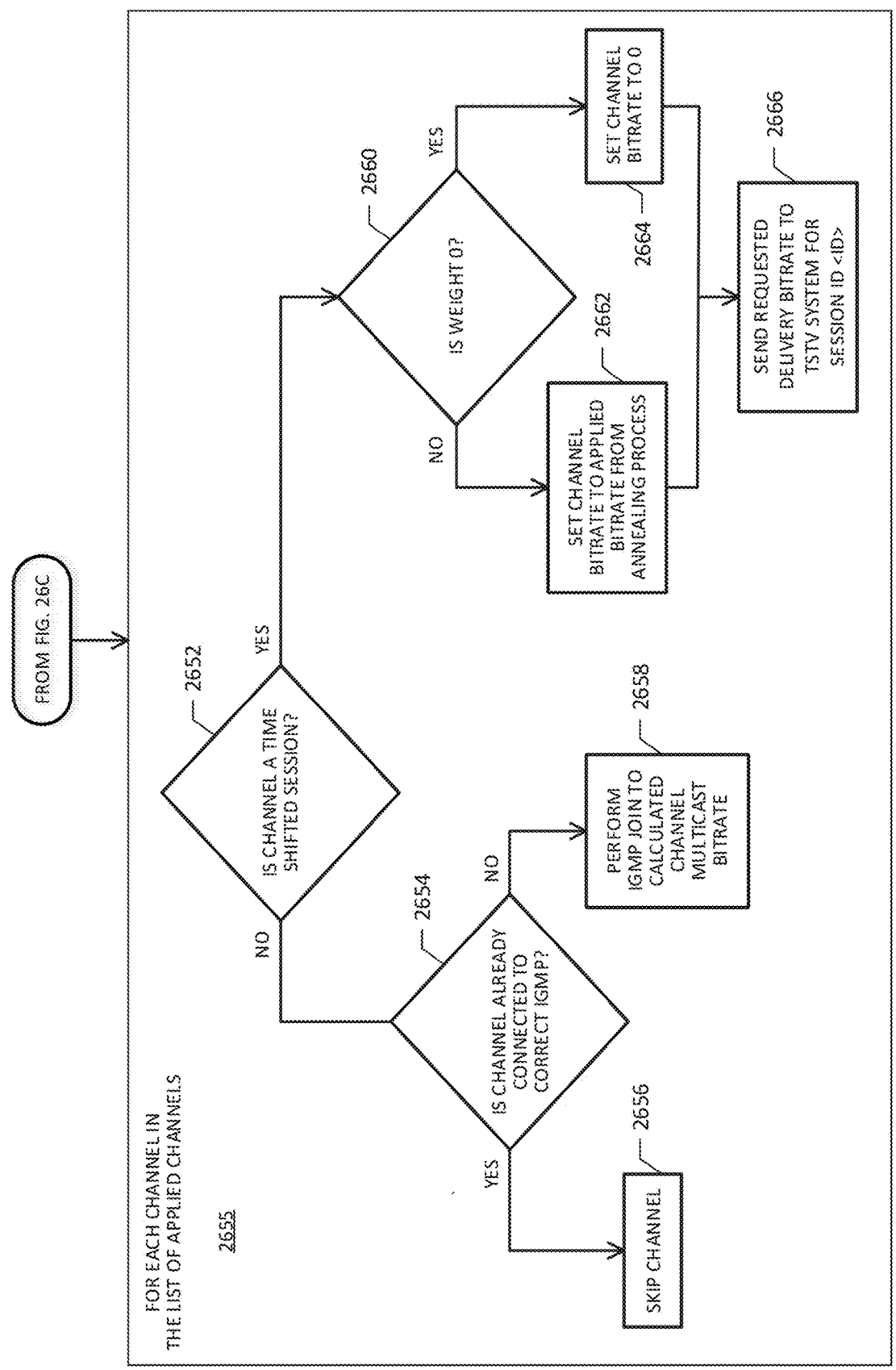

FIGS. 24A and 24B depict portions of a flowchart of various blocks, steps and/or acts that may be (re)combined in one or more arrangements that illustrate a process flow 2400A/2400B for delivering TS content (i.e., playback or resumption of play) to a VD screen according to an embodiment of the present invention. At block 2402, subscriber's VR device headset detects the subscriber's head movement. Responsive thereto, existing weights for all VD screens or TVs may be cleared (block 2404), similar to the embodiment of FIG. 8. Separately, the subscriber may also select TS settings for a select number of VDSs, responsive to which session setup messages may be sent to a TSTV controller of the serving gateway (blocks 2408 and 2410). TSTV controller accordingly allocates/returns TSTV session IDs for the selected TS channels, which may be saved by the VR device for the corresponding VDSs (blocks 2412 and 2413). This information may also be provided or used in clearing the existing weights as part of weight initialization in one implementation. At block 2406, the VR device calculates angles for each VD screen in relation to the subscriber's field of vision. A weight-based TS delivery loop 2414 is then executed for each VD screen, which may involve at least portions of some of the embodiments set forth elsewhere in the present disclosure depending on whether or not TS is enabled for a VDS (e.g., as set forth blocks 2418 and 2420). At blocks 2416, a degree field or a line of field from the center of a VD screen to the center of the VR display device (or some other reference point with respect to the VR display device) is calculated, e.g., as a 0-degree reference axis. If the VDS is enabled for TS (block 2418), the VDS's angular distance is compared against a cone of high visibility (e.g., within ±33 degrees), as set forth at block 2422. If the TS-enabled VD screen is within this cone, the media content channel associated with that VD screen is set to having a high weight value of 3.0. The updated weight is provided to the gateway's bandwidth controller, as set forth at block 2426. Otherwise, if the VDS is not in a predetermined cone of visibility, the associated media content channel's weight is set to null (block 2434), which is also sent to the gateway's bandwidth controller, as set forth at block 2436. If the TS-enabled VDS in the visibility zone is currently playing (block 2428), the process flow exits or returns to next VDS. If the TS-enabled VDS in the visibility zone is currently not playing (block 2428), the process flow 2400A/B proceeds with issuing a Play message for the corresponding session ID to the gateway's TSTV controller (as set forth at block 2430).

On the other hand, if a null-weighted VDS is currently playing (block 2438), a Pause message for the corresponding session ID may be provided to the gateway's TSTV controller (as set forth at block 2440). However, if the null-weighted VDS is currently not playing (block 2438), the process flow 2400A/B exits or returns to next VDS.

FIGS. 25A-25D are flowcharts of various blocks, steps and/or acts that may be (re)combined in one or more arrangements that illustrate various TSTV-related control processes that may be effectuated with respect to a TS session controlled at a gateway node, a network node, or at a cloud-centric node according to one or more embodiments of the present invention. FIG. 25A sets forth a process 2500A concerning starting a TSTV session. At block 2502, a client VR device sends a request (e.g., may be generated responsive to head movement or otherwise) to start a VR TSTV session for a designated media content channel. At block 2504, a TSTV controller sends a request to start or initiate a TSTV session for the designated channel and subscriber ID to a serving TSTV system, which responds with a session ID and associated URL for the requested channel (block 2506). TSTV controller saves the session ID and TSTV content's URL for the requesting VDS and associated channel (block 2508), which information is also transmitted to the VR device (block 2510). Optionally or otherwise, if the user continues to gaze at the now TS-enabled VDS, a Play request may be generated by the TSTV controller to the TSTV system, as set at block 2512.

FIG. 25B depicts a process 2500B concerning playing a TSTV session. At block 2522, a client VR device sends a Play request (e.g., may be generated responsive to head movement or otherwise) to play a VR TSTV session for a designated media content channel with a desired bitrate. In response, at block 2524, a TSTV controller sends a request to the MABR bandwidth control agent for playing a TSTV session for a channel having session ID and associated URL, which is then propagated to the serving TSTV system (block 2526). At block 2528, the TSTV system responsive to the session ID and URL information begins delivery of segments from a known point in time of the stream (e.g., at the last Pause request) or at the start of a new session.

FIG. 25C depicts a process 2500C concerning pausing a TSTV session. At block 2532, a client VR device sends a Pause request (e.g., may be generated responsive to head movement or otherwise) to pause a VR TSTV session for a designated media content channel. In response, at block 2534, a TSTV controller sends a request to the MABR bandwidth control agent for pausing a TSTV session for a channel having session ID and associated URL, which is also propagated to the serving TSTV system (block 2536). At block 2538, the TSTV system responsive to the session ID and URL information stops delivery of segments, the exact location of the segment at which pausing took place being stored for future use.

FIG. 25D depicts a process 2500D with respect to ending a TSTV session. At block 2542, a client VR device sends a Stop request (e.g., may be generated responsive to head movement or otherwise) to end a VR TSTV session for a designated media content channel. In response, at block 2544, a TSTV controller sends a request to the MABR bandwidth control agent for terminating a TSTV session for a channel having session ID and associated URL, which is also propagated to the serving TSTV system (block 2546). At block 2548, the TSTV system stops delivery of segments responsive to the session ID and URL information.

FIGS. 26A-26D depict portions of a flowchart of various blocks, steps and/or acts that may be (re)combined in one or more arrangements that illustrate an example channel annealing mechanism for selecting media content channel bitrates in view of time-shifting of select channels according to one embodiment of the present patent disclosure. Skilled artisans will recognize upon reference hereto that example process flow 2600A-2600D of FIGS. 26A-26D is substantially similar to the embodiment 900A-900D of FIGS. 9A-9D. Accordingly, the detailed description provided hereinabove with respect to FIGS. 9A-9D is also applied herein, mutatis mutandis.

At block 2602, a MABR bandwidth control agent or module (e.g., associated with a VMA) receives a Join or Leave request with respect to the media content channels being provided to the VR environment. If the request is a Leave request (as per determination at block 2604), the channel is removed from the target channel list used for annealing or channel packing (block 2608). Also, if a TSTV controller sends a request to stop a TSTV session for a particular media channel having a designated session ID (block 2606), that channel is also removed from the target channel list. If the request is a Join request (block 2604), a further determination is made as to whether the stream segments are currently being delivered to the VR device or VD screens (block 2610). If not, a "listener" process or module may be started for monitoring dynamic bandwidth channel changes (block 2612). Otherwise, the channel is added to an active channel list (block 2614), which feeds into an MABR virtual pipe allocation mechanism for modeling or re-modeling bandwidth allocations for the active channels (block 2620). As set forth at block 2616, policy management changes, if any, with respect to MABR virtual pipe allocation may also be input (e.g., from an MABR back office) into the modeling process. Furthermore, inputs from a TSTV controller (e.g., relating to playing/pausing a session) may also be provided to the pipe modeling mechanism, as set forth at block 2618.

The active channel list may be sorted, e.g., in a descending order based on a priority value, as set forth at block 2622, whereupon a packing iteration loop 2624 may be executed for each active channel. First, a determination may be made whether the channel's lowest bitrate representation may be accommodated into the modeled or simulated bandwidth pipe (block 2626). If so, the channel is added to a list of applied channels along with a priority for that channel (block 2628). Otherwise, a further determination is made at block 2630 as to whether there is a policy change to decreasing the pipe size. If so, the channel is added to a skipped channel list (block 2634). If the channel is not the same as the new/requested channel (block 2632), it is either added to the list of the applied channels (block 2628) or to the skipped channel list (block 2634).

In the exemplary embodiment of annealing flow 2600A-D shown in FIGS. 26A-26D, a message or warning 2640 may be provided with respect to each channel in the skipped channels list as set forth at a message loop process 2638, in a manner similar to the process flow 900A-D of FIGS. 9A-9D, e.g., "Channel not currently available." For each channel in the applied channels list, a weight application process 2642 is executed wherein the weight/update received for the channel, e.g., via the listener agent monitoring (block 2636) provided for the joined channels, as set forth at block 2644. The applied channels list is then sorted based on the weights, e.g., in descending order, as set forth at block 2646, whereupon a bitrate upgrade loop process 2648 is executed for each of the applied channels for arriving at an optimal bitrate for each channel, e.g., a single bitrate that can best fit the pipe. A determination is made whether the channel can be upgraded to the next highest bitrate of the available multicast bitrates using the existing MABR channel bandwidth allocation (block 2650). If so, the bitrate for that channel is changed to that next highest bitrate (block 2651). Otherwise, no upgrading is performed for that channel and process loop returns to the next channel in the weight-sorted applied channel list or otherwise exits (block 2653).

Upon exiting the bitrate upgrade loop process 2648, an IGMP loop process 2655 is performed, which involves accounting for whether an applied channel is a TS session (block 2652). If the channel is not a TS session, a further determination is made whether the channel at the selected single bitrate representation is already connected to the correct IGMP node/port (block 2654). If so, that channel is skipped and the loop process iterates to the next channel's single bitrate (block 2656). If the channel at the selected bitrate is not already joined to the correct IGMP, an IGMP Join operation is performed to connect to the multicast stream having the calculated/selected multicast bitrate (block 2658).

On the other hand, if the applied channel is a TS session, another determination may be made whether the assigned weight is 0 (block 2660). If so, the channel bitrate is set to 0 (so as to free up the bandwidth). If the weight is non-zero, the channel bitrate is set to the calculated bitrate from the annealing process set forth hereinabove (block 2662). In one example implementation, a TSTV system may be informed of these bitrate computations for the TS channels having corresponding session IDs (block 2666). As one skilled in the art will recognize upon having reference hereto, the channel packing processes and/or bitrate upgrade processes of flow 2600A-D may therefore involve one or more bandwidth pipe modeling and annealing mechanisms set forth hereinabove.

Figures 27A, 27B:
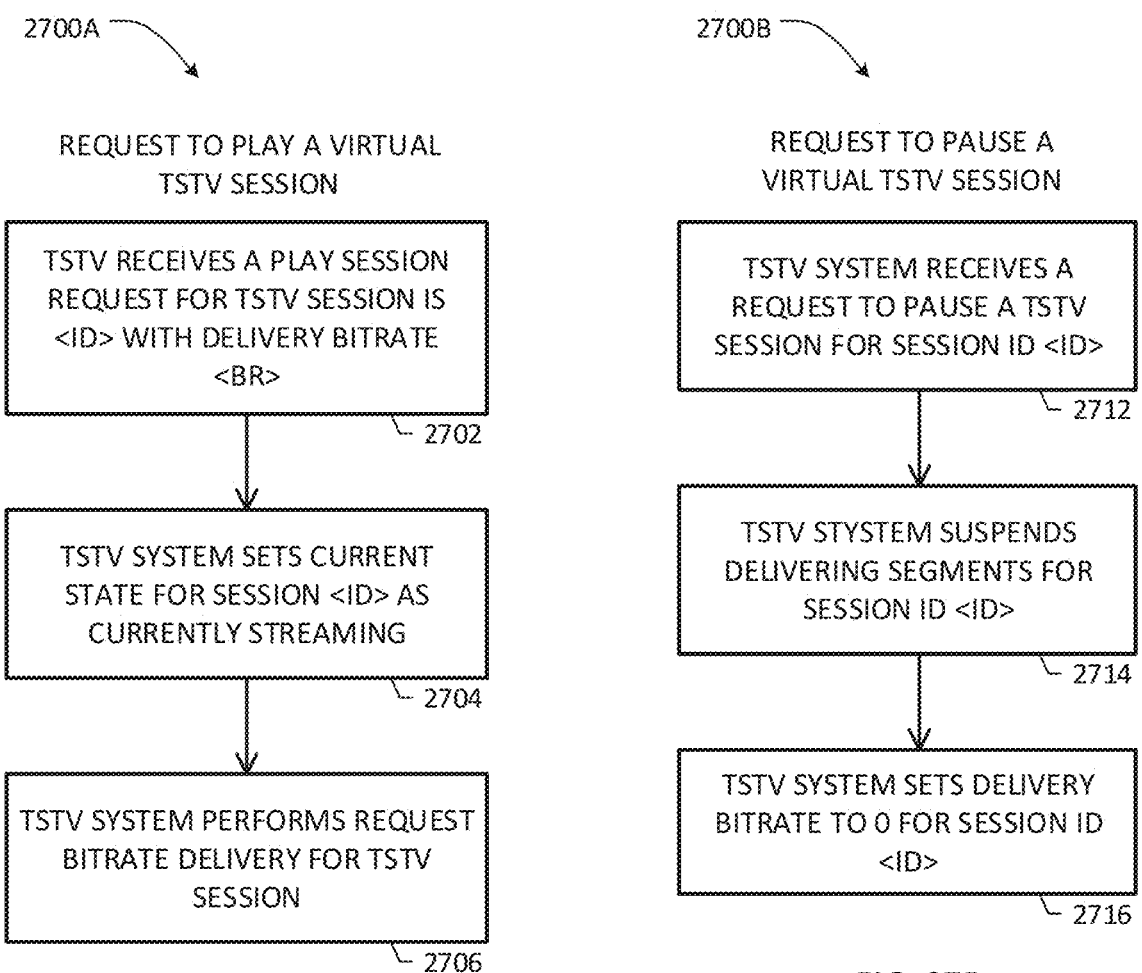
FIGS. 27A-27C are flowcharts of various blocks, steps and/or acts that may be (re)combined in one or more arrangements that illustrate additional TSTV-related processes that may be effectuated according to one or more embodiments of the present invention.
Figure 27C:
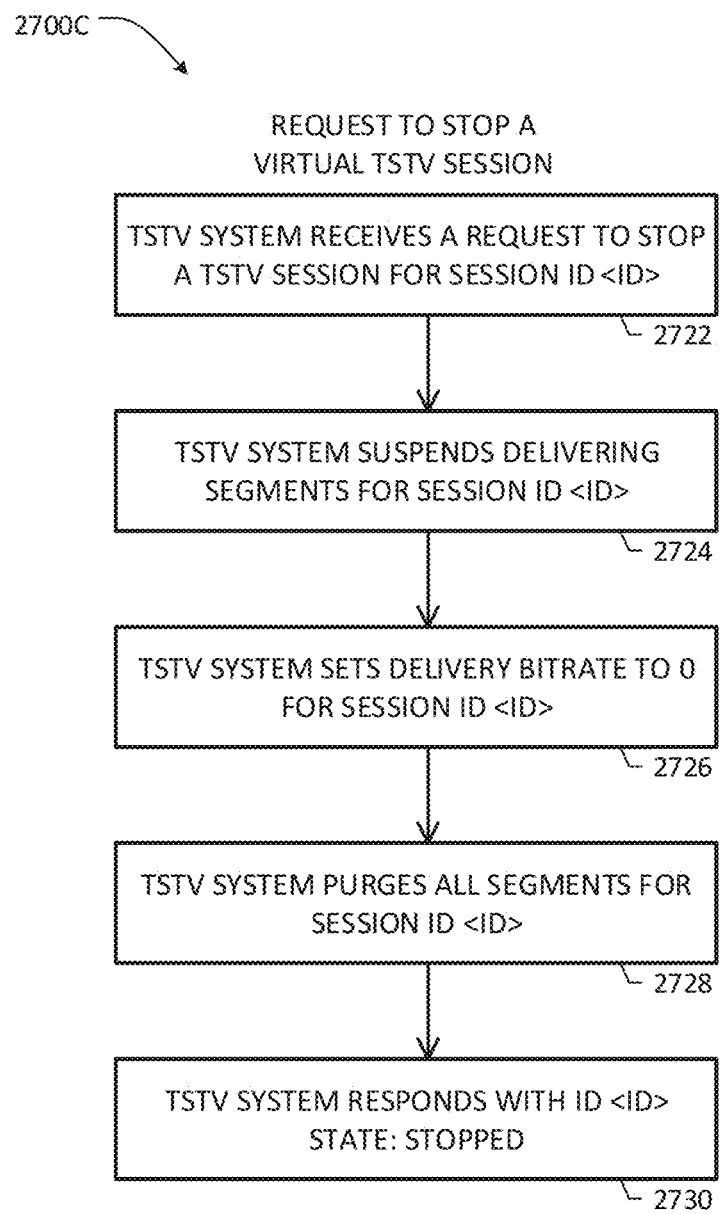

FIGS. 27A-27C are flowcharts of various blocks, steps and/or acts that may be (re)combined in one or more arrangements regarding additional TSTV-related processes that may be effectuated at an example TSTV system according to one or more embodiments of the present invention. FIG. 27A depicts a process 2700A concerning a request to play a virtual TSTV session. At block 2702, example TSTV system receives a Play session request for a specific session ID, with a requested delivery bitrate. Responsive thereto, the TSTV system sets a current state for the session ID as currently streaming (block 2704). The TSTV system then performs a bitrate request handling process, e.g., including a clamping request in some implementations, for obtaining segments of a suitable bitrate (block 2706).

FIG. 27B depicts a process 2700B concerning a request to pause a virtual TSTV session. At block 2712, example TSTV system receives a request to pause a session having a specific session ID. Responsive thereto, the TSTV system suspends delivering the segments for the designated session (block 2714). The TSTV system also sets the delivery bitrate for the session ID to zero (block 2716).

FIG. 27C depicts a process 2700C concerning a request to stop a virtual TSTV session. At block 2722, example TSTV system receives a request to stop a session having a specific session ID. Responsive thereto, the TSTV system suspends delivering the segments for the designated session (block 2724). Similar to the process 2700B above, the TSTV system also sets the delivery bitrate for the session ID to zero (block 2726). Thereafter, example TSTV system purges all segments for the designated session ID (block 2728) and provides a response including a status indication that a session having the designated session ID is stopped (block 2730).

Figure 28A:
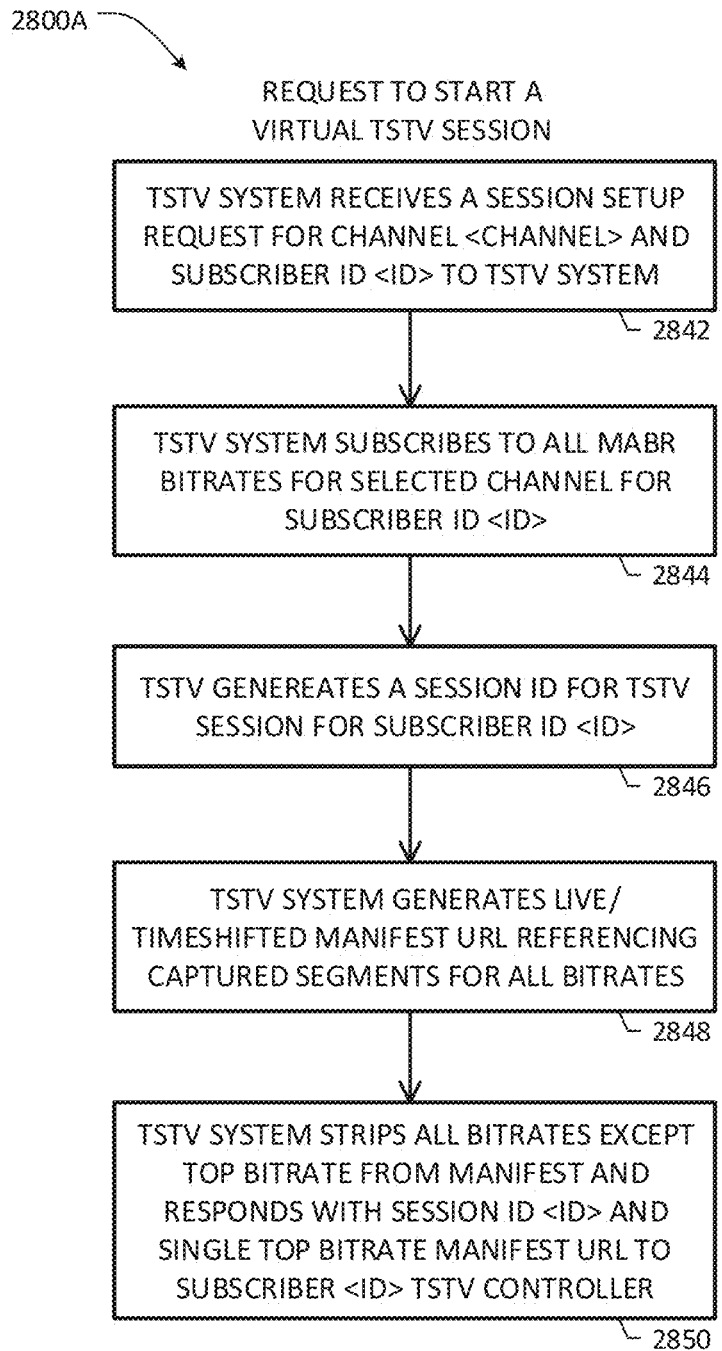
FIGS. 28A-28C are flowcharts of various blocks, steps and/or acts that may be (re)combined in one or more arrangements relating to a example process of starting a virtual TS session and requesting bitrates for a TS session according to an embodiment of the present invention.
Figure 28B:
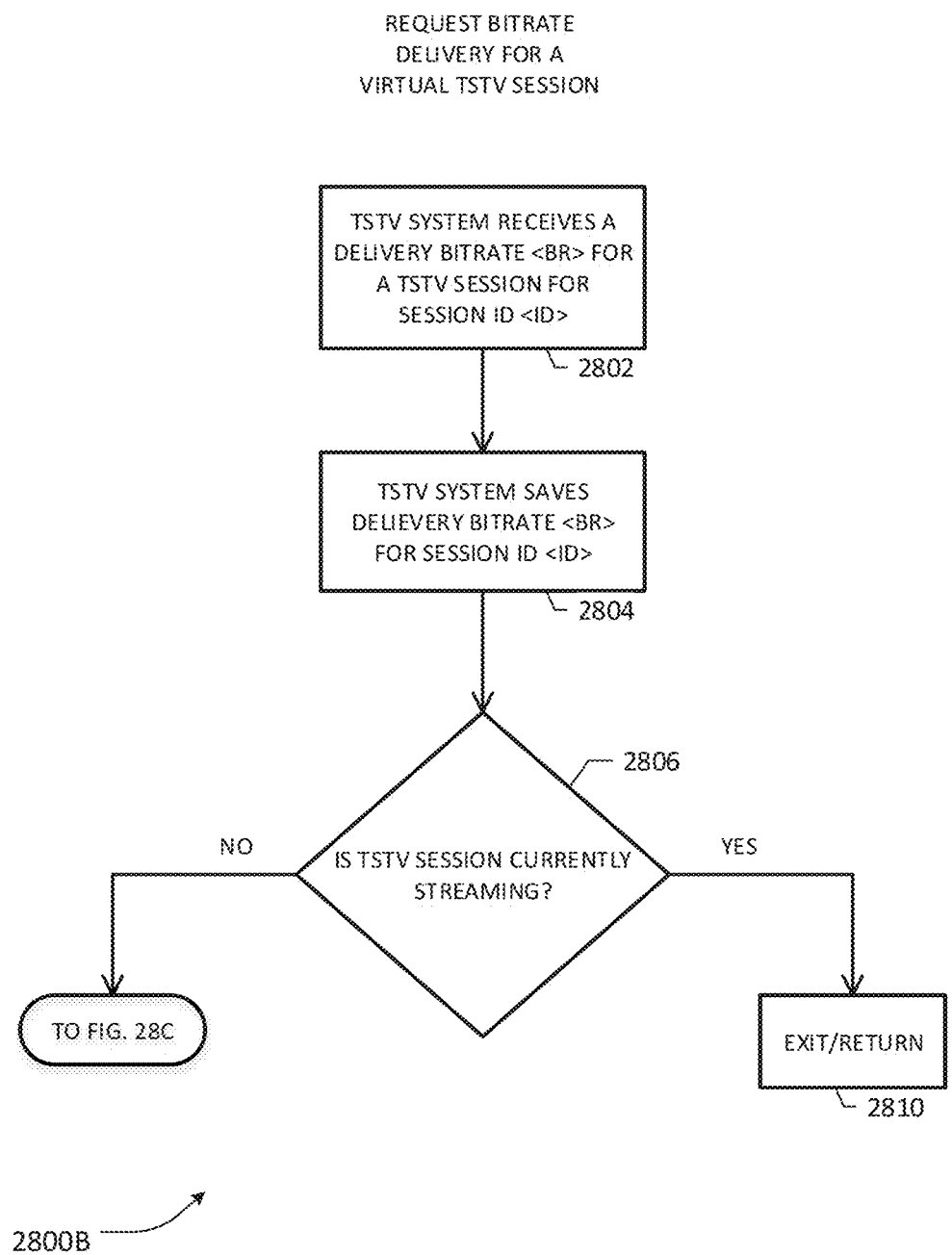
Figure 28C:
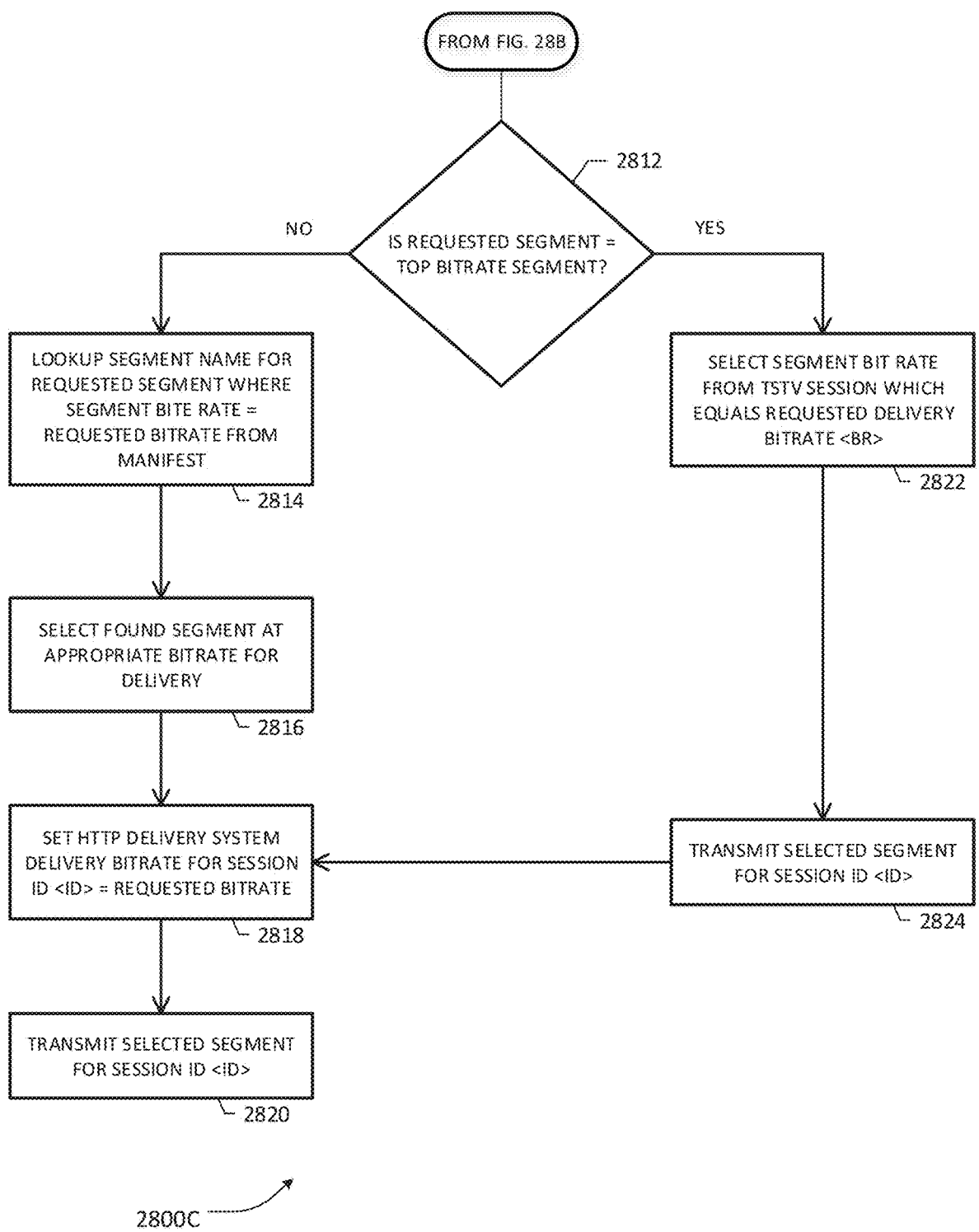

FIGS. 28A-28C depict flowcharts or portions of various blocks, steps and/or acts that may be (re)combined in one or more arrangements relating to an example process of starting a virtual TS session and requesting bitrates for a TS session according to an embodiment of the present invention. Process flow 2800A relates to generating a single bitrate manifest while handling a request to start a virtual TSTV session. At block 2842, example TSTV system receives a session setup request for a designated channel and designated subscriber. Responsive thereto, the TSTV system subscribes to all MABR bitrates for the selected channel (block 2844). A session ID is generated with respect to the requested TSTV session (block 2846). A time-shifted manifest file including URLs referencing captured segments across all bitrates is then generated or otherwise obtained (block 2848). The TSTV system then strips all bitrates except the top bitrate from the manifest and responds with session ID and single top bitrate manifest URL for the designated subscriber ID to the TSTV controller (block 2850).

Example process flow 2800B-2800C shown in FIGS. 28B-C provides additional features relating to requesting a delivery bitrate for a virtual TSTV session. At block 2802, example TSTV system receives a delivery bitrate request for a TSTV session with a designated session ID. At block 2804, the TSTV system saves the delivery bitrate associated with the session ID. A determination may be made whether the requested session is currently streaming (block 2806). If not, the process flow exits (block 2810). If the session is currently streaming, a further determination is made as to whether the requested segment is a top bitrate segment (block 2812). If so, segment bitrate is selected based on the requested delivery bitrate (block 2822), and the requested segment is selected for delivery (block 2844). If the requested segment is not a top bitrate segment, a lookup may be performed based on the segment name of the requested segment, where the segment bitrate may be set to a bitrate from the manifest (block 2814). If a segment is found at an appropriate bitrate, it is selected for delivery (block 2816). Thereafter, either from block 2824 or from block 2816, an http delivery system's bitrate for the designated session ID is set at the determined bitrate (block 2818), whereupon the selected segment for the designated session ID is transmitted (block 2820).

It should be appreciated that while one or more of the foregoing implementations are broadly GW-centric or network-centric, alternative or additional embodiments involving client-centric processes may also be practiced according to the teachings herein for allowing time-shifting to be handled primarily by the device-based logic.

Based upon the foregoing Detailed Description, it should be appreciated that one or more embodiments of the present disclosure can be advantageously implemented in a number of VR applications where bandwidth can be conserved for VD screens that are not currently being watched, thereby allowing greater bandwidth to be allocated for screens that are. By time-shifting the content, VR viewers will not miss the content, allowing the VR environment to cater to the individual viewer's surfing habits.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As alluded to previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present invention may be embodied in hardware and/or in software (including firmware, resident software, micro-code, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction relative to the depicted arrows.

One skilled in the art will further recognize that various apparatuses, subsystems, functionalities/applications and/or one or more network elements as well as the underlying network infrastructures set forth above for facilitating video outage coverage may be architected in a virtualized environment according to a network function virtualization (NFV) architecture in additional or alternative embodiments of the present patent disclosure. For instance, various physical resources, services, applications and functions set forth herein above with respect to an example ABR streaming network environment may be provided as virtual appliances, machines or functions, wherein the resources and applications are virtualized into suitable virtual network functions (VNFs) or virtual network elements (VNEs) via a suitable virtualization layer. In such embodiments, resources comprising compute resources, memory resources, and network infrastructure resources are virtualized into corresponding virtual resources wherein virtual compute resources, virtual memory resources and virtual network resources are collectively operative to support a VNF layer, whose overall management and orchestration functionality may be supported by a virtualized infrastructure manager (VIM) in conjunction with a VNF manager and an NFV orchestrator. An Operation Support System (OSS) and/or Business Support System (BSS) component may typically be provided for handling network-level functionalities such as network management, fault management, configuration management, service management, and subscriber management, etc., which may interface with VNF layer and NFV orchestration components via suitable interfaces.

Accordingly, at least a portion of an example network architecture disclosed herein may be virtualized as set forth above and architected in a cloud-computing environment comprising a shared pool of configurable virtual resources. Various pieces of software, e.g., TSTV operations, VMA and MSF functionalities, TS media/ad storage, subscriber management, etc., as well as platforms and infrastructure of a MABR network may be implemented in a service-oriented architecture, e.g., Software as a Service (SaaS), Platform as a Service (PaaS), infrastructure as a Service (IaaS) etc., with involved parties providing different features of an example embodiment of the present invention. Skilled artisans will also appreciate that such a cloud-computing environment may comprise one or more of private clouds, public clouds, hybrid clouds, community clouds, distributed clouds, multiclouds and interclouds (e.g., "cloud of clouds"), and the like.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

The invention claimed is:

1. A bitrate control method for delivering a plurality of media content channels to a corresponding plurality of virtual display (VD) screens presented in a virtual reality (VR) environment effectuated by a VR device of a subscriber, the method comprising:
   detecting a movement in a point of view of the subscriber in relation to a first reference axis with respect to the VD screens' placement within the VR environment, the VR environment containing the plurality of VD screens, said movement resulting in a second reference axis within the VR environment, wherein each VD screen is configured to receive a respective media content channel as an adaptive bitrate (ABR) segment stream of a corresponding content program;
   computing angular distance of each of the VD screens relative to the second reference axis;
   determining that one or more VD screens are outside a field of view of the subscriber;
   assigning weights to each of the media content channels based on the angular distance of the corresponding VD screens that are within the subscriber's field of view relative to the second reference axis;
   assigning a null weight to each of the media content channels showing on the VD screens that are outside the subscriber's field of view;
   time-shifting the media content channels on the VD screens that are outside the subscriber's field of view as time-shifted media content channels; and
   allocating bandwidth of a managed bandwidth pipe based on the assigned weights of the media content channels, taking into account the null weights of the time-shifted media content channels, for delivering the media content channels to the VD screens within the subscriber's field of view inside the VR environment.

2. The method as recited in claim 1, wherein the movement is detected by the subscriber's VR device responsive to the subscriber's head movement or ocular movement.

3. The method as recited in claim 1, wherein the angular distance computed for each of the VD screens comprises at least one of an angular deviation along a horizontal plane, along a vertical plane, or both planes, the horizontal and vertical planes defined in the VR environment relative to the second reference axis.

4. The method as recited in claim 1, wherein the angular distance is computed in at least one of radians, degrees, or both.

5. The method as recited in claim 1, wherein the media content channels are received at a subscriber premises gateway as gapped multicast adaptive bitrate (MABR) segment streams, each media content channel's segment stream having segments of a single bitrate selected based on the relative weight of the media content channel.

6. The method as recited in claim 5, wherein the bandwidth of the managed bandwidth pipe is allocated or reallocated responsive to selecting a particular bitrate for each media content channel among a plurality of bitrates available for each of the media content channels showing on the VD screens within the subscriber's field of view.

7. The method as recited in claim 6, wherein the particular bitrate is selected based on a channel bandwidth annealing mechanism.

8. The method as recited in claim 1, wherein the media content channels comprise one or more of live cable TV channels, IPTV channels, time-shifted (TS) TV channels, place-shifted (PS) TV channels, gaming channels, video on demand (VOD) channels and/or public service announcement channels.

9. The method as recited in claim 1, further comprising:
detecting that the subscriber has changed her point of view to a new field of view within the subscriber's VR environment;
responsive to the detecting that the subscriber has changed her point of view to a new field of view within the subscriber's VR environment, determining that one or more VD screens that were outside the subscriber's field of view previously are now within the new field of view;
responsive to the determining, updating weights to the media content channels on the VD screens within the new field of view;
allocating the bandwidth of the managed bandwidth pipe based on selecting a particular bitrate for each media content channel among a plurality of bitrates available for each of the media content channels showing on the VD screens within the subscriber's new field of view; and
delivering the time-shifted media content channels to the VD screens within the new field of view using a unicast delivery at a clamped bitrate.

10. The method as recited in claim 9, further comprising: responsive to the determining that one or more VD screens that were outside the subscriber's field of view previously are now within the new field of view, further determining whether any of the one or more VD screens that are now within the new field of view were previously selected for time-shifting of the media content channels.

11. A gateway node operating to serve a subscriber premises via a managed bandwidth pipe, the gateway node configured to facilitate delivery of a plurality of media content channels to a corresponding plurality of virtual display (VD) screens presented in a virtual reality (VR) environment effectuated by a VR device of a subscriber, the gateway node comprising:
one or more processors;
a network interface for receiving one or more time-shifted (TS) media content channels as gapped unicast adaptive bitrate segment streams;
a network interface for receiving one or more non-time-shifted (NTS) media content channels as gapped multicast adaptive bitrate (MABR) segment streams;
a bandwidth policy manager, operating in association with the one or more processors, for effectuating IGMP Leave and Join operations relative to multi-bit representations of the TS and NTS media content channels;
an ABR manifest generator for generating a manifest indicating single bit representations of each of the NTS media content channel segments stored in a segment cache of the gateway node;
one or more persistent memory modules having program instructions stored thereon which, when executed by the one or more processors, perform the following in association with one or more modules:
facilitating receipt of stream weight updates from the VR device with respect to the TS and NTS media content channels, wherein the TS media content channels are configured to have null weights when the VD screens they are associated with are outside the subscriber's field of view in the VR environment and the NTS media content channels are configured to have non-null weights when the VD screens associated therewith are at respective angular distances relative to a reference axis in the subscriber's field of view, and further wherein each VD screen is configured to receive a respective media content channel of the plurality of media content channels and the non-null weights of the NTS media content channels are updated based on the angular distance of the corresponding VD screens relative to the reference axis in the subscriber's field of view, and allocating bandwidth of the managed bandwidth pipe based on the updated weights of the NTS media content channels, taking into account the null weights of the time-shifted media content channels, for delivering the media content channels to the VD screens within the subscriber's field of view inside the VR environment; and
a TSTV controller operative to facilitate time-shifting of selected media content channels having null weight; and
an HTTP server configured to deliver segments of the NTS media content channels at respective single bitrates selected based on a channel bandwidth annealing mechanism using the updated stream weights received from the subscriber's VR device.

12. The gateway node as recited in claim 11, wherein the HTTP server is further configured to deliver segments of the TS media content channels at respective clamped bitrates using a unicast delivery responsive to receiving an indication that the subscriber has changed her point of view to a new field of view within the subscriber's VR environment and one or more VD screens that were previously outside the subscriber's field of view are now within the new field of view.

13. The gateway node as recited in claim 11, wherein the media content channels comprise one or more of live cable TV channels, IPTV channels, time-shifted (TS) TV channels, place-shifted (PS) TV channels, gaming channels, video on demand (VOD) channels and/or public service announcement channels.

* * * * *